US008761705B2

(12) United States Patent
Ichiki

(10) Patent No.: US 8,761,705 B2
(45) Date of Patent: Jun. 24, 2014

(54) ANTENNA, COMMUNICATION MODULE, COMMUNICATION SYSTEM, POSITION ESTIMATING DEVICE, POSITION ESTIMATING METHOD, POSITION ADJUSTING DEVICE, AND POSITION ADJUSTING METHOD

(75) Inventor: Hiroshi Ichiki, Kanagawa (JP)

(73) Assignee: Sony Corporation, Tokyo (JP)

( * ) Notice: Subject to any disclaimer, the term of this patent is extended or adjusted under 35 U.S.C. 154(b) by 364 days.

(21) Appl. No.: 13/217,539

(22) Filed: Aug. 25, 2011

(65) Prior Publication Data

US 2012/0052830 A1 Mar. 1, 2012

(30) Foreign Application Priority Data

Sep. 1, 2010 (JP) ............................... P2010-195952
Sep. 1, 2010 (JP) ............................... P2010-195953
Sep. 1, 2010 (JP) ............................... P2010-195954

(51) Int. Cl.
*H04B 1/06* (2006.01)

(52) U.S. Cl.
USPC ......... 455/269; 455/193.1; 343/700; 343/702

(58) Field of Classification Search
USPC ........................................................ 455/269
See application file for complete search history.

(56) References Cited

U.S. PATENT DOCUMENTS 7,236,130 B2 * 6/2007 Voigtlaender .......... 343/700 MS
8,063,830 B2 11/2011 Yoshioka et al.
2003/0090422 A1 5/2003 Diament
2005/0093746 A1 5/2005 Diament
2005/0104795 A1 * 5/2005 Voigtlaender ................ 343/795
2005/0206568 A1 9/2005 Phillips et al.
2008/0252543 A1 * 10/2008 Pettus ........................... 343/793
2009/0153405 A1 6/2009 Kikuchi et al.
2009/0207090 A1 8/2009 Pettus et al.
2009/0318092 A1 12/2009 Maoz et al.
2011/0181484 A1 7/2011 Pettus et al.

FOREIGN PATENT DOCUMENTS

GB 2 408 149 A 5/2005
JP 2009-225265 10/2009
WO WO 2008/001384 A1 1/2008

OTHER PUBLICATIONS

Partial European Search Report issued Jun. 18, 2012, in Application No. / Patent No. 11178766.9-1248.
Extended Search Report issued Oct. 5, 2012 in European Application No. 11178766.9.

* cited by examiner

*Primary Examiner* — Ajibola Akinyemi
(74) *Attorney, Agent, or Firm* — Sony Corporation

(57) ABSTRACT

An antenna includes: a differential linear antenna that includes two antenna elements, which have a predetermined length, arranged so as to be separated from each other for to be symmetrical with respect to a line that becomes a reference and provided with voltages having opposite polarities; and a patch antenna having a flat plate shape which is arranged to be parallel to a plane, on which the differential linear antenna is arranged, and in which a feeding point is disposed in an area interposed between virtual planes that are perpendicular to the plane and pass through extended lines of the antenna elements.

19 Claims, 31 Drawing Sheets

CONFIGURATION OF DATA TRANSMISSION SYSTEM

EXTERNAL CONFIGURATION OF DOCK

EXTERNAL CONFIGURATION OF STORAGE DEVICE

FIXED STATUS OF COMMUNICATION MODULE IN STORAGE DEVICE

EXTERNAL CONFIGURATION OF COMMUNICATION MODULE

POSITIONAL RELATIONSHIP BETWEEN COMMUNICATION MODULES
WHEN STORAGE DEVICE IS PLACED IN DOCK

BASIC STRUCTURE OF ANTENNA

STRUCTURE OF ANTENNA

CONNECTION BETWEEN ANTENNA AND SUBSTRATE

FEEDING POINT IN EMBODIMENT

FEEDING POINT DISPOSED ON CORNER OF PATCH ANTENNA

AMOUNT OF INTERFERENCE OF DIFFERENTIAL LINEAR ANTENNA ON PATCH ANTENNA IN CASE FEEDING POINT IS DISPOSED ON CORNER OF PATCH ANTENNA

AMOUNT OF INTERFERENCE OF PATCH ANTENNA ON DIFFERENTIAL LINEAR ANTENNA IN CASE FEEDING POINT IS DISPOSED ON CORNER OF PATCH ANTENNA

ELECTRICAL CONFIGURATION OF PERSONAL COMPUTER

OVERVIEW OF ELECTRICAL CONFIGURATION OF COMMUNICATION UNIT

DETAILED ELECTRICAL CONFIGURATION OF COMMUNICATION UNIT

CONFIGURATION OF TRANSMISSION LSI AND RECEPTION LSI

CONFIGURATION OF DIFFERENTIAL TRANSMISSION CIRCUIT AND DIFFERENTIAL RECEPTION CIRCUIT

RECEIVED VOLTAGE ACCORDING TO POSITIONAL DEVIATION IN X-AXIS, Y-AXIS, AND Z-AXIS DIRECTIONS IN CASE WHERE EACH EIGHT ANTENNAS ARE ALIGNED IN X AXIS DIRECTION

RELATIONSHIP BETWEEN AMPLIFICATION FACTOR AND DISTANCE BETWEEN ANTENNAS

FUNCTIONAL STRUCTURE OF MICROCOMPUTER

SEQUENCE OF POSITION CONTROL PROCESS USING MICROCOMPUTER OF DOCK

SEQUENCE OF POSITION CONTROL PROCESS USING MICROCOMPUTER OF STORAGE DEVICE

SPACER (1) DISPOSED BETWEEN COMMUNICATION MODULES ACCORDING TO ANOTHER EMBODIMENT

SPACER (2) DISPOSED BETWEEN COMMUNICATION MODULES ACCORDING TO ANOTHER EMBODIMENT

CONFIGURATION (1) OF COMMUNICATION UNIT ACCORDING TO ANOTHER EMBODIMENT

CONFIGURATION (2) OF COMMUNICATION UNIT ACCORDING TO ANOTHER EMBODIMENT

CONFIGURATION OF COMMUNICATION MODULE ACCORDING TO ANOTHER EMBODIMENT

ANTENNA, COMMUNICATION MODULE, COMMUNICATION SYSTEM, POSITION ESTIMATING DEVICE, POSITION ESTIMATING METHOD, POSITION ADJUSTING DEVICE, AND POSITION ADJUSTING METHOD

FIELD

The present disclosure relates to a communication module and a communication system and, for example, is very appropriate to be applied to a case where data is transmitted and received in a wireless manner at a high speed. In addition, the present disclosure relates to a position estimating device and a position estimating method, and, for example, is very appropriate to be applied to a case where positional deviation between antennas performing wireless communication through a Quasi-electrostatic field is detected. Furthermore, the present disclosure relates to a position adjusting device, a position adjusting method, and a communication system, and, for example, is very appropriate to be applied to a case where positional deviation between antennas performing wireless communication through a Quasi-electrostatic field is adjusted.

BACKGROUND

Generally, in a system in which data is transferred between devices, in a case where data communication is performed between devices at a speed of several Gbps or higher in compliance with specifications such as a Serial ATA 2 (Serial Advanced Technology Attachment 2; hereinafter also referred to as SATA2), a PCI Express (Peripheral Component Interconnect), or the like, the devices are interconnected in a wired manner, for example, through a cable.

In such data communication, in a case where the communication speed is as high as several Gbps, for example, gold plating having high conductivity is performed for connection terminals of the cable or connectors connecting the cable, and accordingly, high-speed communication at a speed of several Gbps or higher can be performed.

However, in the above-described communication system, in a case where one side is, for example, a portable medium terminal, the cable is pulled out and inserted every time data communication is performed. Accordingly, there is a high possibility that the gold plating formed for the connection terminals and the connectors will be peeled off.

When the gold plating is peeled off, the connection state between connectors is degraded, and accordingly, there is a problem in that it is difficult to stably transmit or receive data at a high speed or it is difficult to transmit or receive data in some cases.

Recently, data communication between devices is performed in a wireless manner (for example, see JP-A-2009-225265).

SUMMARY

When the above-described devices connected in a wired manner is replaced with wireless communication, and high-speed data communication at a speed of several Gbps is performed, the above-described problem can be solved.

However, in a case where data communication is performed at a high speed of several Gbps, a distance between antennas that perform wireless communication is shortened, and a tolerance level for the positional deviation from a distance set in advance is lowered. Accordingly, it is necessary to measure the distance between antennas that perform wireless communication. In addition, in a case where the positional deviation occurs, it is necessary to adjust the positional deviation.

As one method for such operations, a method may be considered in which a device that physically measures the distance between antennas is additionally arranged. However, in such a case, where is a problem in that the configuration becomes complicated, and the number of components is increased.

In addition, a case may be considered in which wireless communication for a purpose other than the high-speed data communication performed at a speed of several Gbps is performed between the devices that perform wireless communication.

In such a case, it is necessary to separately arrange an antenna for the high-speed data communication and an antenna for another purpose in each device. Accordingly, there is a problem in that the size of the device is increased.

Thus, it is desirable to provide an antenna, a communication module, and a communication system capable of performing two different types of wireless communication and being miniaturized.

It is also desirable to provide a position estimating device and a position estimating method capable of estimating a distance between antennas using a simple configuration.

It is also desirable to provide a position adjusting device, a position adjusting method, and a communication system capable of adjusting the positional deviation between antennas using a simple configuration.

An embodiment of the present disclosure is directed to an antenna including: a differential linear antenna that includes two antenna elements, which have a predetermined length, arranged so as to be separated from each other to be symmetrical with respect to a line that becomes a reference and provided with voltages having opposite polarities; and a patch antenna having a flat plate shape which is arranged to be parallel to a plane, on which the differential linear antenna is arranged, and in which a feeding point is disposed in an area interposed between virtual planes that are perpendicular to the plane and passes through extended lines of the antenna elements.

Another embodiment of the present disclosure is directed to a communication module including: an antenna including a differential linear antenna that includes two antenna elements, which have a predetermined length, arranged so as to be separated from each other to be symmetrical with respect to a line that becomes a reference and provided with voltages having opposite polarities and a patch antenna having a flat plate shape which is arranged to be parallel to a plane, on which the differential linear antenna is arranged, and in which a feeding point is disposed in an area interposed between virtual planes that are perpendicular to the plane and passes through extended lines of the antenna elements; and a substrate in which the antenna is arranged such that the differential linear antenna is positioned on a layer located above that of the patch antenna.

Still another embodiment of the present disclosure is directed to a communication system including: a storage device; and a dock. The storage device includes a storage medium that stores data therein and a first antenna including a differential linear antenna that includes two antenna elements, which have a predetermined length, arranged so as to be separated from each other to be symmetrical with respect to a line that becomes a reference and provided with voltages having opposite polarities and a patch antenna having a flat plate shape which is arranged to be parallel to a plane, on which the differential linear antenna is arranged, and in which a feeding point is disposed in an area interposed between virtual planes that are perpendicular to the plane and passes through extended lines of the antenna elements. The dock includes a second antenna having a same shape as the first antenna and a casing portion to which the storage medium is installed such that the first antenna and the second antenna are in a state of facing each other over an extremely short distance. The differential linear antennas of the first and second antennas communicate with each other in a non-contact manner, and the patch antennas of the first and second antennas communicate with each other in a non-contact manner.

Accordingly, since voltages having opposite polarities are supplied to two antenna elements of the differential linear antenna, the polarities have equal influences on the patch antenna so as to be offset, whereby there is hardly any interference. In addition, since the electric waves radiated from the patch antenna have almost equal influences on the two antenna elements, by acquiring a difference between the voltages received by the two antenna elements, the influences are offset. Therefore, the differential linear antenna and the patch antenna can respectively perform communication without interfering with each other.

Yet another embodiment of the present disclosure is directed to a position estimating device including: antennas that are used for non-contact communication through a Quasi-electrostatic field; a gain control unit that calculates an amplification factor used for amplifying a voltage of a signal received by the antenna to a constant voltage; and an estimation unit that estimates an inter-antenna distance between the antenna and a communication target antenna that is a communication opponent of the antenna based on the amplification factor calculated by the gain control unit.

According to the above-described position estimating device, a distance between antennas that perform wireless communication using a Quasi-electrostatic field can be estimated based on the amplification factor that is calculated when a signal received by the antenna is amplified to a constant voltage.

Still yet another embodiment of the present disclosure is directed to a position adjusting device including: antennas used for performing non-contact communication through a Quasi-electrostatic field; a gain control unit that calculates an amplification factor used for amplifying a voltage of a signal received by the antenna to a constant voltage; an estimation unit that estimates an inter-antenna distance between the antenna and a communication target antenna that is a communication opponent of the antenna based on the amplification factor calculated by the gain control unit; an adjustment unit that adjusts the inter-antenna distance between the antenna and the communication target antenna; and a position control unit that controls the adjustment unit based on the inter-antenna distance estimated by the estimation unit.

According to the above-described position adjusting device, a distance between antennas performing wireless communication using a Quasi-electrostatic field is estimated based on the amplification factor calculated when a signal received by the antenna is amplified to a constant voltage, and the position between the antennas can be adjusted based on the estimated distance.

As described above, according to the embodiments of the present disclosure, since voltages having opposite polarities are supplied to two antenna elements of the differential linear antenna, the polarities have equal influences on the patch antenna so as to be offset, whereby there is hardly any interference. In addition, since the electric waves radiated from the patch antenna have almost equal influences on the two antenna elements, by acquiring a difference between the voltages received by the two antenna elements, the influences are offset. Therefore, the differential linear antenna and the patch antenna can respectively perform communication without interfering with each other. As a result, an antenna, a communication module, and a communication system capable of performing two different types of wireless communication and being miniaturized can be realized.

Also, according to the embodiments of the present disclosure, a distance between antennas performing wireless communication using a Quasi-electrostatic field can be estimated based on the amplification factor calculated when a signal received by the antenna is amplified to a constant level. Accordingly, it is not necessary to arrange an additional device, an additional circuit, and the like that are used for measuring a distance between antennas, whereby the configuration can be simplified.

Further, according to the embodiments of the present disclosure, a distance between antennas performing wireless communication using a Quasi-electrostatic field is estimated based on the amplification factor calculated when a signal received by the antenna is amplified to a constant level, and the position between the antennas can be adjusted based on the estimated distance. Accordingly, it is not necessary to arrange an additional device, an additional circuit, and the like that are used for measuring a distance between antennas, whereby the configuration can be simplified, and the distance between the antennas can be adjusted to a distance at which the communication state is optimal.

DETAILED DESCRIPTION

Hereinafter, embodiments of the present disclosure will be described. The description will be presented in the following order.

1. Embodiment
2. Other Embodiments

1. Embodiment

1. Configuration of Data Transmission System

Figure 1:
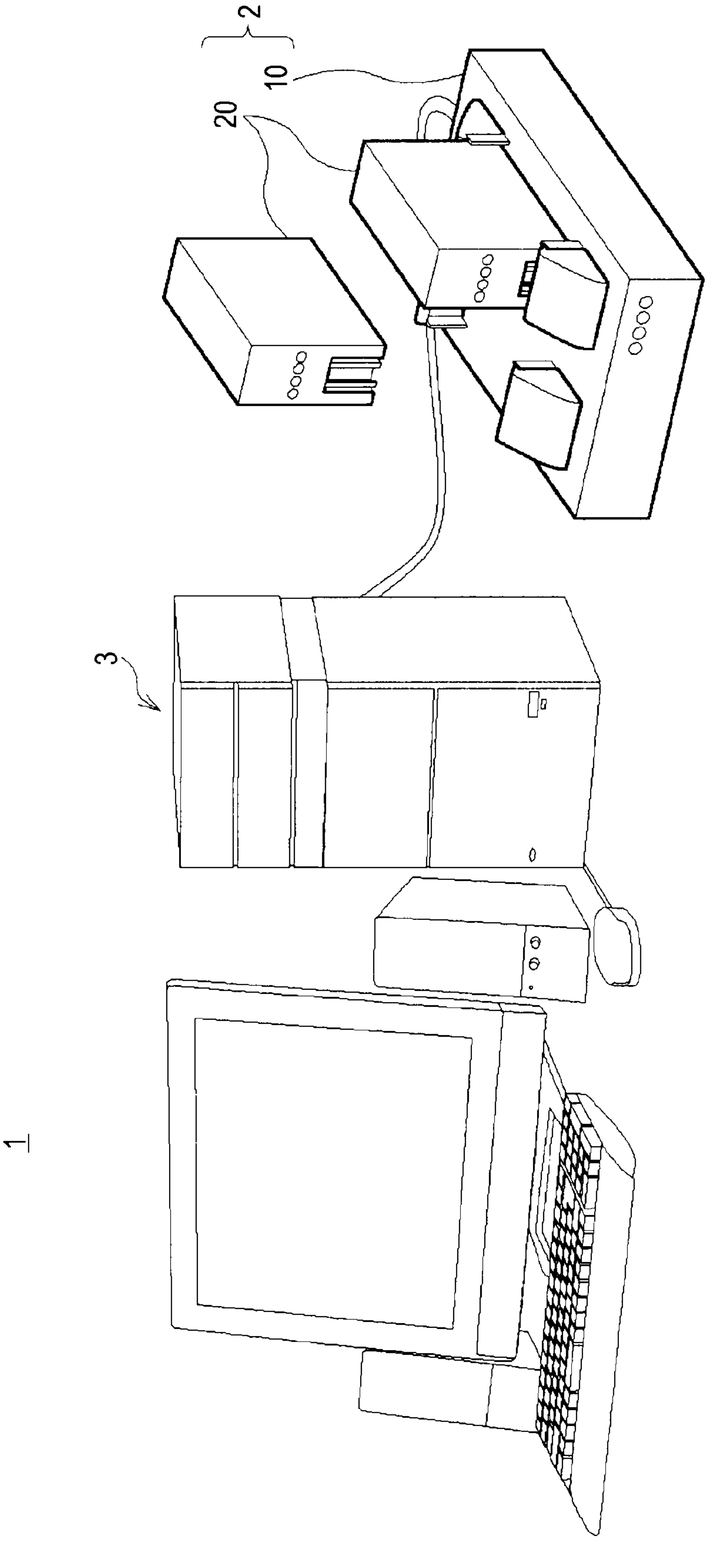
FIG. 1 is a schematic diagram illustrating the configuration of a data transmission system.

FIG. 1 illustrates a data transmission system 1 according to an embodiment. The data transmission system 1 is configured by a communication unit 2 and a personal computer 3. The communication unit 2 is configured by a dock 10 and a storage device 20.

In the communication unit 2, the storage device 20 can be detachably attached to the dock 10. When the storage device 20 is placed in (installed to) the dock 10, the dock 10 and the storage device 20 are configured so as to perform high-speed communication and low-speed communication with each other through non-contact communication.

The dock 10 and the personal computer 3 are connected to each other in a wired manner through a predetermined cable.

Accordingly, the personal computer 3 can performs high-speed communication and low-speed communication with the storage device 20 through the dock 10.

[1-1. External Configuration of Dock]

Figure 2:
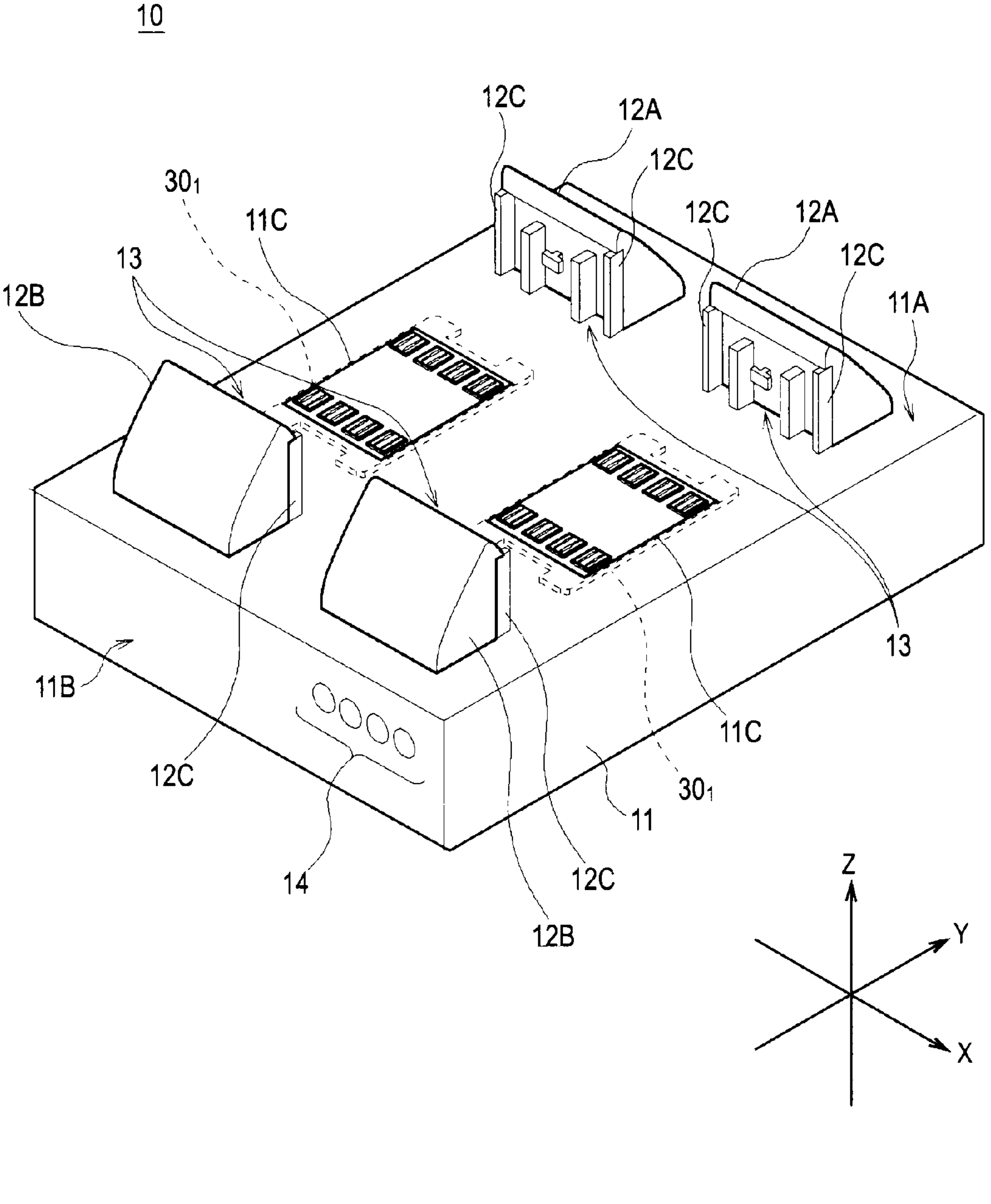
FIG. 2 is a schematic diagram illustrating an external configuration of a dock.

In the dock 10, as illustrated in FIG. 2, two pairs of fixation portions 12A and 12B are disposed so as to be separated from each other by a length that is the same as the depth (the length in the Y-axis direction) of the storage device 20, so that two storage device 20 (FIG. 1) are disposed on a top face 11A of a casing portion 11 having an approximately rectangular parallelepiped shape.

Guides 12C are disposed on both ends of each of the fixation portions 12A and 12B so as to be separated by a length that is the same as the horizontal width (the length in the X-axis direction) of the storage device 20.

Accordingly, the dock 10 is configured such that the storage device 20 is fixed to a position determined between the fixation portions 12A and 12B with high precision when being placed.

To the fixation portions 12A and 12B, the storage device 20 is disposed so as to protrude to a side that is faced with an actuator mechanism 13 fitted into a fitting portion 24 (FIGS. 3A and 3B) of the storage device 20 when being disposed on the top face 11A.

The actuator mechanism 13 is fitted into the storage device 20 only when the storage device 20 is placed on the top face 11A. In order to allow the storage device 20 to be out of the dock 10, the storage device 20 is disposed out of the fitting portion 24. Accordingly, the storage device 20 can be attached to or detached from the dock 10.

The actuator mechanism 13, to be described later in detail, is configured so as to move the storage device 20 placed on the top face 11A in a direction (the Z-axis direction) perpendicular to the top face 11A.

On the top face 11A of the casing portion 11, an opening portion 11C having a size allowing the entirety of an antenna 40 (FIGS. 5A and 5B) of a communication module $\mathbf{30}_1$ fixed to the inside of the casing portion 11 to be exposed is arranged at a predetermined position between the fixation portions 12A and 12B.

The communication module $\mathbf{30}_1$ is disposed such that a face thereof on which the antenna 40 is arranged faces the storage device 20.

On the front face 11B of the casing portion 11, an indicator 14 that is, for example, formed from LEDs (Light Emitting Diodes) is disposed which is used for notifying a user of a connection status or a communication status with the storage device 20.

[1-2. External Configuration of Storage Device]

Figures 3A, 3B:
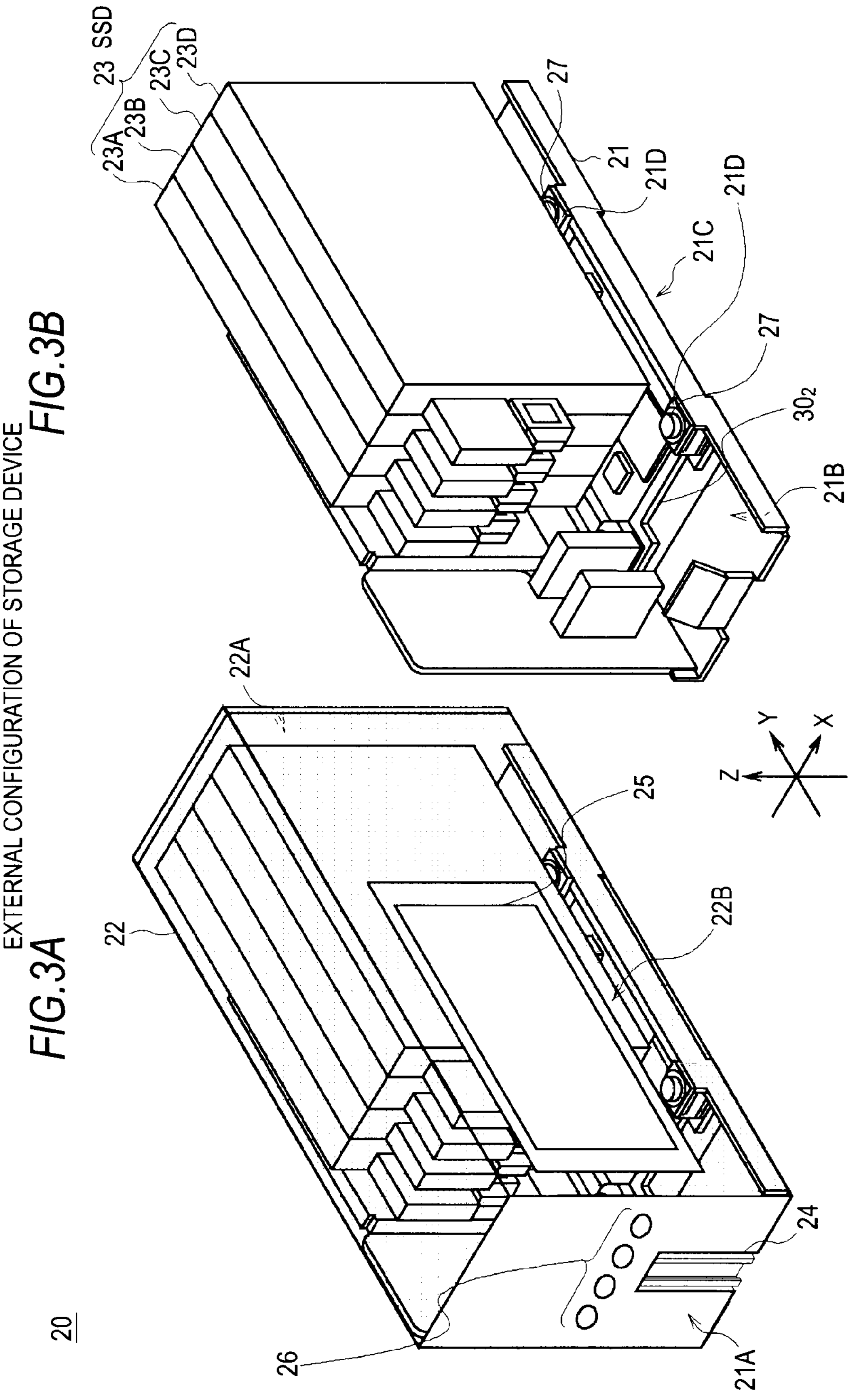
FIGS. 3A and 3B are schematic diagrams illustrating an external configuration of a storage device.

The storage device 20, as illustrated in FIGS. 3A and 3B, is formed in an approximately rectangular parallelepiped of which the inside is covered with the casing portion 21 and a cover 22. In FIG. 3A, although the cover 22 is represented such that light is allowed to be transmitted to the inside thereof, for convenience of the description, it may not actually be transparent or semi-transparent.

Inside the casing portion 21 and the cover 22, four SSDs (Solid State Drives) 23 (23A, 23B, 23C, and 23D) as storage media are disposed so as to be aligned, and various kinds of data can be stored in the SSDs 23.

On a front face 21A of the casing portion 21, the fitting portion 24 is disposed which is fitted into the actuator mechanism 13 when being placed in the dock 10. In addition, also on a rear face 22A of the cover 22 located on a side opposite to the front face 21A, a fitting portion 24 (not shown) is disposed which is fitted into the actuator mechanism 13 when being placed in the dock 10.

On a bottom face 21B of the casing portion 21, an opening portion 210 having a size for exposing the antenna 40 (FIGS. 5A and 5B) of a communication module $30_2$ is arranged at a position that is faced with the opening portion 11C when the storage device 20 is placed in the dock 10.

When the antenna 40 is exposed from the opening portion 11C, and the storage device 20 is placed in the dock 10, the communication module $30_2$ is disposed such that the face faced with the antenna 40 faces the dock 10.

On a side face 22B of the cover 22, a display unit 25 is disposed so as to display a data name, a data size, or the like of the data stored in an SSD 23.

On the front face 21A of the casing portion 21, an indicator 26 that is, for example, formed from LEDs is disposed which is used for notifying a user of a connection status or a communication status with the dock 10.

Figure 4:
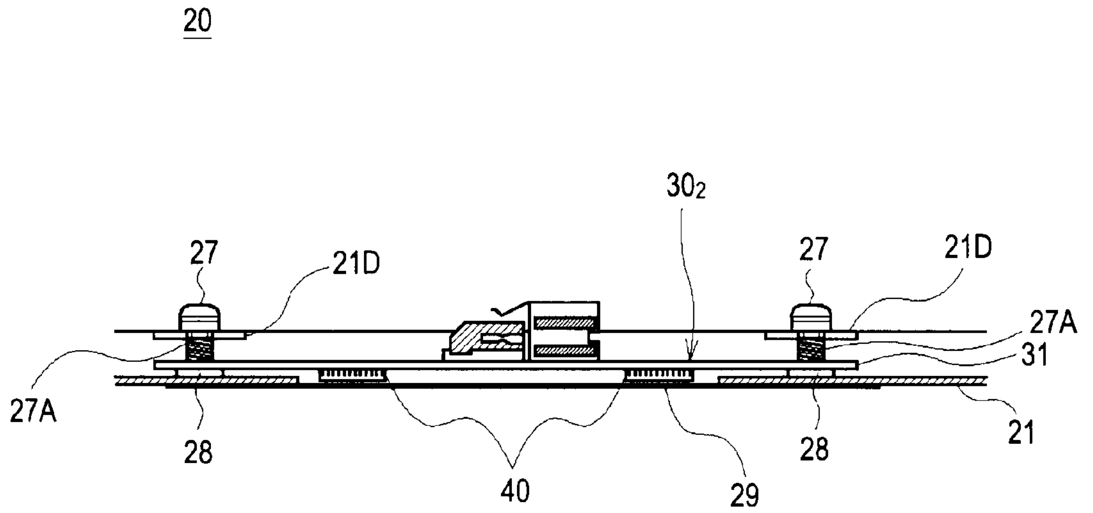
FIG. 4 is a schematic diagram illustrating the appearance of fixing a communication module in a storage device.

The communication module $30_2$, as illustrated in FIGS. 3A, 3B, and 4, is fixed to a base portion 28 arranged in an opposite position through springs 27A by a screw 27 that passes through a protruded portion 21D formed by bending a part of the side face of the casing portion 21 to the inner side and the screw 27 on the casing portion 21. This communication module $30_2$ is configured such that, by rotating the screw 27, the communication module $30_2$ is vertically moved in the Z axis direction.

On the bottom face 21B of the casing portion 21, a protection film 29 is disposed so as to cover the opening portion 21C for protecting the antenna 40. Similarly, on the top face of the dock 10, a protection film (not shown in the figure) used for protecting the antenna 40 is disposed as well. In a case where the dielectric constant of the material of the protection film is approximately equal to or less than ten, the communication using the antenna 40 is not influenced, and accordingly, a flat plate, for example, formed from a resin may be arranged instead of the film.

The fitting portion 24 of the casing portion 21 is also used as a connector used to receive power from the dock 10. When being placed in the dock 10, the storage device 20 is connected to the ground and the power source of the power source circuit of the dock 10 through connectors (not shown in the figure) of the dock 10 that are disposed at positions facing the two fitting portions 24. Accordingly, the power can be supplied regardless of position adjustment to be described later.

Here, for convenience of the description, although different reference numerals are assigned to the communication module $30_1$ disposed in the dock 10 and the communication module $30_2$ disposed in the storage device 20, actually the communication modules are the same. Thus, when it is not necessary to identify each of the communication modules in the description, the communication module is simply referred to as a communication module 30. In addition, when each portion of the communication module 30 to be described later is described with the communication modules $30_1$ and $30_2$ being differentiated from each other, a subscript 1 or 2 will be added to the reference numeral of the corresponding portion in the description.

[1-3. External Configuration of Communication Module]

Figure 5A:
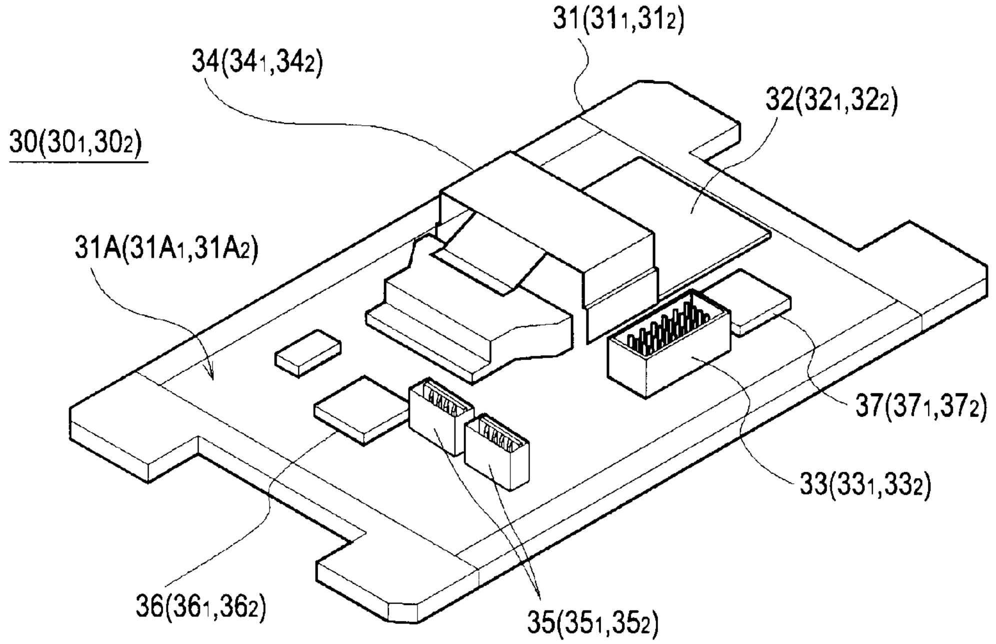
FIGS. 5A and 5B are schematic diagrams illustrating an external configuration of a communication module.
Figure 5B:
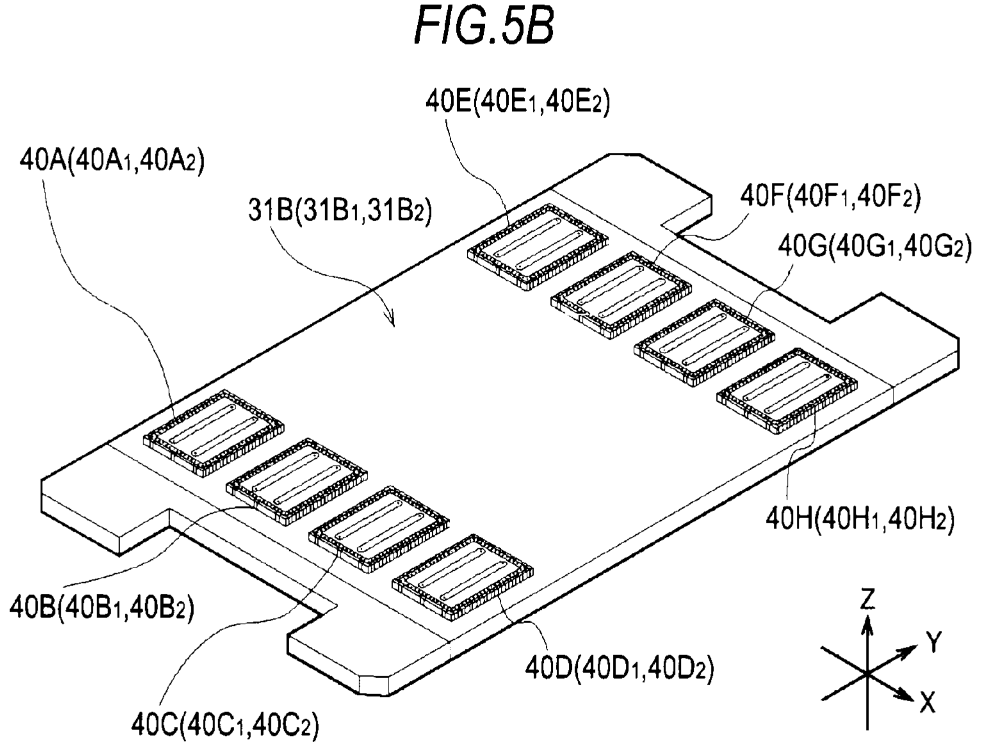

The communication module 30, as illustrated in FIGS. 5A and 5B, near the center of a front surface 31A of the substrate 31 formed in a flat "H" pattern, a conversion circuit 32, a power source connector 33, a mini SAS connector 34, and a USB connector 35 are arranged. In addition, on the front surface 31A of the substrate 31, a transmission LSI (Large Scale Integration) 36 is arranged on one end side (Y-axis negative direction side) in the longitudinal direction, and a reception LSI (Large Scale Integration) 37 is arranged on the other end side (Y-axis positive direction side).

On a rear surface 31B of the substrate 31, the transmission antennas 40A to 40D are adjacently arranged with a predetermined gap (for example, 3 mm) interposed therebetween on one end side (the Y-axis negative direction side), and the transmission antennas 40A to 40D are electrically connected to the transmission LSI 36 through the substrate 31.

In addition, on the rear surface 31B of the substrate 31, four reception antennas 40E to 40H are adjacently arranged in the X-axis direction with a predetermined gap (in this embodiment, 3 mm) interposed therebetween on the other end side (the Y-axis positive direction side), and the reception antennas 40E to 40H are electrically connected to the reception LSI 37 through the substrate 31. Accordingly, the transmission antennas 40A to 40D and the reception antennas 40E to 40H are arranged so as to be sufficiently separated from each other.

Here, the transmission antennas 40A to 40D and the reception antennas 40E to 40H have the same structure, and in a case where the transmission antenna or the reception antenna is described without being differentiated, it is simply referred to as an antenna 40.

The communication module $30_1$ operates by being supplied with power from a power source (not shown in the figure) disposed inside the dock 10 through a predetermined cable (not shown in the figure) and a power source connector $33_1$. In addition, the communication module $30_1$ is connected to an RAID (Redundant Arrays of Inexpensive Disks) card 81 (FIG. 18) through a mini SAS connector $34_1$ and a cable that is compliant with and SATA2 specifications. Furthermore, the communication module $30_1$, for example, is connected to a USB interface 82 (FIG. 18) through a USB connector $35_1$ and a cable (not shown in the figure) that is compliant with USB specifications.

On the other hand, the communication module $30_2$ operates by being supplied with power through a predetermined cable and a power source connector $33_2$. In addition, the communication module $30_2$ is connected to the SSDs 23A to 23D through a mini SAS connector $34_2$ and a cable (not shown in the figure) that is compliant with SATA2 specifications. Furthermore, the communication module $30_2$, for example, is connected to the display unit 25 through a USB connector $35_2$ and a cable (not shown in the figure) that is compliant with USE specifications.

Figure 6:
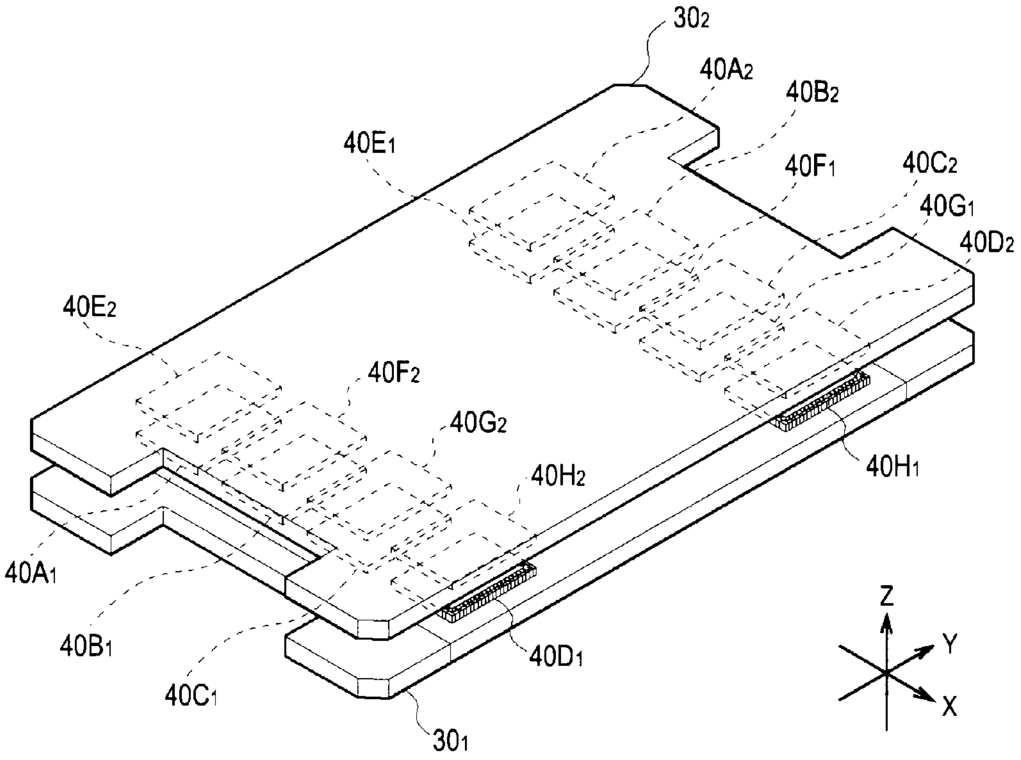
FIG. 6 is a schematic diagram illustrating a positional relationship between communication modules in a case where a storage device is placed in a dock.

The communication module $30_1$ and the communication module $30_2$, as illustrated in FIG. 6, are configured so as to face each other when the storage device 20 is placed in the dock 10.

To be more specific, a transmission antenna $40A_1$ of the communication module $30_1$ and a reception antenna $40E_2$ of the communication module $30_2$ face each other with a reference gap, for example, set as 1 mm being separated from each other. Similarly, transmission antennas $40B_1$ to $40D_1$ of the communication module $30_1$ and reception antennas $40F_2$ to $40H_2$ of the communication module $30_2$ face each other with a gap of an extremely short distance (for example, 1 mm) being separated from each other. In addition, reception antennas $40E_1$ to $40H_1$ of the communication module $30_1$ and transmission antennas $40A_2$ to $40D_2$ of the communication module $30_2$ face each other with a gap of an extremely short distance (for example, 1 mm) being separated from each other.

In the communication module 30, signals output from the transmission antennas 40A to 40D are received by the reception antennas 40E to 40H arranged at opposite positions.

[1-4. Configuration of Antenna]

[1-4-1. Basic Structure]

Figure 7:
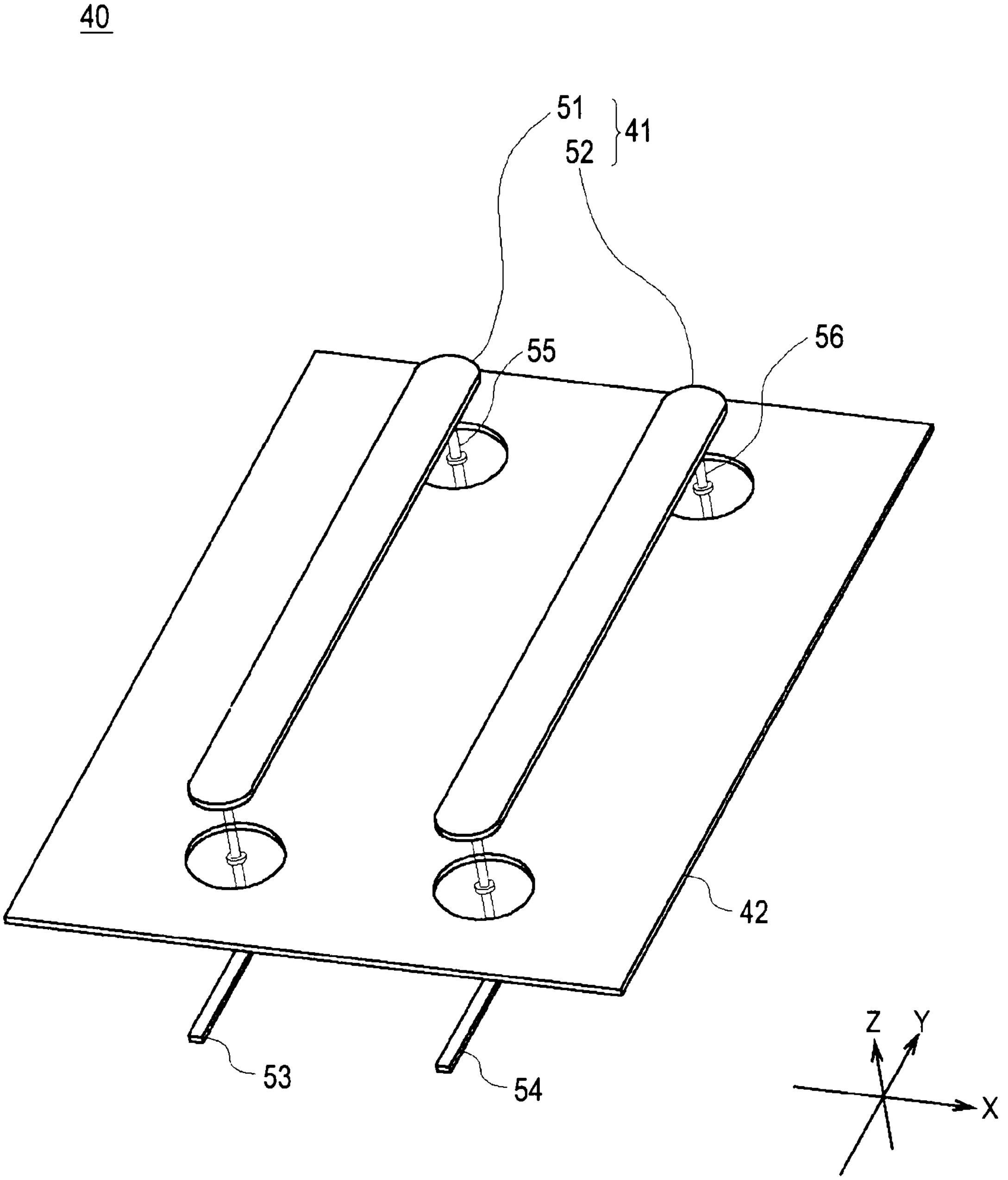
FIG. 7 is a schematic diagram illustrating a basic structure of an antenna.

The basic structure of the antenna 40 will be described. As illustrated in FIG. 7, the antenna 40 is configured so as to include a differential linear antenna 41 in which antenna elements 51 and 52 formed by flat plates that are long in the Y-axis direction are arranged to be parallel to each other on a same plane and a patch antenna 42 that is formed by a flat plate having an approximate rectangle shape.

The antenna 40 is configured to have a two-layer structure in which the differential linear antenna 41 and the patch antenna 42 area arranged in the Z axis direction with a predetermined gap interposed therebetween. In addition, the antenna 40 is configured so as to perform only one of a transmission operation or a reception operation.

The patch antenna 42 is arranged so as to be parallel to the plane on which the antenna elements 51 and 52 are arranged and has such a size that the entirety of the antenna elements 51 and 52 are fitted into an extension of the plane.

The differential linear antenna 41, for example, is configured so as to perform data communication (high-speed communication) that is equivalent (a maximum of 6 Gbps) to the SATA2 specifications and performs communication at about 6 to 8 GHz. On the other hand, the patch antenna 42, for example, is configured so as to perform data communication (low-speed communication) that is equivalent to the USE specifications (a maximum of 600 Mbps) and performs communication at about 1 to 2 GHz.

In the patch antenna 42, holes are formed at positions facing both ends of the antenna elements 51 and 52, and feeding portions 53 and 54 and connection portions 55 and 56 are arranged, which pass through the holes from both the ends of the antenna elements 51 and 52 and extend to the lower side (the Z-axis negative direction) of the patch antenna 42.

In a case where the antenna 40 is used for transmission (in the case of the transmission antennas 40A to 40D), signals having opposite polarities are input to the feeding portions 53 and 54. The input signals are input, for example, by converting transmission signals having voltages of ±1200 mV that are compliant to the SATA2 specifications into high-speed signals of about 6 to 8 GHz.

On the other hand, in a case where the antenna 40 is used for reception (in the case of the antennas 40E to 40H), the feeding portions 53 and 54 output the voltages of signals received by the antenna elements 51 and 52 connected thereto.

The connection portions 55 and 56 are connected through resistors having predetermined resistance values.

Since the differential linear antenna 41 of each of the transmission antennas 40A to 40D inputs signals having opposite polarities to the antenna elements 51 and 52 through the feeding portions 53 and 54, it generates an electric field over one antenna element 51 or 52 to the other antenna element 52 or 51.

In the differential linear antenna 41 of each of the reception antennas 40E to 40H, the antenna elements 51 and 52 are electrically charged in accordance with an electric field that is generated by the differential linear antennas 41 of the transmission antennas 40A to 40D arranged in an extremely short distance.

In other words, the antenna elements 51 and 52 of the transmission antennas 40A to 40D are electrostatically coupled with the antenna elements 51 and 52 (52 and 51) of the reception antennas 40E to 40H arranged at positions facing the antenna elements 51 and 52, and thereby changing the voltage.

Accordingly, the reception antennas 40E to 40H allow a device connected on a later stage to calculate a difference between voltages of the charged antenna elements 51 and 52, whereby the signals transmitted from the differential linear antennas 41 of the transmission antennas 40A to 40D can be acquired.

As above, the differential linear antennas 41 of the transmission antennas 40A to 40D and the differential linear antennas 41 of the reception antennas 40E to 40H performed communication in an extremely short distance and at a high frequency. Accordingly, communication using a Quasi-electrostatic field is performed in which Quasi-electrostatic field is predominant over an electromagnetic field and an induction field.

On the other hand, in the patch antenna 42 to be described later in detail, a feeding point is arranged at one end on a central line between the antenna elements 51 and 52 of the patch antenna 42.

In a case where the antenna 40 is used for transmission, a transmission signal out of transmission and reception signals, for example, that are compliant to the USB specifications is divided and is input to the feeding point of the patch antenna 42. On the other hand, in a case where the antenna 40 is used for reception, the patch antenna 42 outputs the signal received by the antenna from the feeding point to the outside (the reception LSI 137).

Accordingly, the patch antenna 42 of each of the transmission antennas 40A to 40D radiates the signal input to the feeding point as an electric wave. The patch antenna 42 of each of the reception antennas 40E to 40H can receive the electric wave radiated from the patch antenna 42 of each of the transmission antennas 40A to 40D that are arranged so as to face each other.

Since the patch antenna 42 has directivity in a direction perpendicular to the face of the patch antenna 42, it does not influence other antennas 40 that are arranged adjacently thereto.

In addition, the patch antenna 42 also serves as a ground plane that absorbs and mirror-images an electric field generated by the antenna elements 51 and 52 of the differential antenna 41.

[1-4-2. Structure of Antenna]

Figure 8:
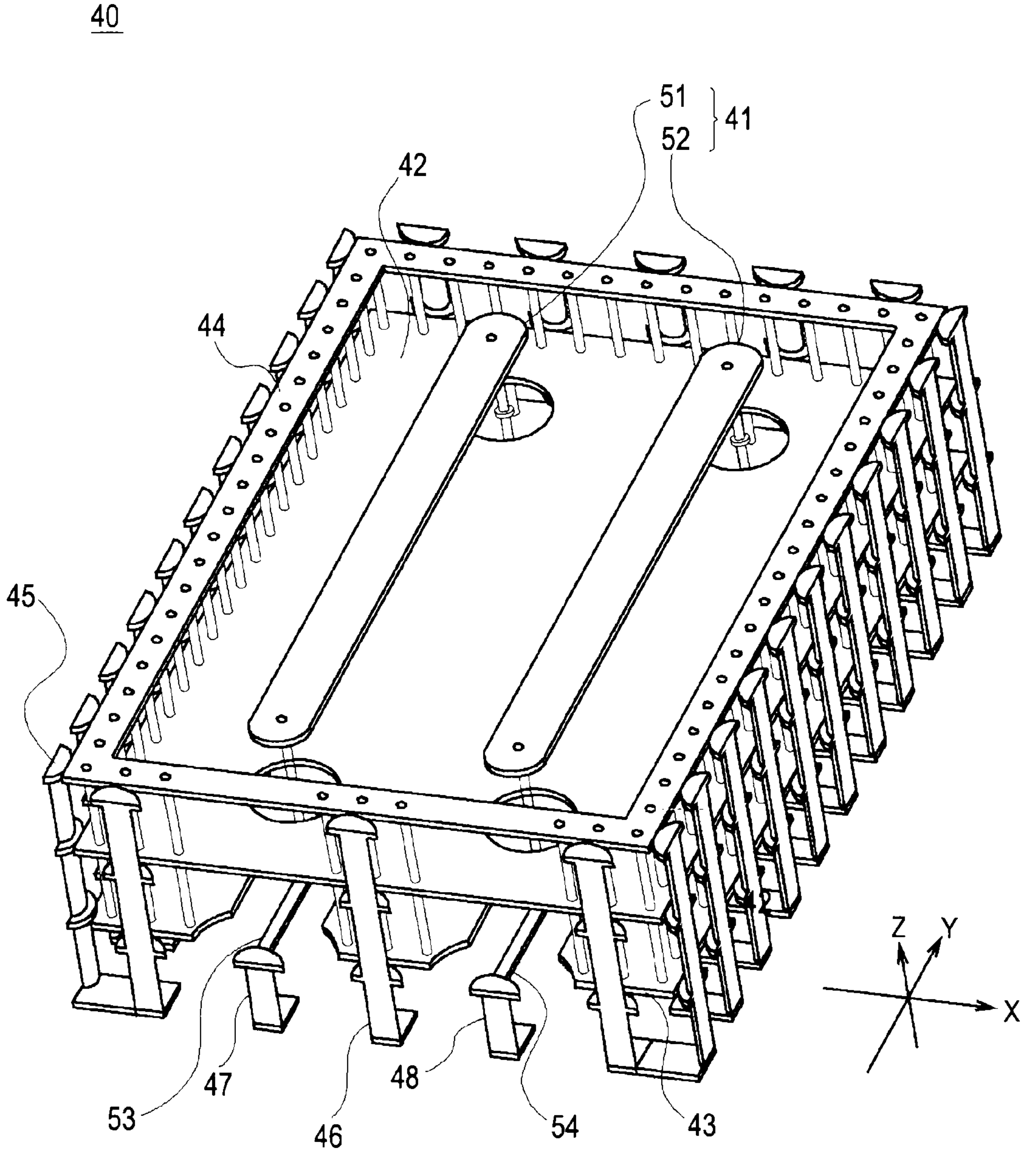
FIG. 8 is a schematic diagram illustrating a structure of an antenna.
Figure 9:
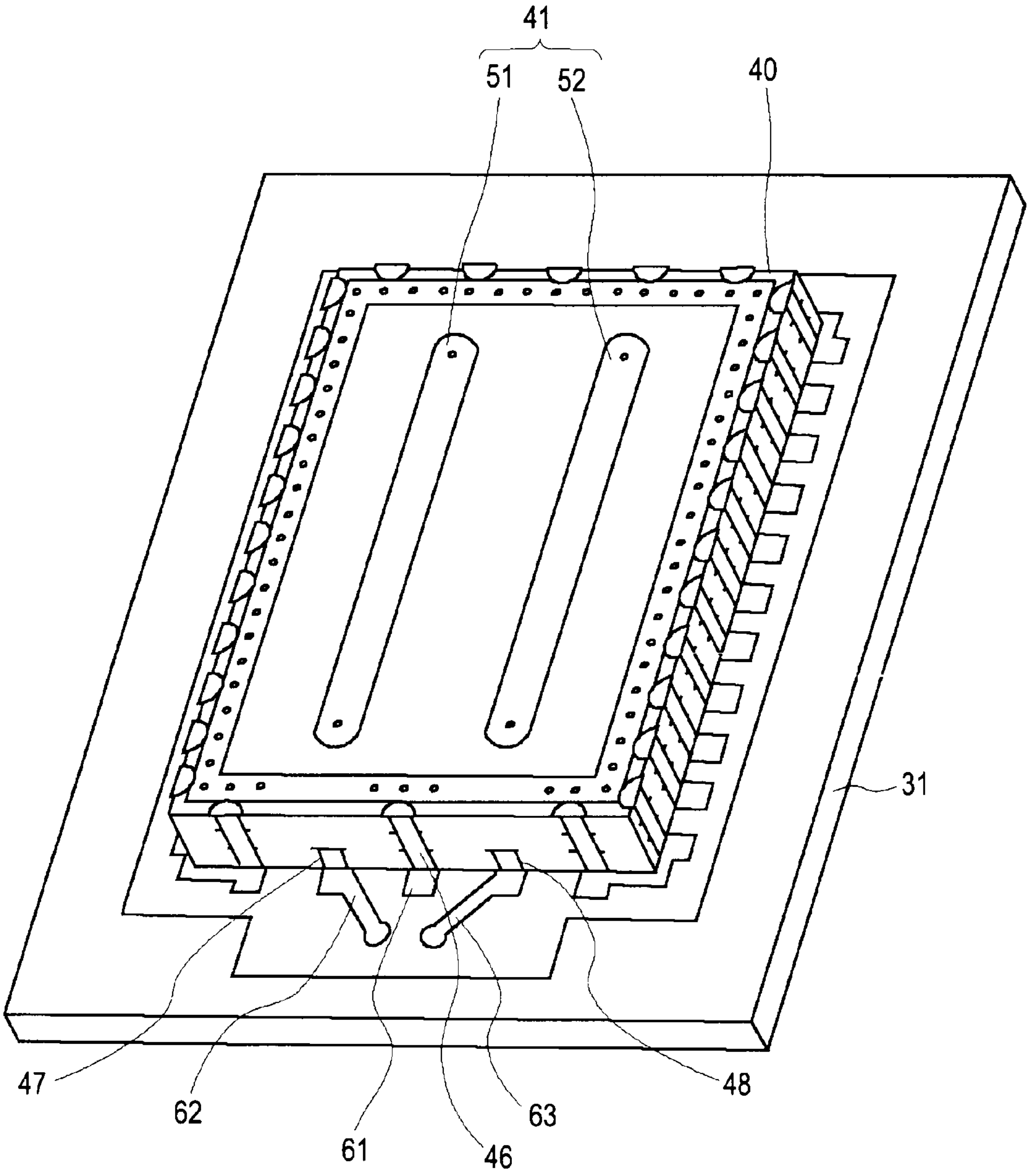
FIG. 9 is a schematic diagram illustrating a connection between an antenna and a substrate.

The actual antenna 40, as illustrated in FIGS. 8 and 9, is formed in an approximately rectangular parallelepiped having a width (the X-axis direction) of 8 mm, a depth (the Y-axis direction) of 11 mm, and a height (the Z-axis direction) of 1.5 mm. The antenna 40 illustrated in FIG. 8 represents only a metal portion, and, actually, as illustrated in FIG. 9, a ceramic material of a base member is embedded therein.

The antenna 40 has a four-layer structure. On an uppermost layer, the differential linear antenna 41 is arranged, and the patch antenna 42 is arranged on the second layer from the top. In addition, on the third layer from the top of the antenna 40, in order to adjust the impedance of the feeding portions 53 and 54, an impedance adjusting plate 43 formed so as to prepare a space that is apart from the feeding portions 53 and 54 by a predetermined distance is arranged, and a lowermost layer is connected to the substrate 31.

In the antenna 40, on the same plane (the uppermost layer) as that of the antenna elements 51 and 52 of the differential linear antenna 41, a shielding frame 44 is disposed so as to surround the antenna elements 51 and 52.

A distance between the shielding frame 44 and the antenna elements 51 and 52 is set such that the electric field generated between the antenna elements 51 and 52 changes the electric potentials of the antenna elements 51 and 52 of the opposing antenna 40 and does not influence other antennas 40 adjacently located on the same substrate 31.

In other words, in a case where the distance between the antenna elements 51 and 52 is too short, the coupling between the antenna element 51 and the antenna element 52 is strong, whereby the range influenced by the electric field becomes too narrow. Meanwhile, in a case where a distance between the shielding frame 44 and the antenna elements 51 and 52 is too short, the coupling between the antenna elements 51 and 52 and the shielding frame 44 becomes strong. Accordingly, the distance is set such that other adjacent antennas 40 are not influenced, and a signal can be reliably transmitted to an opposing antenna 40 in consideration of such factors.

In addition, each of 11 antennas 40 are arranged in the depth direction so as to be equally spaced, so that shielding posts 45 having a predetermined width surround the outer periphery of the antenna 40 with a height that is the same as that of the antennas 40, and five antennas are arranged so as to be equally spaced on one face in the width direction, and one antenna is arranged on each of both ends on the other face in the width direction. In addition, in the antenna 40, a feeding post 46 that has the same shape as that of the shielding post 45 is arranged in the center of the other face in the width direction.

The shielding post 45 and the feeding post 46 are connected to the shielding frame 44, the patch antenna 42 and, the impedance adjusting plate 43. In addition, the shielding post 45 is grounded to the ground through the substrate 31. The feeding post 46 is connected to a feeding line 61 that is printed on the substrate 31.

In the antenna 40, feeding posts 47 and 48 are arranged which connects feeding lines 62 and 63 printed on the substrate 31 and the feeding portions 53 and 54 between the feeding post 45 and the shielding post 44 on the other side in the width direction.

Figure 10:
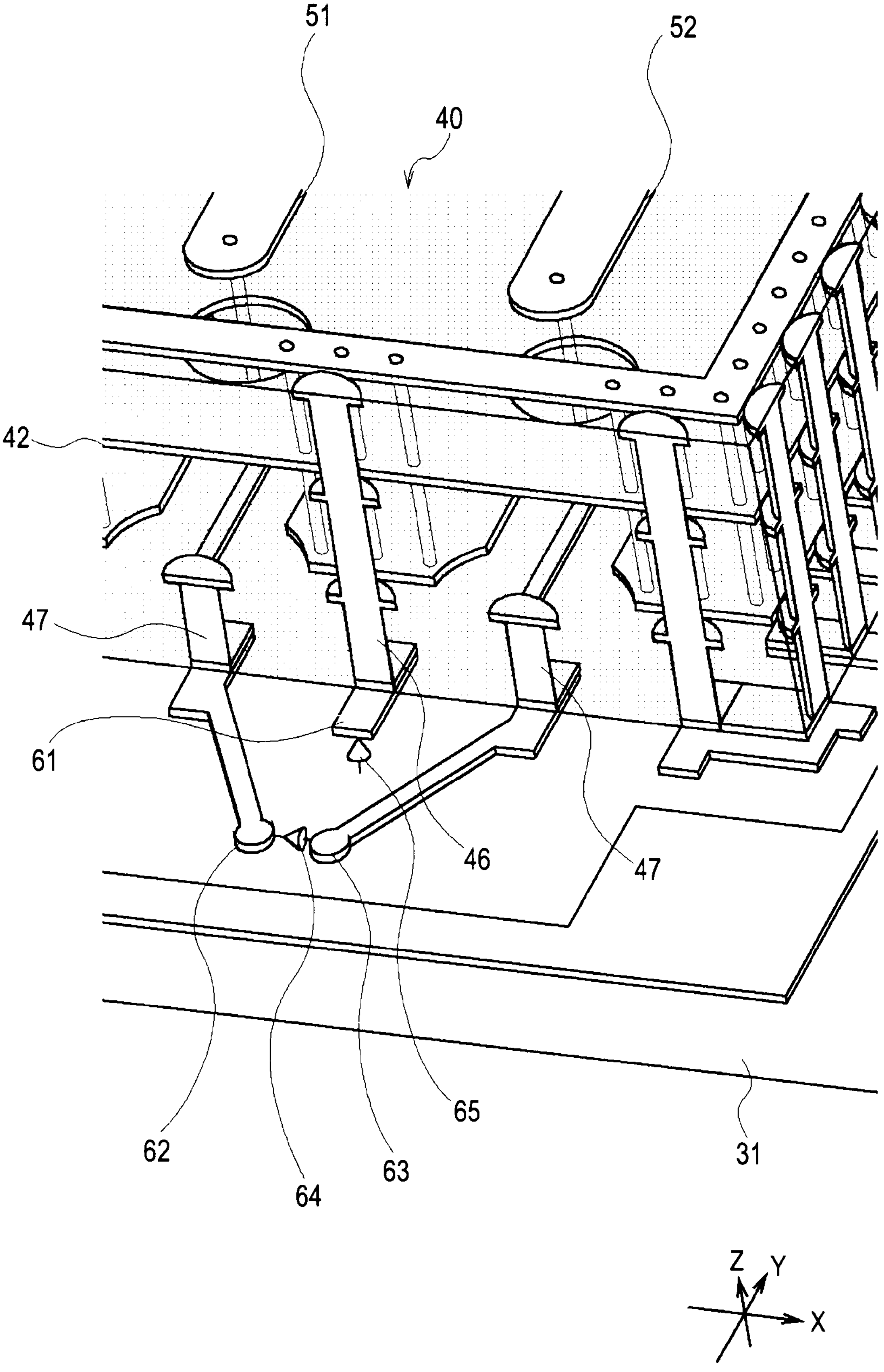
FIG. 10 is a schematic diagram illustrating a feeding point according to an embodiment.

In addition, in the antenna 40, as illustrated in FIG. 10, feeding points 64 that input signals having opposite polarities to the antenna elements 51 and 52 of the differential linear antenna 41 through the feeding lines 62 and 63 and the feeding posts 47 and 48.

In addition, in the antenna 40, a feeding point 65 is arranged which inputs a signal to the patch antenna 42 through the feeding line 61 and the feeding post 46. Accordingly, a signal is input to a connection point between the patch antenna 42 and the feeding post 46.

[1-4-3. Interference Between Differential Linear Antenna and Patch Antenna]

However, the antenna 40 as one antenna performs high-speed communication using the differential linear antenna 41 and low-speed communication using the patch antenna 42 through non-contact wireless communication, there may be interference from one side to the other side.

Figure 11:
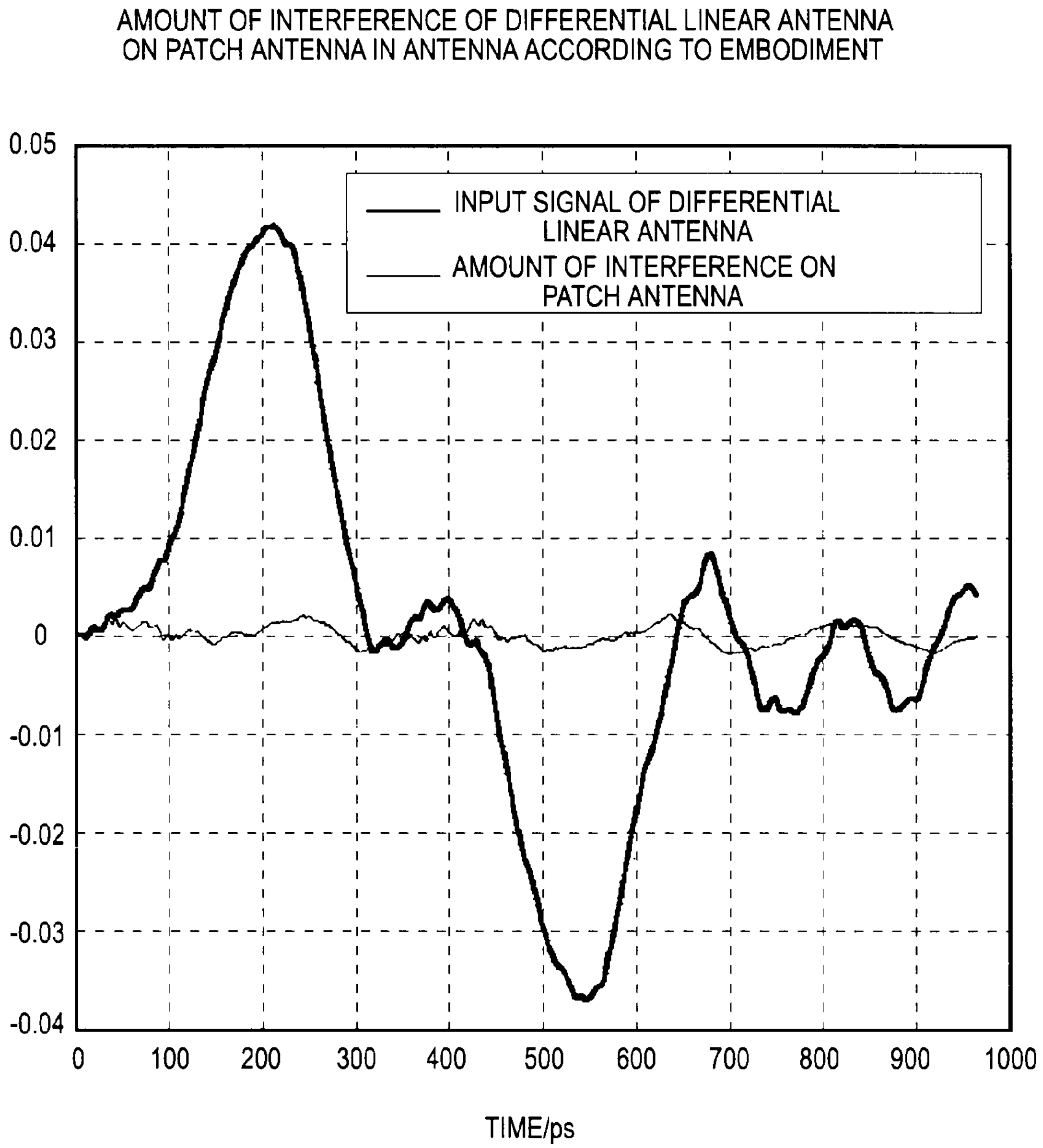
FIG. 11 is a graph illustrating the amount of interference from a differential linear antenna to a patch antenna of an antenna according to an embodiment.

The amount of interference of a signal output from the differential linear antenna 41 of each one of the transmission antennas 40A to 40D with the patch antenna 42 of one of the reception antennas 40E to 40H located at an opposite position is illustrated in FIG. 11.

Figure 12:
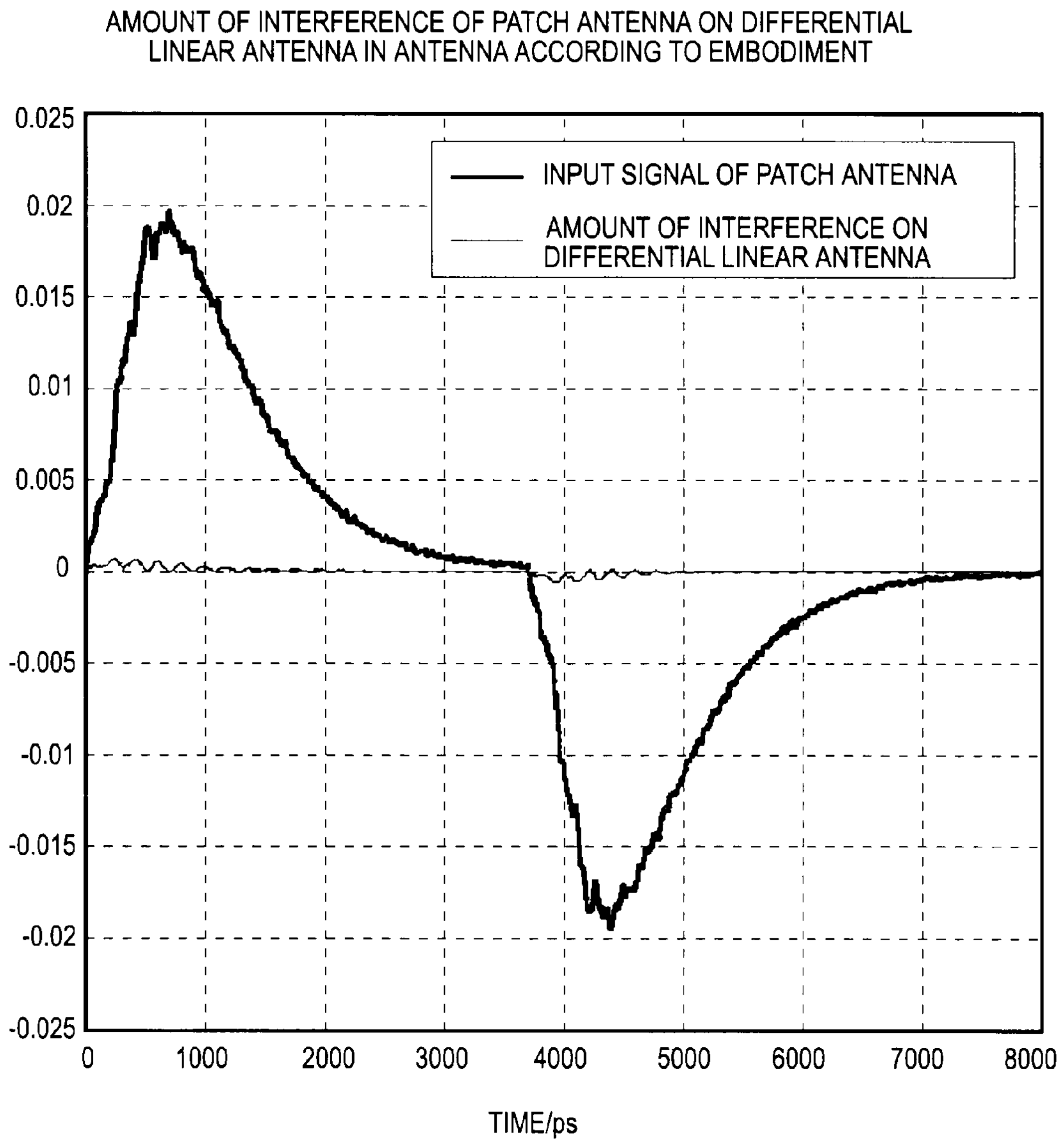
FIG. 12 is a graph illustrating the amount of interference from a patch antenna to a differential linear antenna in an embodiment.

In addition, the amount of interference of a signal output from the patch antenna 42 of each one of the transmission antennas 40A to 40D with the differential linear antenna 41 of one of the reception antennas 40E to 40H located at an opposite position is illustrated in FIG. 12.

In this experiment, signals having the same frequency are input to the differential linear antennas 41 and the patch antennas 42 of the transmission antennas 40A to 40D.

Figure 13:
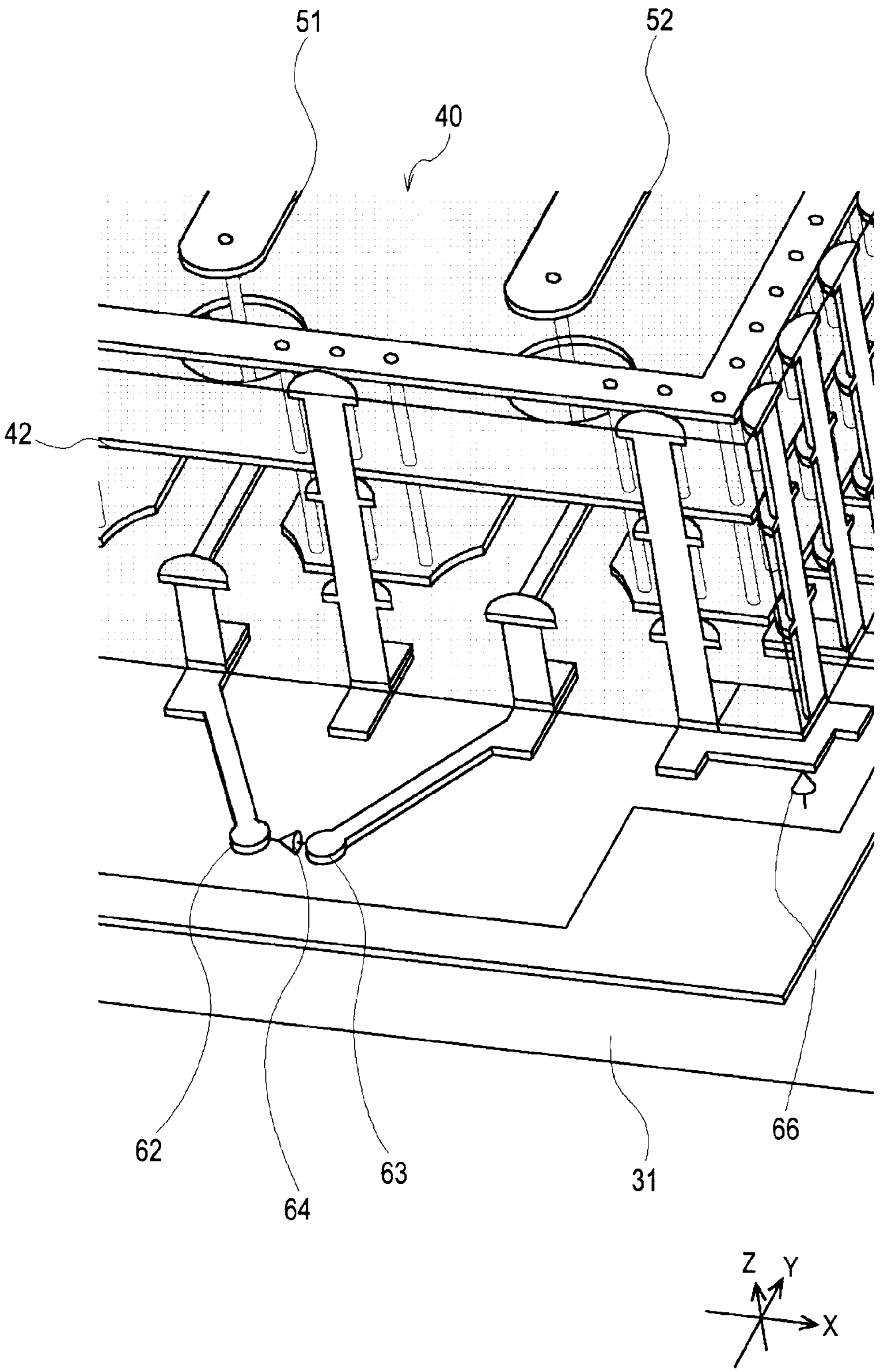
FIG. 13 is a schematic diagram illustrating a feeding point disposed on the corner of a patch antenna.
Figure 14:
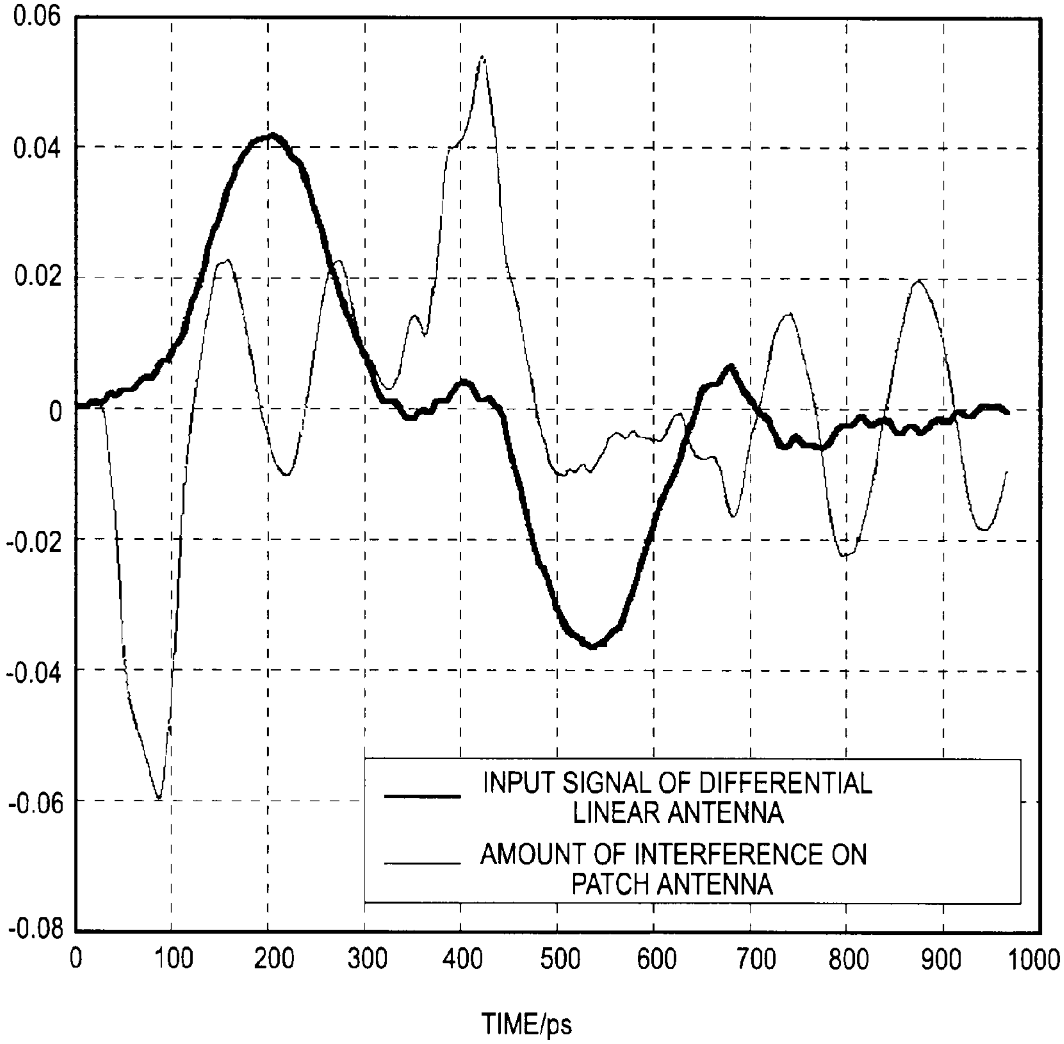
FIG. 14 is a graph illustrating the amount of interference from a differential linear antenna to a patch antenna in a case where a feeding point is disposed on the corner of a patch antenna.

For a comparison with this experiment result, the amount of interference of a signal output from the differential linear antenna 41 of each one of the transmission antennas 40A to 40D with the patch antenna 42 of one of the reception antennas 40E to 40H that is arranged at an opposite position is illustrated in FIG. 14 in a case where the feeding point 66 is disposed on the corner of the patch antenna 42 through the shielding post 45 as illustrated in FIG. 13.

Figure 15:
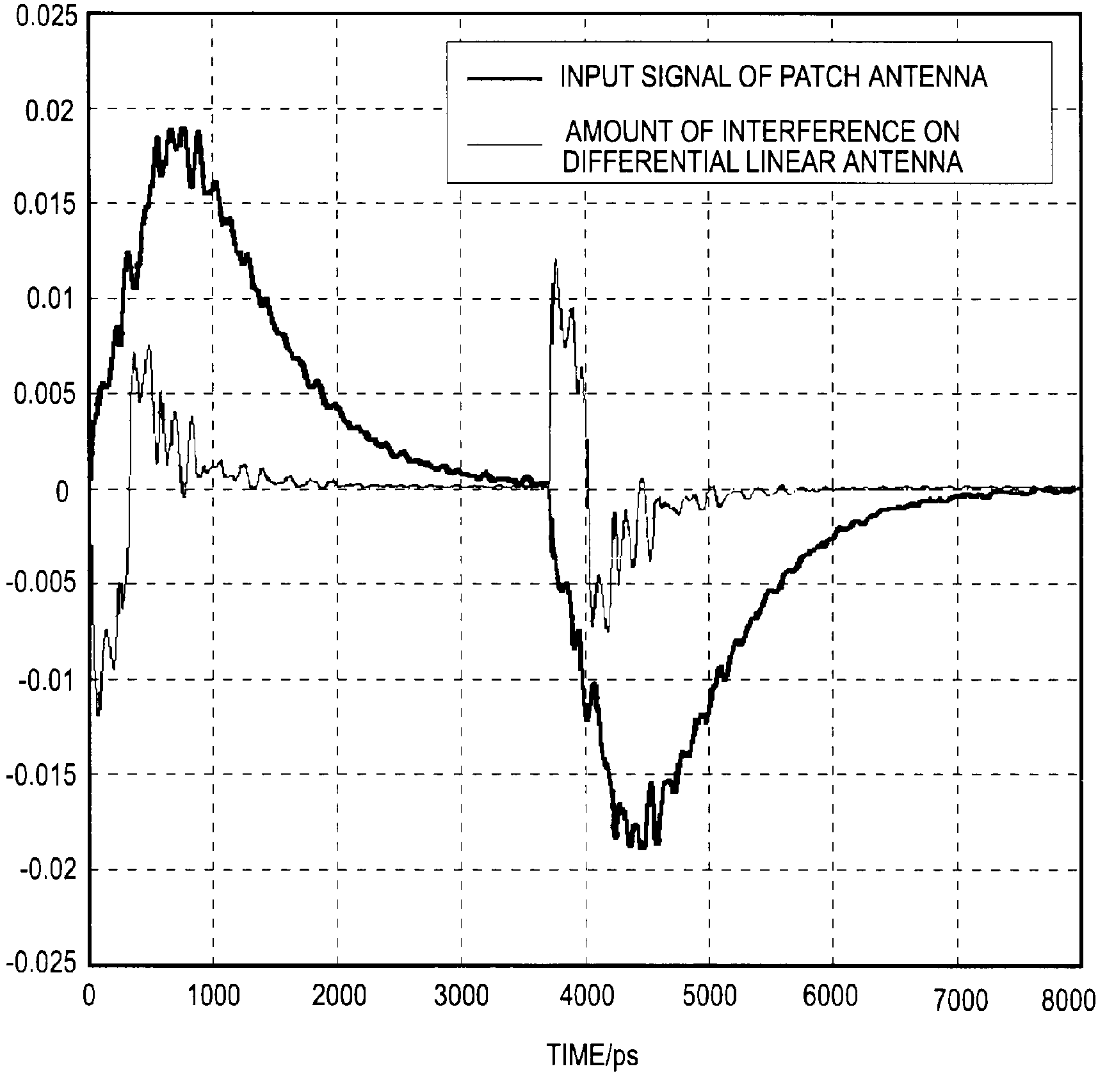
FIG. 15 is a graph illustrating the amount of interference from a patch antenna to a differential linear antenna in a case where a feeding point is disposed on the corner of a patch antenna.

In addition, a result of an experiment relating to the amount of interference of a signal output from the patch antenna 42 of each one of the transmission antennas 40A to 40D with the differential linear antenna 41 of one of the reception antennas 40E to 40H that is arranged at an opposite position in a case where the feeding point 66 is disposed on the corner of the patch antenna 42 through the shielding post 45 is illustrated in FIG. 15.

As is apparent in FIGS. 14 and 15, in the case where the feeding point 66 is disposed on the corner of the patch antenna 42, it is understood that each amount of interference is large, and it is difficult to perform independent communication. Particularly, the amounts of interference of the signals output from the differential linear antennas 41 of the transmission antennas 40A to 40D with the reception antennas 40E to 40H, which is illustrated in FIG. 14, are very large.

In contrast to this, as is apparent from FIG. 11, it is understood that the signals output from the differential linear antennas 41 of the transmission antennas 40A to 40D hardly interferes with the patch antennas 42 of the reception antennas 40E to 40H.

The reason for this is that signals having opposite polarities are input to the antenna elements 51 and 52 of the differential linear antenna 41 of each one of the transmission antennas 40A to 40D, the amounts of electrostatic coupling between the patch antenna 42 of each one of the reception antennas 40E to 40H and the antenna elements 51 and 52 are almost the same. In addition, since the differential linear antenna 41 is disposed on the center of the patch antenna 42, the presence of the differential linear antenna 41 does not have any influence on the directivity of the patch antenna 42, and accordingly, similarly to an ordinary patch antenna, the patch antenna 42 can be directly coupled.

Accordingly, the influences of the antenna elements 51 and 52 of the differential linear antenna 41 of each one of the transmission antennas 40A to 40D on the patch antennas 42 of the reception antennas 40E to 40H are negated with each so as to be nearly zero as a whole. As a result, there is hardly any interference.

In addition, as is also apparent from FIG. 12, it is understood that the differential linear antennas 41 of the reception antennas 40E to 40H are hardly interfered with signals output from the patch antennas 42 of the transmission antennas 40A to 40D.

Thus, the signals output from the patch antennas 42 of the transmission antennas 40A to 40D are received with almost the same magnitude by the antenna elements 51 and 52 of the differential linear antennas 41 of the reception antennas 40E to 40H.

However, as described above, since signals are received by differential linear antennas 41 of the reception antennas 40E to 40H by taking a difference of the electric potentials of the antenna elements 51 and 52, the signals from the patch antenna 42 are offset by calculating a difference thereof.

Accordingly, the differential linear antennas 41 of the reception antennas 40E to 40H are hardly interfered with the signals output from the patch antennas 42 of the transmission antennas 40A to 40D.

Thus, isolation between the communication performed between the differential linear antennas 41 and the communication performed between the patch antennas 42 is about −20 dB even in a case where the same frequency is used. Actually, the communication between the patch antennas 42 is performed by using a frequency that is about 1/10 of that used for the communication between the differential linear antennas 41, and accordingly, isolation of about −30 dB to −40 dB is acquired.

2. Electric Configuration of Data Transmission System

Next, the electric configuration of the data transmission system will be described.

[2-1. Electric Configuration of Personal Computer]

Figure 16:
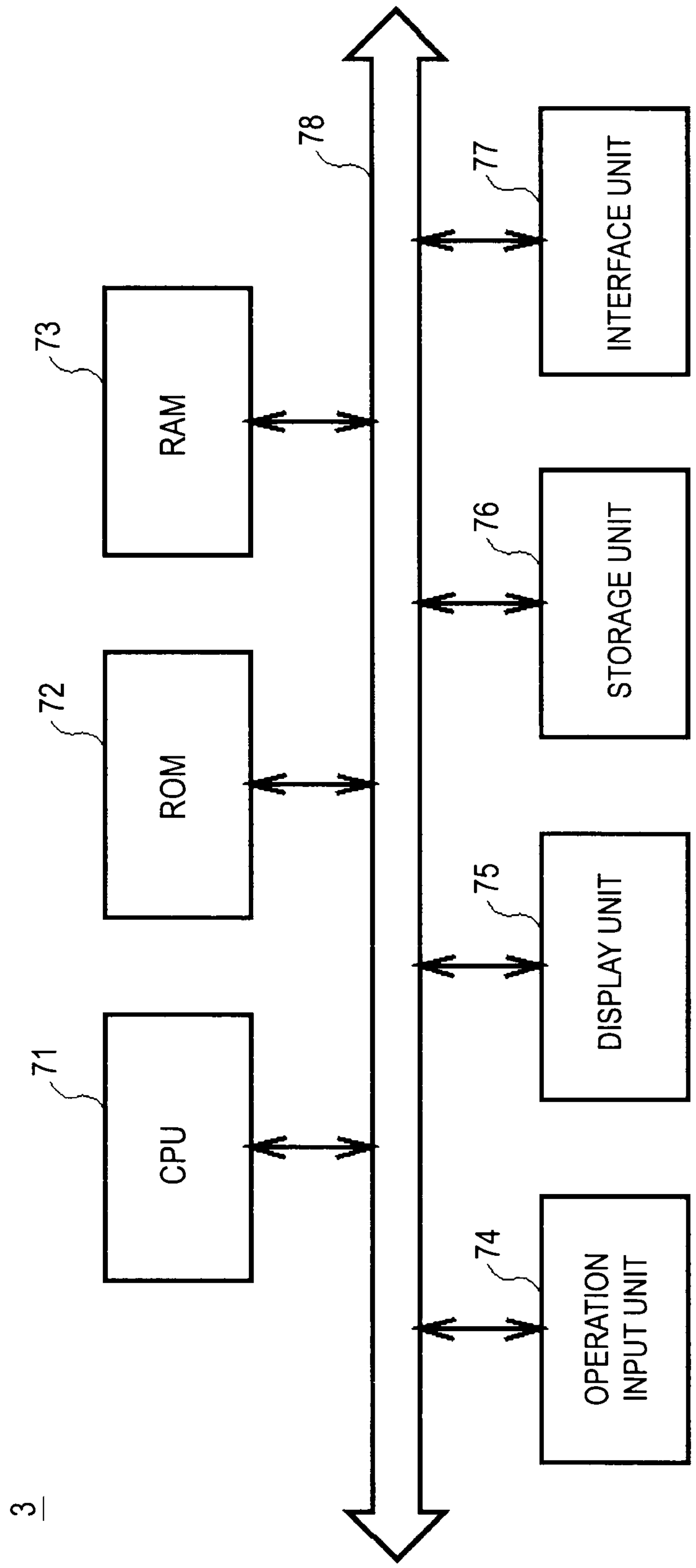
FIG. 16 is a schematic diagram illustrating the electrical configuration of a personal computer.

In the personal computer 3, as illustrated in FIG. 16, a CPU (Central Processing Unit) 71, a ROM (Read Only Memory) 72, a RAM (Random Access Memory) 73, an operation input unit 74, a display unit 75, a storage unit 76, and an interface unit 77 are interconnected through a bus 78.

The CPU 71 controls the overall operation by expanding a basic program, which is stored in the ROM 72, into the RAM 73 serving as a work memory and executing the basic program. In addition, the CPU 71 executes various programs by expanding an application program stored in the ROM 72 or the storage unit 76 into the RAM 73 and executing the application program.

As the operation input unit 74, a mouse, a keyboard, a touch panel, or the like is applied. As the display unit 75, a liquid crystal display, an organic EL (Electro-Luminescence) display, a Braun tube display, or the like is applied. As the storage unit 76, a magnetic disk, a flash memory, or the like is applied.

The interface unit 77 is connected to the dock 10 of the communication unit 2 through a predetermined cable.

[2-2. Electric Configuration of Communication Unit]

Figure 17:
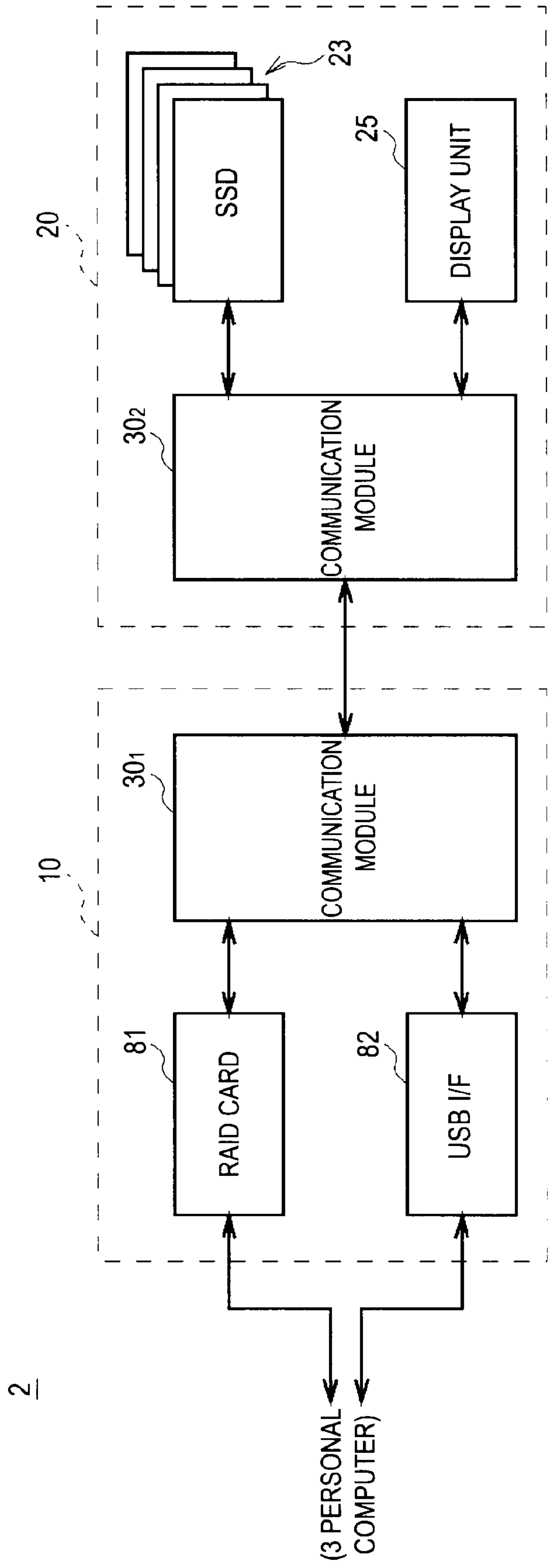
FIG. 17 is a schematic diagram illustrating an overview of the electrical configuration of a communication unit.

In the communication unit 2, as is schematically illustrated in FIG. 17, a RAID card 81 of the dock 10 and the SSD 23 of the storage device 20 are interconnected in a non-contact manner through the communication module $\mathbf{30}_1$ and the communication module $\mathbf{30}_2$.

In addition, in the communication unit 2, the USB interface 82 of the dock 10 and the SSDs 23A to 23D of the storage device 20 are connected to each other in a non-contact manner through the communication module $\mathbf{30}_1$ and the communication module $\mathbf{30}_2$.

The RAID card 81 and the USB interface 82 of the dock are connected to the personal computer 3 through a predetermined cable.

Figure 18:
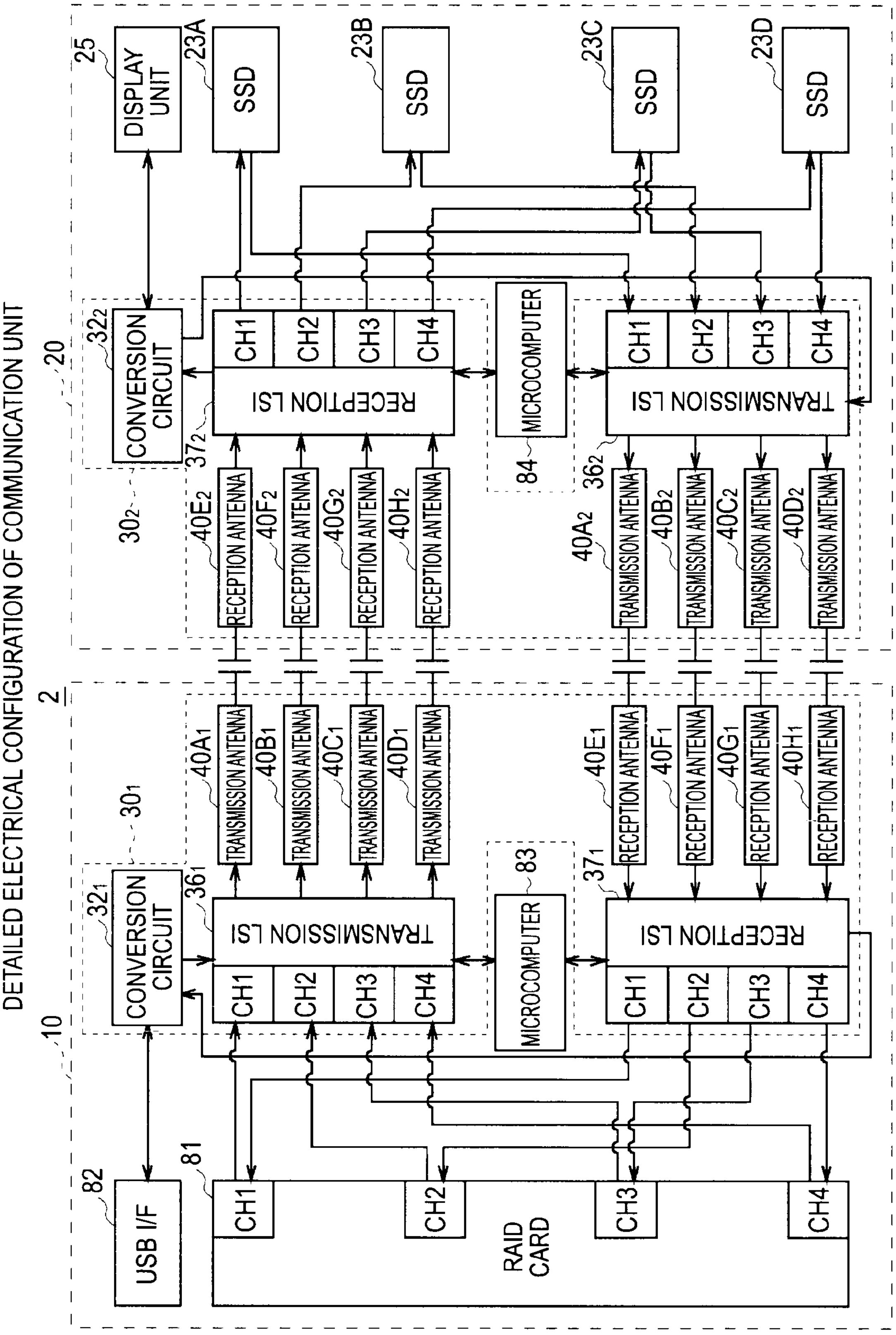
FIG. 18 is a schematic diagram illustrating the detailed electrical configuration of a communication unit.

The communication unit 2, as illustrated in detail in FIG. 18, microcomputers 83 and 84 that are respectively configured by a CPU, a ROM, a RAM, and the like are disposed in the dock 10 and the storage device 20.

The microcomputers 83 and 84 control the overall operations of the dock 10 and the storage device 20 by expanding a basic program stored in the ROM into the RAM and executing the basic program and performs various programs by expanding a program stored in the ROM into the RAM and executing the program.

The RAID card 81 is a device that builds a RAID configuration such as RAID0, RAID1, RAID5, or the like by using four SSDs 23A to 23D and includes interfaces of the SATA2 specifications, and SSDs 23A to 23D are connected to channels CH1 to CH4.

The RAID card 81 and the SSDs 23A to 23D simultaneously transmits and receives data through non-contact communication in a parallel manner in a form that is compliant to the SATA2 specifications.

In the transmission LSI 36 to be described in detail later, differential transmission circuits 91 and the transmission circuit 93 (FIG. 19) corresponding to the number of the channels (in this embodiment, four channels) of the RAID cards 81 are arranged. The LSI 36 is configured so as to simultaneously transmit data of each channel.

In the reception LSI 37, differential reception circuits 92 and reception circuits 94 (FIG. 19) corresponding to the number of channels (in this embodiment, four channels) of the RAID card 81 are arranged. The reception LSI 37 is configured so as to simultaneously receive data of each channel.

In a case where data output from the personal computer 3 is to be stored in the SSD 23, the RAID card 81 sets the SSD 23 in which the data output from the personal computer 3 is stored and outputs the data to the set SSD 23.

For example, when the data is stored in the SSD 23A, the RAID card 81 outputs the data from CH1 that is connected to the SSD 23A. The output signal is input to the channel CH1 of a transmission LSI $\mathbf{36}_1$. The transmission LSI $\mathbf{36}_1$ performs waveform shaping such that the data input to the channel CH1 can be transmitted by the transmission antenna $\mathbf{40}A_1$ and outputs a resultant signal as a transmission signal to the differential linear antenna 41 of the transmission antenna $\mathbf{40}A_1$.

The transmission signal output from the differential linear antenna 41 of the transmission antenna $\mathbf{40}A_1$ is received by the differential linear antenna 41 of the reception antenna $\mathbf{40}E_2$ of the storage device 20 as a reception signal and is input to the channel CH1 of a reception LSI $\mathbf{37}_2$. The reception LSI $\mathbf{37}_2$ performs waveform shaping for the reception signal received by the reception antenna $\mathbf{40}E_2$ and transmits a resultant signal to the SSD 23A as data so as to be stored.

In a case where data is stored in the SSDs 23B to 23D, similarly to the case of the SSD 23A, data is output from the channels CH2 to CH4 of the RAID card 81 and is output as transmission signals by the differential linear antennas 41 of the transmission antennas $\mathbf{40}B_1$ to $\mathbf{40}D_1$ through the channels CH2 to CH4 of the transmission LSI $\mathbf{36}_1$. Then, the transmission signals are received by the differential linear antennas 41 of the reception antennas $\mathbf{40}F_2$ to $\mathbf{40}H_2$ of the storage device 20 as reception signals and are stored in the SSDs 23B to 23D through the channels CH2 to CH4 of the reception LSI $\mathbf{37}_2$.

On the other case, in a case where data stored in the SSD 23 is output to the personal computer 3, the RAID card 81 specifies a storage area of data as an output target and reads out data from the SSD 23 as the storage area.

For example, in a case where data is read out from the SSD 23A, the data read out from the SSD 23A is input to the channel CH1 of a transmission LSI $\mathbf{36}_2$, is shaped in the waveform, and is output to the differential linear antenna 41 of the transmission antenna $\mathbf{40}A_2$ as a transmission signal.

The transmission signal output from the differential linear antenna 41 of the transmission antenna $\mathbf{40}A_2$ is received by the differential linear antenna 41 of the reception antenna $\mathbf{40}E_1$ of the dock 10 as a reception signal and is input to the channel CH1 of a reception LSI $\mathbf{37}_1$. The reception LSI $\mathbf{37}_1$ performed waveform shaping for the reception signal received by the reception antenna $\mathbf{40}E_1$ and transmits a resultant signal to the channel CH1 of the RAID card 81 as data. The RAID card 81 reads out the data stored in the SSD 23A by receiving data input from the channel CH1.

In addition, in a case where data stored in the SSDs 23B to 23D are read out, similarly to the case of the SSD 23A, the data is output from the SSDs 23B to 23D and is output as transmission signals by the differential linear antennas 41 of the transmission antennas $\mathbf{40}B_2$ to $\mathbf{40}D_2$ through the channels CH2 to CH4 of the transmission LSI $\mathbf{36}_2$. Then, the transmission signals are received by the differential linear antennas 41 of the reception antennas $\mathbf{40}F_1$ to $\mathbf{40}H_1$ of the dock 10 as reception signals and are input to the channels CH2 to CH4 of the RAID card 81 through the reception LSI $\mathbf{37}_1$.

As described above, the RAID card 81 and the SSD 23 performs non-contact communication by using the differential linear antennas 41 of the transmission antennas 40A to 40D and the reception antennas 40E to 40H, and accordingly, data can be transmitted and received at a maximum of 6 Gbps. In other words, communication corresponding to the maximum transmission rate of the SATA2 specifications can be performed in a non-contact manner.

In a case where data to be displayed on the display unit 25 is input to the dock 10 from the personal computer 3 through the USB interface 82, the data is input to a conversion circuit $\mathbf{32}_1$. The conversion circuit $\mathbf{32}_1$ transmits the input data to the transmission LSI $\mathbf{36}_1$ as transmission data.

The transmission LSI $\mathbf{36}_1$ performs waveform shaping for the input transmission data so as to be able to be transmitted by the transmission antenna $\mathbf{40}A_1$ and outputs a resultant signal to the patch antenna 42 of the transmission antenna $\mathbf{40}A_1$ as a transmission signal.

The transmission signal output from the patch antenna 42 of the transmission antenna $\mathbf{40}A_1$ is received by the patch antenna 42 of the reception antenna $\mathbf{40}E_2$ of the storage device 20 as a reception signal and is input to the reception LSI $\mathbf{37}_2$. The reception LSI $\mathbf{37}_2$ performs waveform shaping for the reception signal received by the patch antenna 42 of the reception antenna $\mathbf{40}E_2$ and transmits a resultant signal to a conversion circuit $\mathbf{32}_2$ as reception data.

The conversion circuit $\mathbf{32}_2$ converts the reception data input from the reception LSI $\mathbf{37}_2$ into a half-duplex mode and transmits the converted data to the display unit 25. The display unit 25 displays a display screen corresponding to the supplied transmission data.

On the other hand, in a case where data is transmitted from the display unit 25 to the personal computer 3, the data output from the display unit 25 is input to the conversion circuit $\mathbf{32}_2$. The conversion circuit $\mathbf{32}_2$ transmits the input data as transmission data to the transmission LSI $\mathbf{36}_2$. The transmission LSI $\mathbf{36}_2$ performs waveform shaping for the input transmission data and outputs a resultant signal as a transmission signal to the patch antenna 42 of the transmission antenna $\mathbf{40}A_2$.

The transmission signal output from the patch antenna 42 of the transmission antenna $\mathbf{40}A_2$ is received by the patch antenna 42 of the reception antenna $\mathbf{40}E_1$ of the dock 10 and is input to the channel CH1 of the reception LSI $\mathbf{37}_1$. The reception LSI $\mathbf{37}_1$ performs waveform shaping for the reception signal received by the reception antenna $\mathbf{40}E_1$ and transmits a resultant signal to the conversion circuit $\mathbf{32}_1$ as reception data. The conversion circuit $\mathbf{32}_1$ converts the reception data input from the reception LSI $\mathbf{37}_1$ into a half-duplex mode and outputs the converted data to the personal computer 3 through the USB interface 82.

As above, the personal computer 3 and the display unit transmit and receive data by performing non-contact communication using the patch antennas 42 of the transmission antenna 40A to 40D and the reception antennas 40E to 40H.

In this embodiment, the communication corresponding to only one channel is performed in the USB. Accordingly, non-contact communication is not performed between the patch antennas 42 of the transmission antenna $\mathbf{40}B_1$ to $\mathbf{40}D_1$ and the reception antennas $\mathbf{40}F_1$ to $\mathbf{40}H_1$ of the dock 10 and the patch antennas 42 of the transmission antennas $\mathbf{40}F_2$ to $\mathbf{40}H_2$ and the transmission antennas $\mathbf{40}B_2$ to $\mathbf{40}D_2$ of the storage device 20.

[2-3. Configuration of Transmission LSI and Reception LSI]

Figure 19:
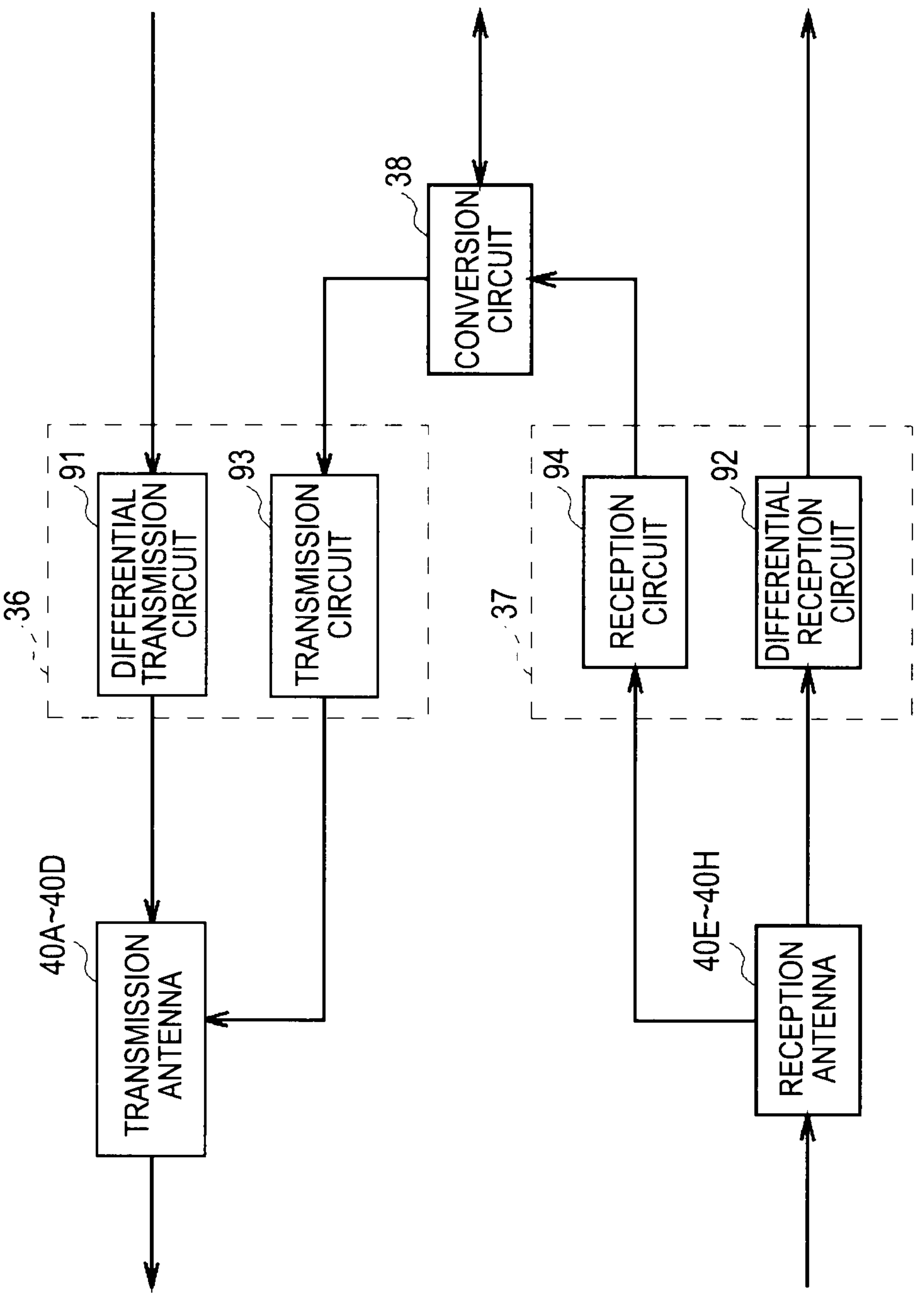
FIG. 19 is a schematic diagram illustrating the configuration of a transmission LSI and a reception LSI.

The transmission LSI 36, as illustrated in FIG. 19, is configured so as to include a differential transmission circuit 91 and a transmission circuit 93 corresponding to each channel and the like. In addition, the reception LSI 37 is configured so as to include a differential reception circuit 92 and a reception circuit 94 corresponding to each channel and the like. Although not shown in the figure, in each of the transmission LSI 36 and the reception LSI 37, a control circuit that controls the overall operation of the transmission LSI 36 or the reception LSI 37, a register that temporarily stores data, an equalizer that shapes the waveform, an emphasis/de-emphasis circuit, and the like are included.

In FIG. 19, although only the differential transmission circuit 91 and the transmission circuit 93 corresponding to one channel are illustrated in the transmission LSI 36, actually differential transmission circuits 91 and transmission circuits 93 corresponding to other three channels are arranged therein. Similarly, although only the differential reception circuit 92 and the reception circuit are illustrated in the reception LSI 37, actually, differential reception circuits 92 and reception circuits 94 corresponding to other three channels are arranged therein.

Although the transmission LSI 36 and the reception LSI 37 have the same circuit configuration, to be described later, they are configured so as to serve for the purposes of transmission and reception based on the control of the microcomputers 83 and 84.

Figure 20:
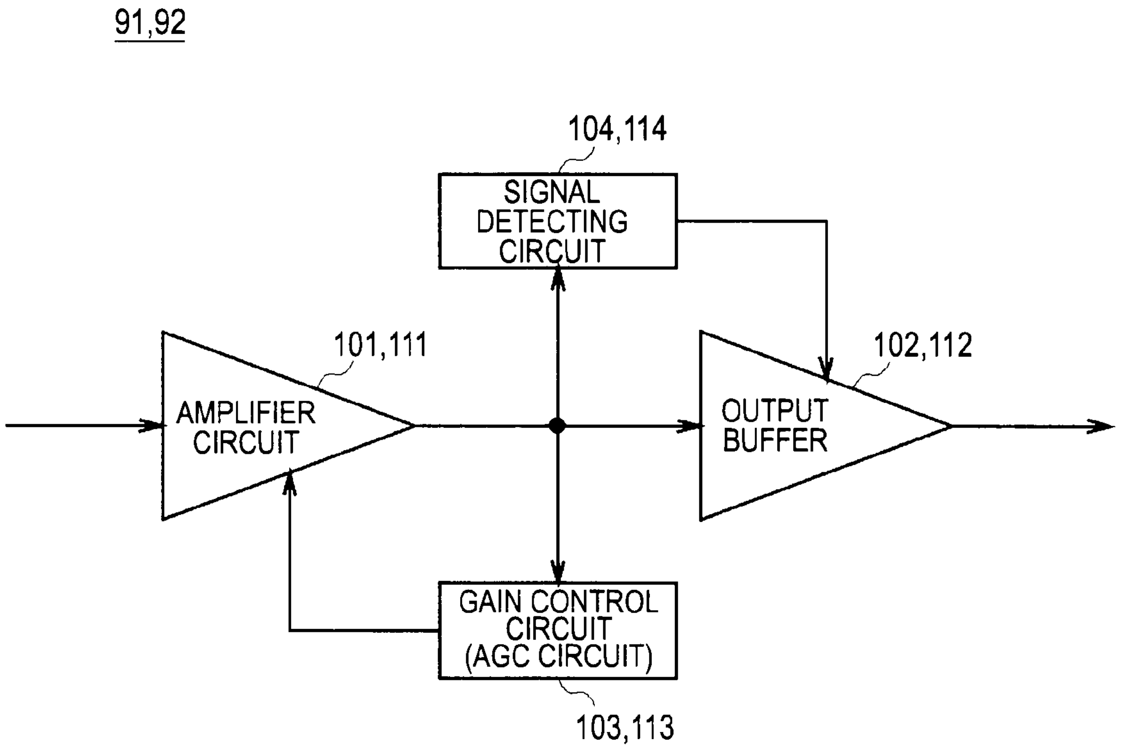
FIG. 20 is a schematic diagram illustrating the configuration of a differential transmission circuit and a differential reception circuit.

The differential transmission circuit 91 of the transmission LSI 36, as illustrated in FIG. 20, is configured by an amplifier circuit 101, an output buffer 102, an automatic gain control circuit (hereinafter, this will be referred to as an AGC circuit) 103 and a signal detecting circuit 104.

Data of a constant voltage (1.2 V) compliant with the SATA2 specifications is input from the RAID card 81 or the SSD 23 to the amplifier circuit 101. Accordingly, input data that is input with the function thereof is invalidated is directly output to the output buffer 102, the AGC circuit 103, and the signal detecting circuit 104. In addition, for the same reason as the amplifier circuit 101, the function of the AGC circuit 103 is invalidated.

In a case a signal indicating validness, which is supplied from the signal detecting circuit 104, is supplied, the output buffer 102 transmits the data input from the amplifier circuit 101. On the other hand, the output buffer 102 does not transmit the data input from the amplifier circuit 101 until a signal indicating validness is supplied.

The signal detecting circuit 104 detects the input of a signal from the amplifier circuit 101, transmits a signal indicating the input to the microcomputer 83 or 84, and transmits a signal used for validating the output buffer 102 to the output buffer 102 under the control of the microcomputer 83 or 84.

On the other hand, the differential reception circuit 92 is configured by an amplifier circuit 111, an output buffer 112, an AGC circuit 113, and a signal detecting circuit 114.

The amplifier circuit 111 amplifies an input signal (a reception signal received from the differential linear antenna 41 of any of the reception antennas 40E to 40H) in accordance with an amplification factor that is supplied from the AGC circuit 113. Then, the amplifier circuit 111 transmits the amplified reception signal to the output buffer 112, the AGC circuit 113, and the signal detecting circuit 114.

In a case a signal indicating validness, which is supplied from the signal detecting circuit 114, is supplied, the output buffer 112 transmits the data input from the amplifier circuit 111. On the other hand, the output buffer 112 does not transmit the data input from the amplifier circuit 111 until a signal indicating validness is supplied.

The AGC circuit 113 calculates an amplification factor for which the voltage of the reception signal supplied from the amplifier circuit 111 is the voltage (1.2 V) that is compliant with the SATA2 specifications set in advance, stores the amplification factor in a register, and transmits the amplification factor to the amplifier circuit 111.

Here, as a method of calculating the amplification factor by using the AGC circuit 113, a method may be used in which the voltage of the reception signal supplied from the amplifier circuit 111 is directly measured for calculating the amplification factor. In addition, in a case where it is difficult to measure the voltage by using a high frequency such as 6 GHz, a method may be used in which the amplification factor is optimized by detecting a deviation in the direction of time, for example, as disclosed in JP-A-2009-60415.

The signal detecting circuit 114 detects the input of a signal from the amplifier circuit 111, transmits a signal indicating the input to the microcomputer 83 or 84, and transmits a signal used for validating the output buffer 102 to the output buffer 102 under the control of the microcomputer 83 or 84.

The transmission circuit 93 of the transmission LSI 36 performs waveform shaping for the transmission data supplied from the conversion circuit 32 and outputs a resultant signal to the patch antenna 42 of one of the transmission antennas 40A to 40D as a transmission signal.

On the other hand, the reception circuit 94 of the reception LSI 37 amplifies the reception signal received by the patch antenna 42 of one of the reception antennas 40E to 40H to be a constant voltage, performs waveform shaping for the amplified reception signal, and transmits a resultant signal to the conversion circuit 32 as reception data.

As above, the dock 10 and the storage device 20 perform high-speed communication between the RAID card 81 and the SSD that is compliant with the SATA2 specifications and low-speed communication between the personal computer 3 and the display unit 25 that is compliant with the USB specifications based on non-contact communication through the transmission antennas 40A to 40D and the reception antenna 40E to 40H.

3. Position Control Process

Next, a position control process that is performed by the microcomputer 83 of the dock 10 and the microcomputer 84 of the storage device 20 will be described.

[3-1. Effects of Positional Deviation Between Antennas]

As described above, an antenna $\mathbf{40}_1$ arranged in the communication module $\mathbf{30}_1$ disposed in the dock 10 and an antenna $\mathbf{40}_2$ arranged in the communication module $\mathbf{30}_2$ disposed in the storage device 20, which are arranged so as to face each other, perform communication in a non-contact manner.

At this time, the differential linear antennas 41 of the antenna 40 communicate with one another through a Quasi-electrostatic field of which the intensity attenuates in inverse proportion to the cube of a distance. Accordingly, the amount of the deviation from the distance between the antennas 40, which is set in advance, has great effect on the communication status.

More specifically, the differential linear antennas 41 of the antennas 40 that are arranged so as to face each other are set (designed) to be used at the same position on the XY plane and separated by 1 mm in the Z axis direction. Hereinafter, positions at which relative positions of the antennas 40 arranged so as to face each other are the same position on the XY plane and are separated by 1 mm in the Z axis direction are referred to as reference positions. In addition, a distance between the antennas 40 that is set in advance, that is, a distance separated by 1 mm in the Z axis direction is also referred to as a reference distance.

Figure 21:
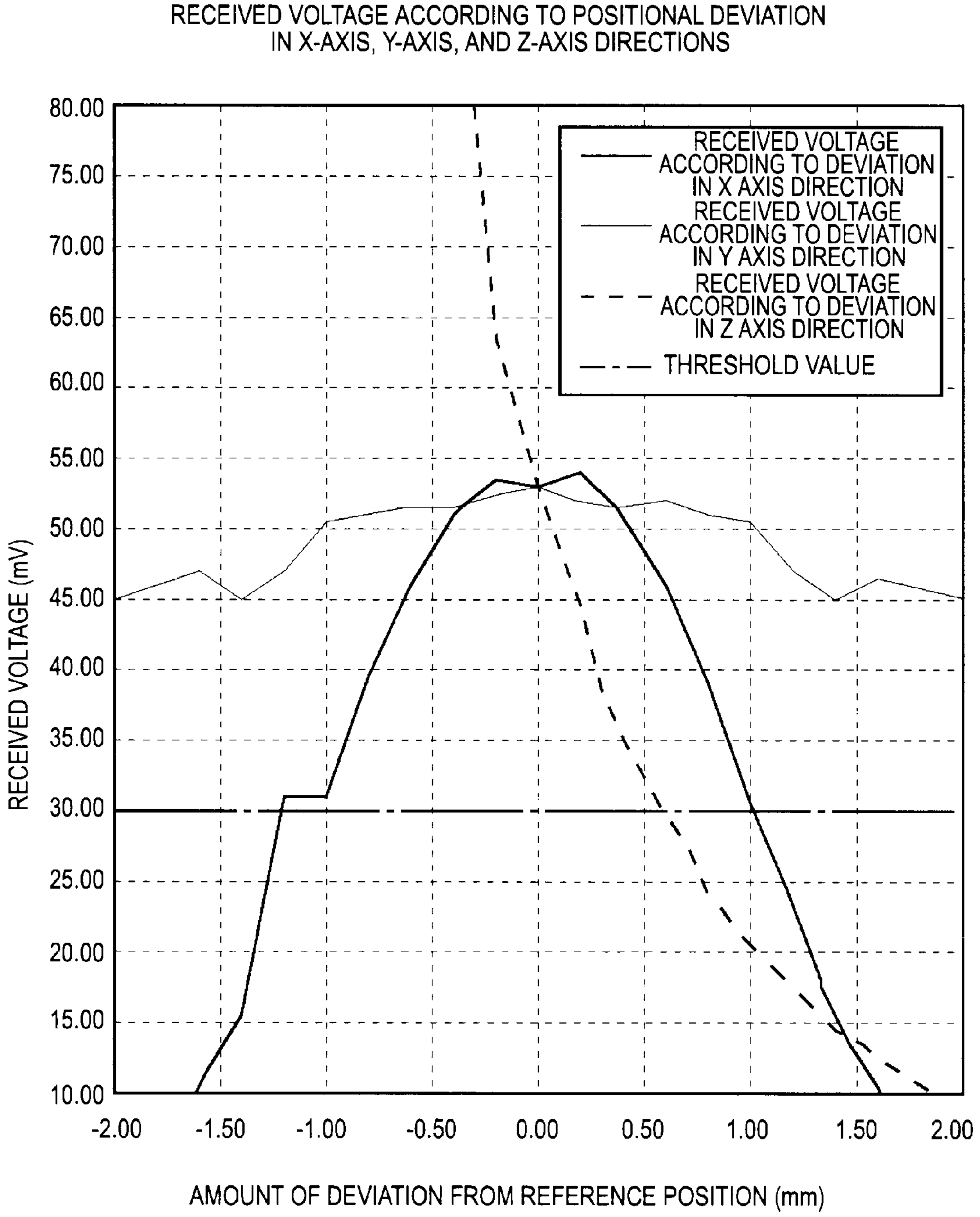
FIG. 21 is a schematic diagram illustrating received voltages for positional deviations in the X axis, Y axis, and Z axis directions.

A result of simulation of voltages (reception voltages) is illustrated in FIG. 21 when transmission signals output from the differential linear antennas 41 of the transmission antennas 40A to 40D are received by the differential linear antennas 41 of the reception antennas 40E to 40H in a case where the relative positions of the antennas 40 arranged so as to face each other are moved (deviated) from the reference positions in the directions of the X axis, the Y axis, and the Z axis.

In FIG. 21, the voltage of the transmission signal input to the differential linear antennas 41 of the transmission antennas 40A to 40D is 1.2 V (1200 mV). In addition, a limit value (hereinafter, this is also referred to as a threshold value) of the voltage of the reception signal that can be received by the differential linear antennas 41 of the reception antennas 40E to 40H is set as 30 mV.

In addition, in FIG. 21, the amount of deviation from the reference position in the Z axis direction is positive in a direction in which the distance between the antennas 40 arranged so as to face each other becomes longer and is negative in a direction the distance becomes shorter.

Furthermore, in FIG. 21, the antenna 40 has a symmetrical structure with respect to the X axis and the Y axis. Accordingly, the amount of deviation of the reception voltage in the X axis direction and the Y axis direction basically has a symmetry in the positive direction and the negative direction.

As is apparent from FIG. 21, when the antennas 40 arranged so as to face each other are located at the reference positions, the reception voltage is an optimal value of about 53 mV.

In addition, in a case where the relative positions of the antennas 40 arranged so as to face each other are moved from the reference positions in the Y axis direction, even when a movement distance, that is, the amount of deviation between the antennas 40 is ±2 mm, the reception voltage is not lower than the threshold value. Accordingly, the amount of deviation with respect to the Y axis direction can be practically ignored.

On the other hand, in a case where the relative positions of the antennas 40 arranged so as to face each other are moved from the reference positions in the X axis direction, when the amount of deviation exceeds about ±1 mm, the reception voltage becomes lower than the threshold value. Thus, there is a tolerance level of ±1 mm with respect to the X axis direction, and accordingly, the tolerance level can be sufficiently assured with machine accuracy to be described later.

In addition, in a case where the distance between the antennas 40 arranged so as to face each other are moved from the reference positions (reference distance) in the Z axis direction, when the distance between the antennas 40 exceeds 1.5 mm (+0.5 mm in FIG. 21), the reception voltage becomes lower than the threshold value. Although the reception voltage becomes higher as the distance between the antennas 40 is shortened, the reception voltage becomes farther from an optimal value (about 53 mV), and the tolerance level is up to 0.75 mm (−0.25 mm in FIG. 21).

Accordingly, the tolerance level for the distance between the antennas 40 arranged so as to face each other with respect to the Z axis direction is 0.75 mm to 1.5 mm. This is smaller than the tolerance level for the amounts of deviation with respect to the X axis direction and the Y axis direction to a large extent, and it is difficult to assure the tolerance level under the machine accuracy. Accordingly, it is necessary to adjust the distance between the antenna $\mathbf{40}_1$ arranged in the communication module $\mathbf{30}_1$ disposed in the dock 10 and the antenna $\mathbf{40}_2$ arranged in the communication module $\mathbf{30}_2$ disposed in the storage device 20.

Figure 22:
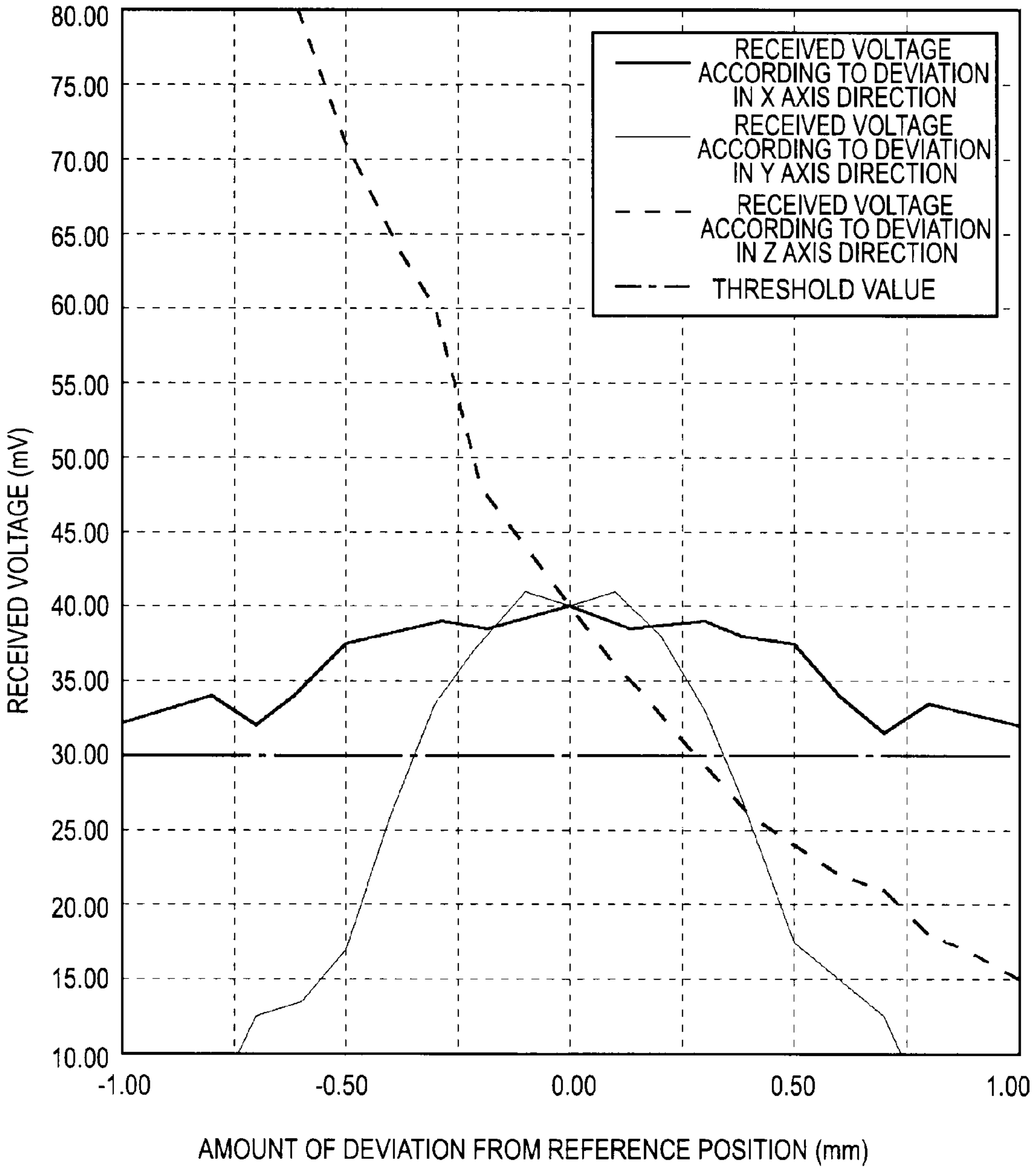
FIG. 22 is a graph illustrating received voltages for positional deviations in the X axis, the Y axis, and the Z axis directions in a case where eight antennas are aligned in the X axis direction.

In addition, a result of simulation similar to that shown in FIG. 21 in a case where the antennas 40 are reduced by a half, so that each eight antennas are aligned with being equally spaced in the X axis direction on a substrate having a size equal to the substrate 31 of the communication module 30 is illustrated in FIG. 22.

As can be understood from FIG. 22, the tolerance levels of the amounts of deviation between the antennas 40 arranged so as to face each other with respect to the X axis direction, the Y axis direction, and the Z axis direction are ±0.4 mm, ±2.0 mm, and 0.5 mm to 1.2 mm.

As above, it can be understood that the position accuracy not only in the Z axis direction but also in the X axis direction becomes more strict by decreasing the size of the antennas. Furthermore, in a case where the number of the antennas is increased, the tolerance level is further narrowed, and accordingly, the position accuracy becomes more strict.

[3-2. Factors Causing Positional Deviation Between Antennas]

As factors causing the positional deviation between the antenna $\mathbf{40}_1$ arranged in the communication module $\mathbf{30}_1$ disposed in the dock 10 and the antenna $\mathbf{40}_2$ arranged in the communication module $\mathbf{30}_2$ disposed in the storage device 20, the following errors may be considered.

[3-2-1. Machine Error]

As a first error, there is a machine error that is generated when units of the dock 10 and the storage device 20 are manufactured. Such an error is considered as about 500 μm.

[3-2-2. Distortion Error]

As a second error, there is an error generated as the shape is distorted by heating due to a solder reflow or the like that occurs when the antenna 40 is fixed to the substrate 31.

As the solder reflow, since the antenna 40 is fixed to the substrate 31 by heating solder so as to be melted, for example, at about 250° C., a distortion of the substrate 31 is generated due to a difference of expansion coefficients of materials, and there is a case where the distortion remains after being cooled down. This error is considered as about 100 to 200 μm.

[3-2-3. Thermal Expansion Error at the Time of Use]

As a third error, there is an error that is generated due to thermal expansion of the substrate 31 in accordance with an increase in the temperature when communication is actually performed. When communication is performed, for example, in a case where the temperature is about 40° C., the substrate 31 expands by about 4 μm per 10 mm on the XY plane and expands about 20 μm in the Z axis direction.

[3-2-4. Error as a Whole]

Accordingly, there is a possibility that positional deviation of about 750 μm occurs between the antenna $\mathbf{40}_1$ arranged in the communication module $\mathbf{30}_1$ disposed in the dock 10 and the antenna $\mathbf{40}_2$ arranged in the communication module $\mathbf{30}_2$ disposed in the storage device 20 when they are used.

On the other hand, the tolerance level of the positional deviation between the antennas 40 arranged so as to face each other in the Z axis direction is 0.75 mm to 1.5 mm. Thus, in a case where the positional deviation of 750 μm occurs, there is a possibility that it is difficult to perform communication.

Accordingly, it is necessary to adjust the distance between the antenna $\mathbf{40}_1$ arranged in the communication module $\mathbf{30}_1$ disposed in the dock 10 and the antenna $\mathbf{40}_2$ arranged in the communication module $\mathbf{30}_2$ disposed in the storage device 20.

[3-3. Relationship between AGC and Inter-Antenna Distance]

As described above, the reception signals received by the differential linear antennas 41 of the reception antennas 40E to 40H are amplified by the amplifier circuit 111 to a constant voltage in accordance with an AGC signal that is supplied from the AGC circuit 113. The AGC circuit 113 calculates an amplification factor for which the reception voltage (reception amplitude) of a reception signal supplied from the amplifier circuit 111 becomes a constant voltage (for example, 1200 mV).

Figure 23:
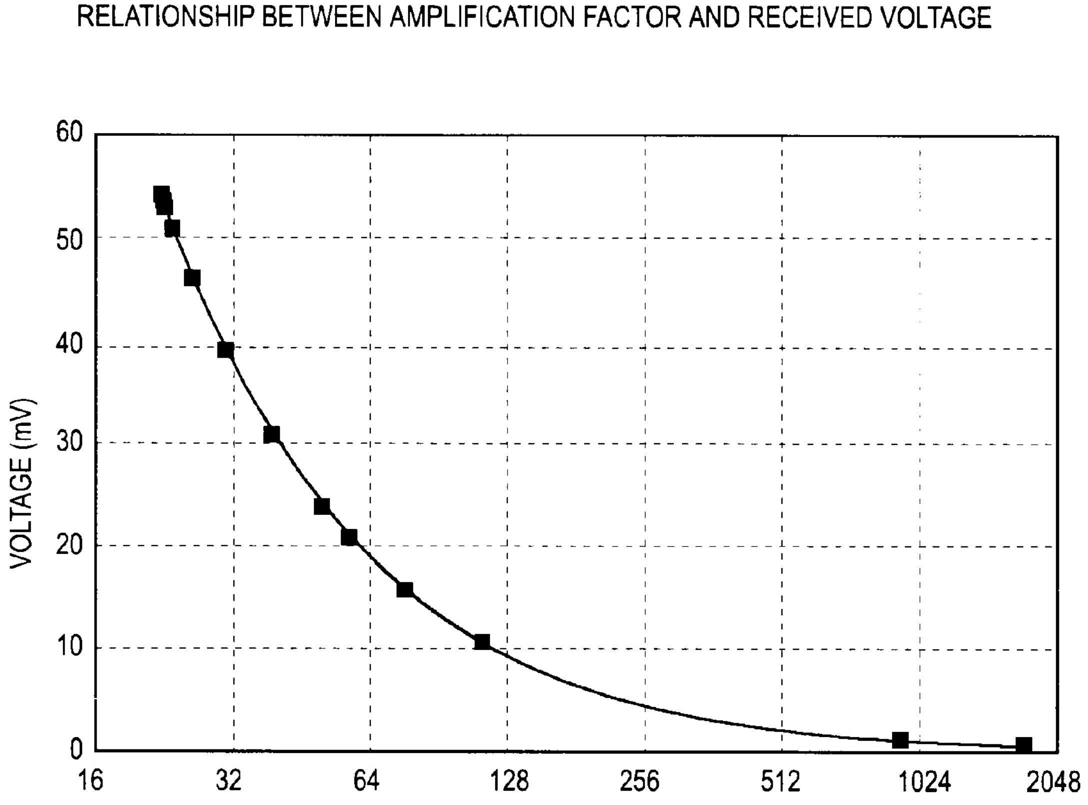
FIG. 23 is a graph illustrating a relationship between an amplification factor and a received voltage.

Accordingly, the reception voltages of signals received by the differential linear antennas 41 of the reception antennas 40E to 40H and the amplification factors calculated by the AGC circuit 113 have an inverse proportional relationship as illustrated in FIG. 23.

On the other hand, the differential linear antenna 41 performs communication through a Quasi-electrostatic field, and a communication distance is sufficiently short. Accordingly, there is no interference of electric wave as appears in a Fresnel region, and the reception voltage uniformly attenuates in inverse proportion to the distance between the antennas 40.

Figure 24:
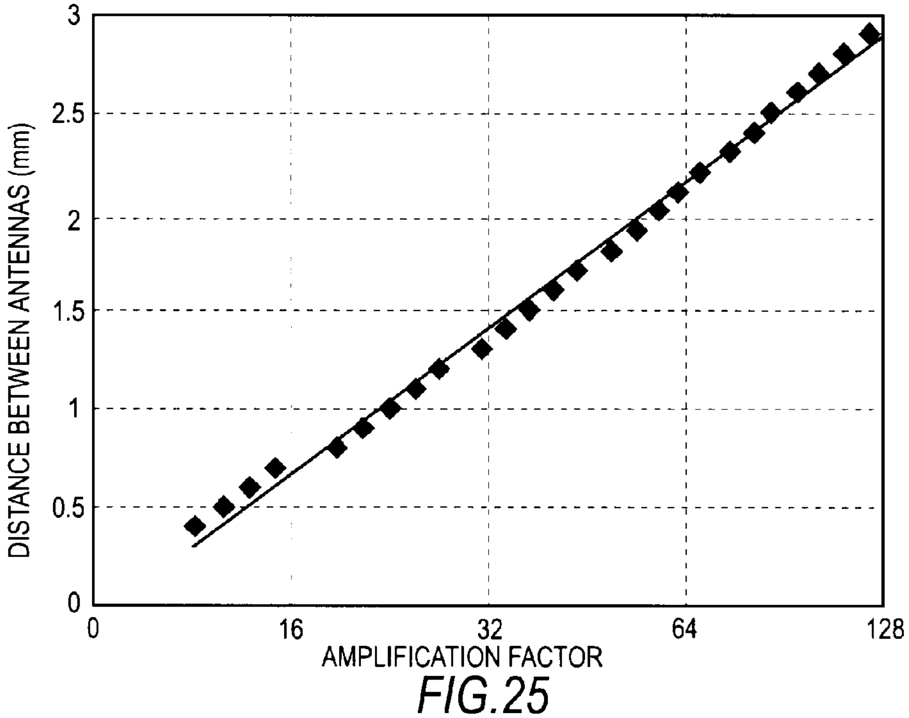
FIG. 24 is a graph illustrating an amplification factor and a distance between antennas.

Accordingly, as illustrated in FIG. 24, as a relationship between the amplification factor calculated by the AGC circuit 113 and the distance between the antennas 40 arranged so as to face each other, when a logarithm of the amplification factor calculated by the AGC circuit 113 is taken, there is a relationship of an approximately straight line between the distance between the antennas 40 arranged so as to face each other and the logarithm of the amplification factor.

Based on such a relationship, the distance between the antennas 40 arranged so as to face each other can be estimated based on the amplification factor calculated by the AGC circuit 113.

[3-4. Detailed Position Control Process]

As above, there is positional deviation between the antenna $\mathbf{40}_1$ arranged in the communication module $\mathbf{30}_1$ disposed in the dock 10 and the antenna $\mathbf{40}_2$ arranged in the communication module $\mathbf{30}_2$ disposed in the storage device 20. However, since the differential linear antennas 41 of the antenna 40 communicate with each other using a Quasi-electrostatic field, the distance between the antennas 40 arranged so as to face each other can be estimated based on the amplification factor calculated by the AGC circuit 113. Accordingly, the microcomputer 83 of the dock 10 and the microcomputer 84 of the storage device 20 perform a position control process, so that the distance between the antennas 40 is adjusted to be a reference distance based on the estimated distance.

More specifically, when being supplied with power, the microcomputer 83 of the dock 10 and the microcomputer 84 of the storage device 20 perform the position control process by reading out a program stored in the ROM and expanding the program into the RAM.

Figure 25:
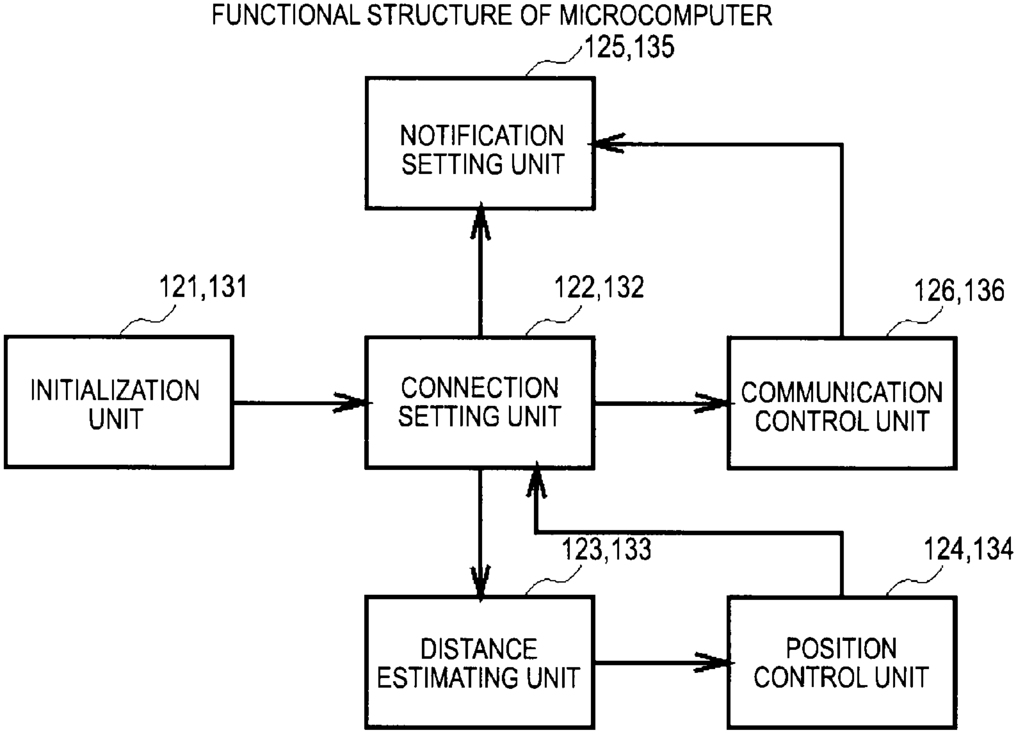
FIG. 25 is a schematic diagram illustrating the functional configuration of a microcomputer.

When performing the position control process, the microcomputer 83, as illustrated in FIG. 25, serves as an initialization unit 121, a connection setting unit 122, a distance estimating unit 123, a position control unit 124, a notification control unit 125, and a communication control unit 126. In addition, when performing the position control process, the microcomputer 84 serves as an initialization unit 131, a connection setting unit 132, a distance estimating unit 133, a position control unit 134, a notification control unit 135, and a communication control unit 136.

It is assumed that the dock 10 is used while constantly being connected to the personal computer 3, and accordingly, power is supplied thereto, for example, simultaneously with the supply of source power to the personal computer 3.

When the source power is supplied, the microcomputer 83 performs the position control process.

When the source power is supplied to the transmission LSI 36$_1$ and the reception LSI 37$_1$ arranged in the communication module 30$_1$, the units thereof including a register is initialized by a reset circuit installed to the inside thereof during a predetermined wait time.

When the wait time elapses after the position control process, the initialization unit 121 explicitly initializes the registers of the transmission LSI 36$_1$ and the reception LSI 37$_1$. At that time, the initialization unit 121 sets the transmission LSI 36$_1$ as being used for transmission and sets the reception LSI 37$_1$ as being used for reception.

In addition, the initialization unit 121 performs initialization setting for activating the signal detecting circuit 104 of the transmission LSI 36$_1$ and activating the AGC circuit 113 and the signal detecting circuit 114 of the reception LSI 37$_1$.

In the SATA2 specifications, in order to check the connection, a host and a device supplied with source power transmit mutually burst signals called OOB (Out of Band) signals.

Thus, in a case where the OOB signal transmitted from the RAID card 81 is detected by the signal detecting circuits 104 of the transmission LSI 36$_1$ for all the channels, the connection setting unit 122 determines that the RAID card 81 can perform communication through all the channels and activates all the output buffers 102 of the transmission LSI 36$_1$.

Accordingly, in the dock 10, a state is formed in which OOB signals output from the RAID card 81 are output from the differential linear antennas 41 of the transmission antennas 40A$_1$ to 40D$_1$ as transmission signals, and this state is maintained until the storage device 20 is placed in the dock 10.

On the other hand, in a case where the OOB signal transmitted from the RAID card 81 is not detected by the signal detecting circuit 104 of the transmission LSI 36$_1$ for any channel, the connection setting unit 122 notifies a user of abnormality, for example, by blinking the indicator 14 and ends the process.

This occurs in a case where a component inside the dock 10 is out of order, a case where a connector is misaligned so as not to be connected to the RAID card 81, or the like. In such a case, since it is difficult to perform automatic restoration, the connection setting unit 122 notifies the user of abnormality and ends the process.

The storage device 20 is supplied with source power from the dock 10 by being placed in the dock 10. When the source power is supplied, the microcomputer 84 performs the position control process after a wait time of 1 to 3 seconds elapses. The storage device 20 is placed in the dock 10 by a user's hand, and thus there is a case where a slightly long time is necessary for the supply of power to be stable depending on the method of the placement. Accordingly, the wait time is set to be slight long as 1 to 3 seconds.

When the source power is supplied to the transmission LSI 36$_2$ and the reception LSI 37$_2$ arranged in the communication module 30$_2$, the units thereof including a register are initialized by a reset circuit installed to the inside thereof during the wait time.

The initialization unit 131 explicitly initializes the registers of the transmission LSI 36$_2$ and the reception LSI 37$_2$. At that time, the initialization unit 131 sets the transmission LSI 36$_2$ as being used for transmission and sets the reception LSI 37$_2$ as being used for reception. In addition, the initialization unit 131 activates the signal detecting circuit 104 of the transmission LSI 36$_2$ and activates the AGC circuit 113 and the signal detecting circuit 114 of the reception LSI 37$_2$.

In a case where the COB signal transmitted from the SSD 23 is not detected by the signal detecting circuit 104 of the transmission LSI 36$_1$ for any channel, the connection setting unit 132 notifies a user of abnormality, for example, by blinking the indicator 26 and ends the process.

This occurs in a case where any malfunction occurs inside the storage device 20, a case where a connector is misaligned so as not to be connected to the SSD 23, or the like. In such a case, since it is difficult to perform automatic restoration, the connection setting unit 132 notifies the user of abnormality and ends the process. Particularly, in the case of a portable-type storage device 20, since such a malfunction or misalignment can easily occur, the process is important.

On the other hand, in a case where the COB signal transmitted from the SSD 23 is detected by the signal detecting circuits 104 of the transmission LSI 36$_2$ for all the channels, the connection setting unit 132 determines that the SSD 23 can perform communication through all the channels and activates all the output buffers 102 of the transmission LSI 36$_2$.

Accordingly, in the dock 10, OOB signals output from the RAID card 81 are output from the differential linear antennas 41 of the transmission antennas 40A$_2$ to 40D$_2$.

When the storage device 20 is placed in the dock 10, and OOB signals are output from the differential linear antennas 41 of the transmission antennas 40A$_2$ to 40D$_2$, the dock 10 receives the OOB signal by using the reception antennas 40E$_1$ to 40H$_1$.

The AGC circuit 113 of the reception LSI 37$_1$ calculates an amplification factor in accordance with the reception voltages of the OOB signals received by the reception antennas 40E$_1$ to 40H$_1$.

The tolerance level of the distance of the antennas 40 arranged so as to face each other is 0.75 mm to 1.5 mm, and when being calculated by using the linear function illustrated in FIG. 24, an amplification factor corresponding to the range is a range (hereinafter, this will be also referred to as a normal operating range) of 18 to 34. In addition, in a case where the distance of the antennas 40 arranged so as to face each other is the reference distance, the amplification factor 23 becomes an optimal value.

In other words, in a case where the amplification factor calculated by the AGC circuit 113 of the reception LSI 37$_1$ is within the normal operating range, communication can be performed with zero bit-error-rate (error-free-state). As the amplification factor deviates therefrom, the error rate increases, and in a case where the amplification factor is apart from the normal operating range by a predetermined distance or more, a state is formed in which it is difficult to perform communication.

Thus, in the microcomputer 83, the normal operating range and a range (hereinafter, this will be also referred to as a normal initialization range), which is set to be narrower than the normal operating range, of 20 to 26 in which communication between the differential linear antennas 41 is optimally performed are stored in the ROM and are read out as is necessary.

Figure 26:
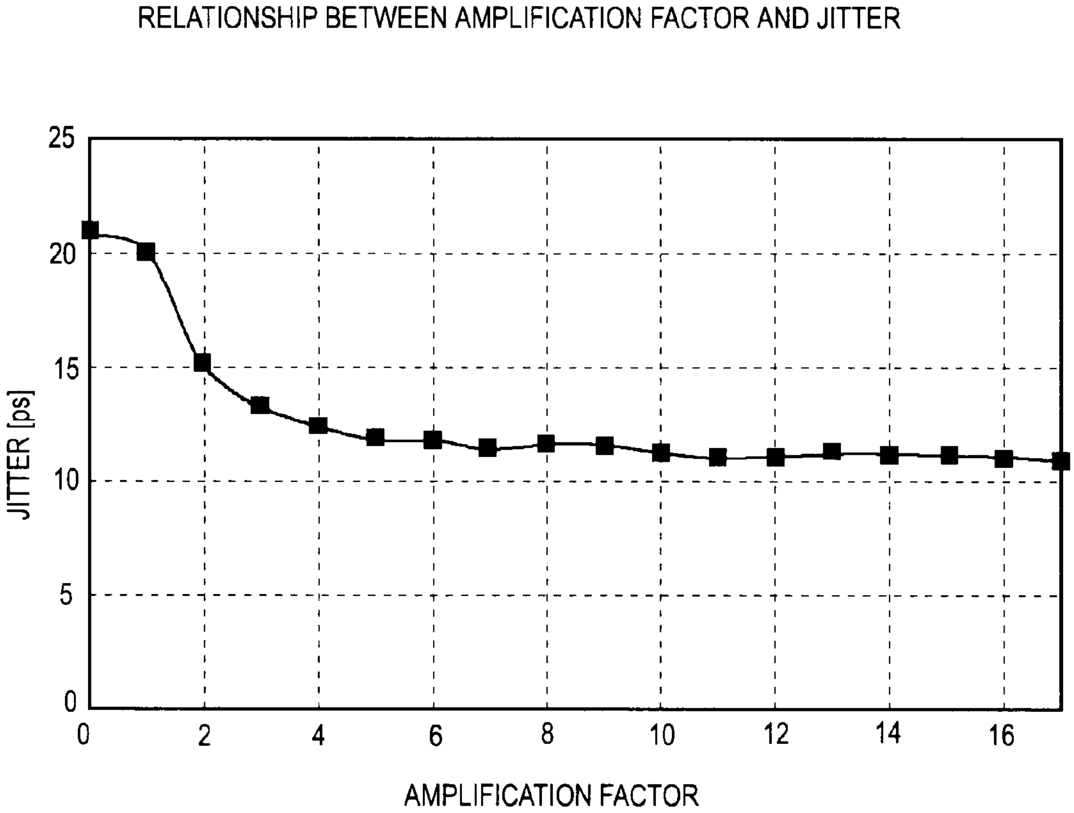
FIG. 26 is a graph illustrating an amplification factor and jitter.

The normal initialization range and the normal operating range are set to ranges in which communication can be performed in an optical state based on the characteristics of the differential linear antenna 41, the distance of the antennas 40, and the characteristics of the amplifier circuit 111. The reason for this is that, in a case where a signal that is ideally attenuated is processed by an ideal amplifier circuit, the slew rate is further improved as the amplification factor increases, and accordingly, the signal quality such as a jitter component is improved. However, as the relationship between the amplification factor and the jitter illustrated in FIG. 26 as an example, due to adverse effects such as a nonlinear distortion or emphasis of a DC (Direct Current) offset of the reception signal as well through amplification, actually, the improvement of the signal quality reaches a limit point.

In a case where the amplification factor calculated by the AGC circuit 113 of the reception LSI $\mathbf{37}_1$ is within the normal initialization range for all the channels, the connection setting unit 122 determines that the distance between the antennas 40 arranged so as to face each other is a distance in which communication can be performed. Then, the connection setting unit 122 activates the output buffer 102 of the reception LSI $\mathbf{37}_1$ so as to form a state in which transmission and reception can be performed.

On the other hand, in a case where the amplification factor calculated by the AGC circuit 113 of the reception LSI $\mathbf{37}_1$ is not within the normal initialization range for any channel, the connection setting unit 122 determines that the distance between the antennas 40 arranged so as to face each other is not a distance in which communication can be performed. At this time, the distance estimating unit 123 estimates a distance between the antennas facing each other by using the linear function illustrated in FIG. 24 based on the amplification factor calculated by the AGC circuit 113.

The position control unit 124 calculates a difference between the distance estimated by the distance estimating unit 123 and the reference distance and moves the storage device 20 in the Z axis direction by driving the actuator 13 such that the distance between the antennas 40 arranged so as to face each other becomes the reference distance.

More specifically, in a case where the distance estimated by the distance estimating unit 123 is longer than the reference distance, the position control unit 124 moves the storage device 20 in a direction toward the dock 10 by the difference. On the other hand, in a case where the distance estimated by the distance estimating unit 123 is shorter than the reference distance, the position control unit 124 moves the storage device 20 in a direction away from the dock 10 by the difference.

In a case where the amplification factor calculated by the AGC circuit 113 is not within the normal initialization range for all the channels, the connection setting unit 122, the distance estimating unit 123, and the position control unit 124 repeatedly performs the above-described process, for example, ten times.

In a case where the amplification factors calculated by the AGC circuit 113 of the reception LSI $\mathbf{37}_1$ are not within the normal initialization range for all the channels even when the connection setting unit 122, the distance estimating unit 123, and the position control unit 124 have repeated the above-described processes, for example, ten times, some abnormality is considered to occur. For example, a case where a metal piece is interposed between antennas 40, a case where the antenna 40 is damaged, a case where the substrate 31 is deviated much in the X axis direction or the Y axis direction, a case where the substrate 31 is deformed due to the influence of heat, or the like may be considered.

In such a case, since the amplification factor is not improved even when the connection setting unit 122, the distance estimating unit 123, and the position control unit 124 repeatedly perform the above-described process several times, the notification setting unit 125 notifies the user that it is difficult to start communication through the indicator 16 and ends the process.

In addition, the storage device 20 is placed in the dock 10, COB signals output from the differential linear antennas 41 of the transmission antennas $\mathbf{40}\mathrm{A}_1$ to $\mathbf{40}\mathrm{D}_1$ of the dock 10 are received by the reception antennas $\mathbf{40}\mathrm{E}_2$ to $\mathbf{40}\mathrm{H}_2$, and an amplification factor is calculated by the AGC circuit 113 of the reception LSI $\mathbf{37}_2$.

In a case where the amplification factor calculated by the AGC circuit 113 of the reception LSI $\mathbf{37}_2$ is within the normal initialization range for all the channels, the connection setting unit 132 determines that the distance between the antennas 40 arranged so as to face each other is a distance in which communication can be performed. Then, the connection setting unit 132 activates the output buffer 112 of the reception LSI $\mathbf{37}_2$ so as to form a state in which transmission and reception can be performed.

On the other hand, in a case where the amplification factor calculated by the AGC circuit 113 of the reception LSI $\mathbf{37}_2$ is not within the normal initialization range for any channel, the connection setting unit 132 determines that the distance between the antennas 40 arranged so as to face each other is not a distance in which communication can be performed.

In this embodiment, since a mechanism used for adjusting the distance between the antennas 40 is not disposed in the storage device 20, the distance estimating unit 133 and the position control unit 134 do not function.

Thus, after a time elapses in which the distance between the antennas 40 is supposed to be adjusted by the dock 10, the connection setting unit 132 determines again whether or not the amplification factor calculated by the AGC circuit 113 of the reception LSI $\mathbf{37}_2$ is within the normal initialization range for all the channels.

Then, in a case where the amplification factor calculated by the AGC circuit 113 of the reception LSI $\mathbf{37}_2$ is not within the normal initialization range for all the channels, the notification setting unit 135 notifies the user that it is difficult to start communication through the indicator 16 and ends the process.

When both the connection setting unit 122 of the dock 10 and the connection setting unit 132 of the storage device 20 activate all the output buffers 112 of the reception LSI $\mathbf{37}_1$ and all the output buffers 112 of the reception LSI $\mathbf{37}_2$, and a state is formed in which transmission and reception can be performed, data communication is started between the RAID card 81 and the SSD 23 in compliance with the SATA2 specifications.

Here, the communication using the differential linear antenna 41 of the antenna 40 is communication performed in a short distance, and accordingly, there is hardly influence of distortion. Thus, when the communication is normally started once, there is hardly abnormality, and the communication can be stably performed. However, since a case where a user detaches the storage device 20 from the dock 10 in the middle of the communication or the like may be considered, when the dock 10 or the storage device 20 detects abnormality, the communication is completed while the communication is safely performed so as to prevent data from being damaged.

More specifically, the communication control unit 126 of the dock 10, for example, acquires an amplification factor calculated by the AGC circuit 103 of the reception LSI $\mathbf{37}_1$ every predetermined interval and monitors whether the amplification factor is within the normal operating range for all the channels.

Then, in a case where amplification factor is not within the normal operating range for any channel, the communication control unit 126 normally ends the communication. At this time, the notification setting unit 125 notifies the user that the communication ends due to detection of abnormality through the indicator 14.

Similarly, the communication control unit 136 of the storage device 20, for example, acquires an amplification factor calculated by the AGC circuit 103 of the reception LSI $37_2$ every predetermined interval and monitors whether the amplification factor is within the normal operating range for all the channels.

Then, in a case where amplification factor is not within the normal operating range for any channel, the communication control unit 136 normally ends the communication. At this time, the notification setting unit 135 notifies the user that the communication ends due to detection of abnormality through the indicator 26.

As above, the microcomputer 83 of the dock 10 and the microcomputer 84 of the storage device 20 are configured so as to perform position control when non-contact communication using the differential linear antennas 41 of the antenna 40 is performed.

[3-5. Position Control Process Sequence]

Next, the sequence of the above-described position control process will be described using a flowchart.

[3-5-1. Position Control Process Sequence Using Microcomputer of Dock]

Figure 27:
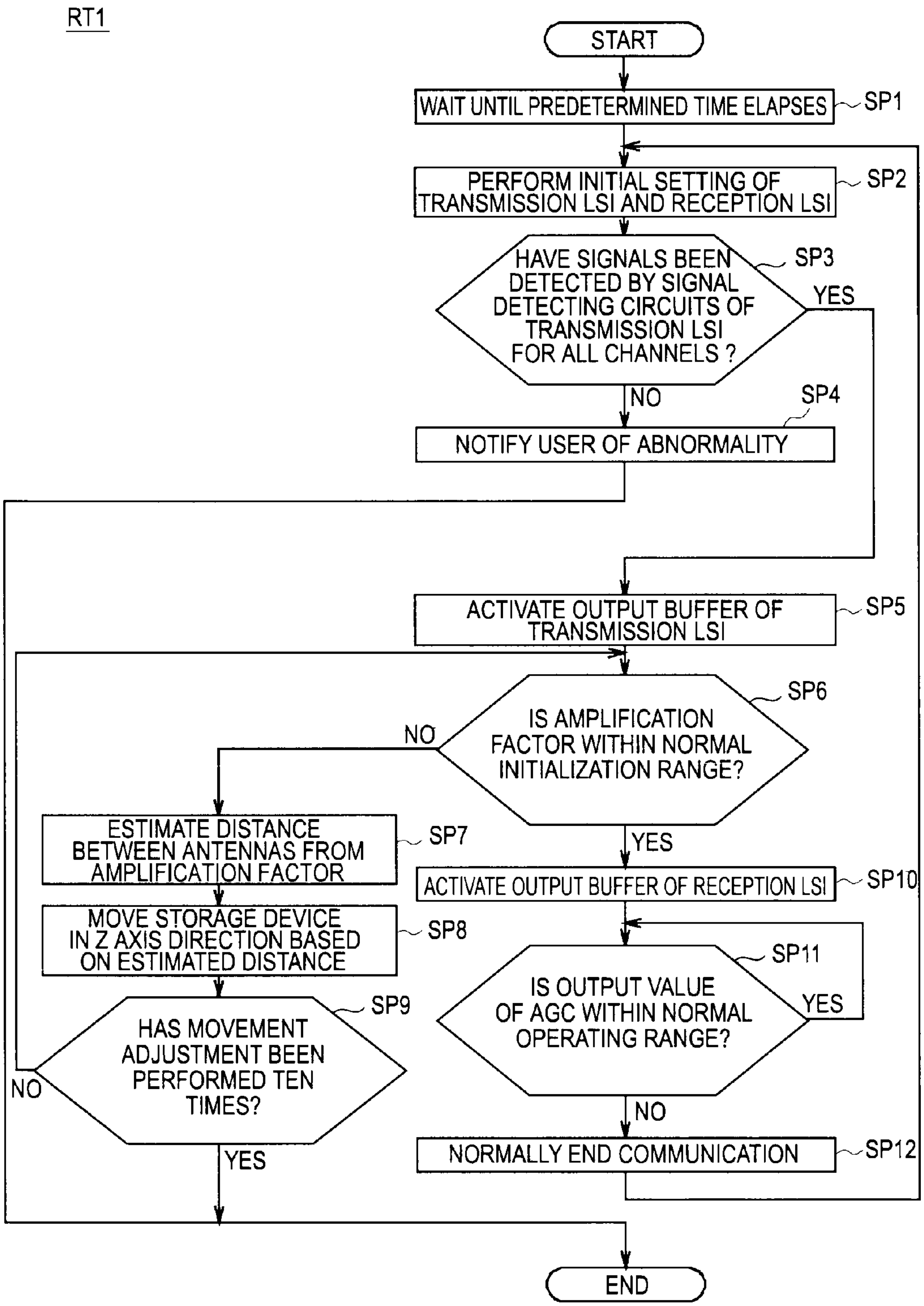
FIG. 27 is a flowchart illustrating the procedure of a position control process performed by a microcomputer of a dock.

The microcomputer 83 enters a start step of Routine RT1 shown in the flowchart illustrated in FIG. 27, proceeds to the next Step SP1, waits until a predetermined time elapses, and proceeds to the next Step SP2. During that period, the transmission LSI $36_1$ and the reception LSI $37_1$ are initialized by respective reset circuits disposed therein.

In Step SP2, the microcomputer 83 performs initial setting such as initialization of the registers of the transmission LSI $36_1$ and the reception LSI $37_1$ and proceeds to the next Step SP3.

In Step SP3, the microcomputer 83 determines whether or not the OOB signals transmitted from the RAID card 81 are detected by the signal detecting circuits 104 of the transmission LSI $36_1$ for all the channels.

Here, in a case where the OOB signal is not detected for any channel, the microcomputer 83 proceeds to Step SP4, notifies the user of the abnormality, and ends the process.

On the other hand, in a case where the OOB signals are detected for all the channels, the microcomputer 83 proceeds to Step SP5, activates the output buffer 102 of the transmission LSI $36_1$, maintains this state until an OOB signal is transmitted from the storage device 20, and proceeds to the next Step SP6.

In Step SP6, the microcomputer 83 determines whether or not the amplification factor calculated by the AGC circuit 103 of the reception LSI $37_1$ is within the normal initialization range based on the OOB signals received by the reception antennas $40E_1$ to $40H_1$. Then, in a case where the amplification factor is not within the normal initialization range, the microcomputer 83 proceeds to Step SP7.

In Step SP7, the microcomputer 83 estimates a distance between the antennas 40 arranged so as to face each other based on the amplification factor calculated by the AGC circuit 113 of the reception LSI $37_1$ and proceeds to the next Step SP8.

In Step SP8, the microcomputer 83 moves the storage device 20 in the Z axis direction based on the estimated distance and the reference distance such that the distance between the antennas 40 arranged so as to face each other becomes the reference distance and proceeds to the next Step SP9.

In Step SP9, the microcomputer 83 determines whether or not the movement adjustment of the storage device 20 in Step SP8 is performed ten times. In a case where the movement adjustment is not performed ten times, the process proceeds to Step SP6. On the other hand, in case where the movement adjustment is performed ten times, the microcomputer 83 notifies the user that it is difficult to start communication and ends the process.

On the other hand, in a case where the amplification factor is within the normal initialization range in Step SP6, the microcomputer 83 proceeds to Step SP10, activates the output buffer 102 of the reception LSI $37_1$, forms a state in which data communication can be started in compliance with SATA2 specifications, and proceeds to the next Step SP11.

In Step SP11, the microcomputer 83, in the state in which data communication is performed between the RAID card 81 and the SSD 23 in compliance with the SATA2 specifications, detects whether or not the amplification factors calculated by the AGC circuit 113 of the reception LSI $37_1$ for all the channels are within the normal operating range.

In a case where the amplification factors for all the channels are within the normal operating range in Step SP11, the microcomputer 83 repeatedly performs Step SP11.

On the other hand, in a case where the amplification factor for any channel is not within the normal operating range in Step SP11, the microcomputer 83 proceeds to Step SP12, normally ends the communication, and proceeds back to Step SP2.

[3-5-2. Position Control Process Sequence Using Microcomputer of Storage Device]

Figure 28:
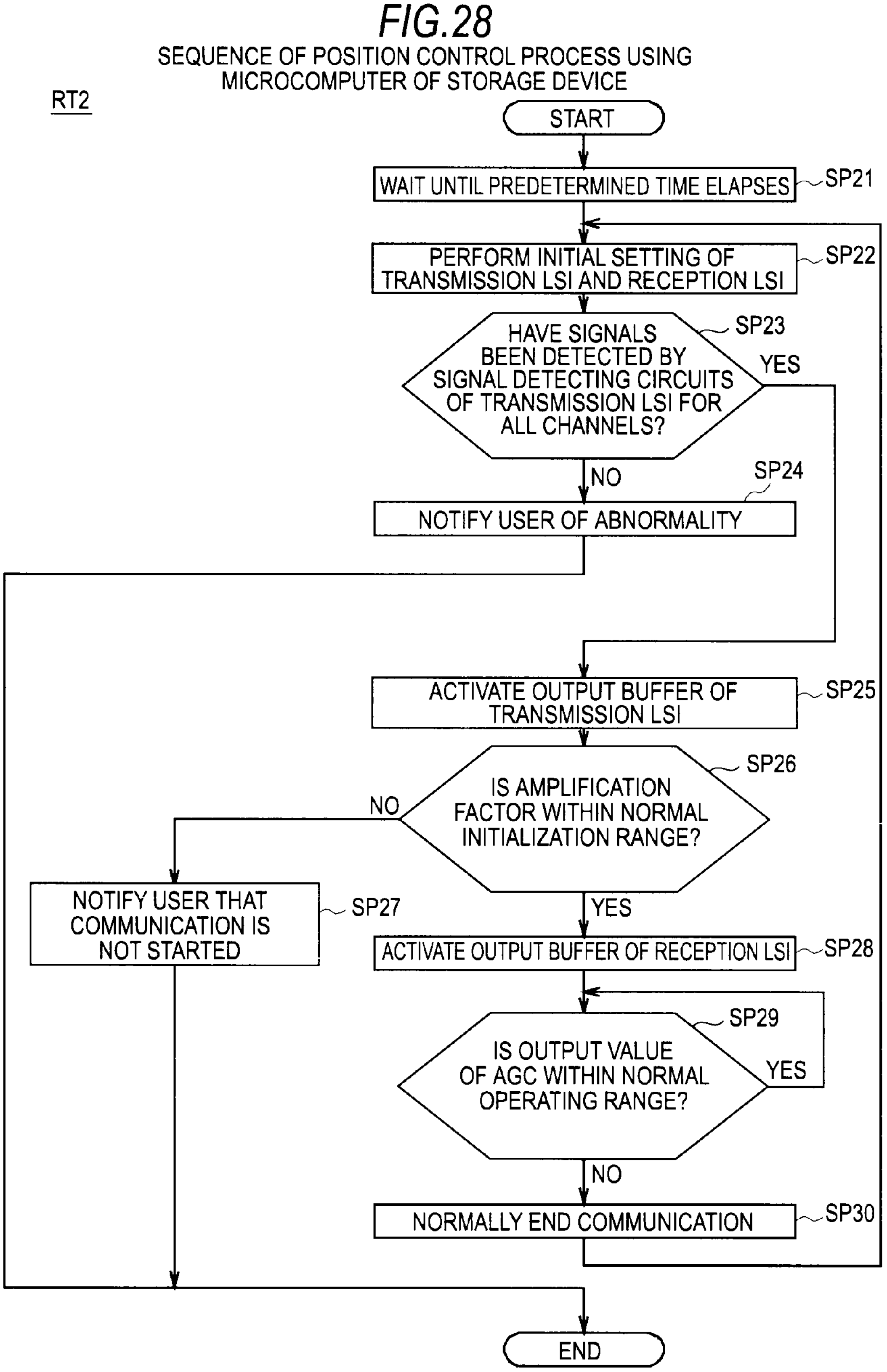
FIG. 28 is a flowchart illustrating the procedure of a positional control process performed by a microcomputer of a storage device.

The microcomputer 84 enters a start step of Routine RT2 shown in the flowchart illustrated in FIG. 28, proceeds to the next Step SP21, waits until a time set to one to three seconds elapses, and proceeds to the next Step SP22. During that period, the transmission LSI $36_2$ and the reception LSI $37_2$ are initialized by a respective reset circuit disposed therein.

In Step SP22, the microcomputer 84 performs initial setting such as initialization of the registers of the transmission LSI $36_2$ and the reception LSI $37_2$ and proceeds to the next Step SP23.

In Step SP23, the microcomputer 84 determines whether or not the OOB signal transmitted from the SSD 23 is detected by the signal detecting circuits 114 of the transmission LSI $36_2$ for all the channels.

Here, in a case where the OOB signal is not detected for any channel, the microcomputer 84 proceeds to Step SP24, notifies the user of the abnormality, and ends the process.

On the other hand, in a case where the OOB signals are detected for all the channels, the microcomputer 84 proceeds to Step SP25, activates the output buffer 112 of the transmission LSI $36_2$, and proceeds to the next Step SP26.

In Step SP26, the microcomputer 84 determines whether or not the amplification factor calculated by the AGC circuit 113 is within the normal initialization range based on the OOB signals received by the reception antennas $40E_2$ to $40H_2$. Then, in a case where the amplification factor is not within the normal initialization range, the microcomputer 84 proceeds to Step SP27, notifies the user that it is difficult to start communication, and ends the process.

On the other hand, in a case where the amplification factor is within the normal initialization range in Step SP26, the microcomputer 84 proceeds to Step SP28, activates the output buffer 112 of the reception LSI $37_2$, forms a state in which data communication can be started in compliance with the SATA2 specifications, and proceeds to the next Step SP29.

In Step SP29, the microcomputer 84, in the state in which data communication is performed between the RAID card 81 and the SSD 23 in compliance with the SATA2 specifications, detects whether or not the amplification factor calculated by the AGC circuit 113 of the reception LSI 37$_2$ for all the channels is within the normal operating range.

In a case where the amplification factors for all the channels are within the normal operating range in Step SP29, the microcomputer 84 repeatedly performs Step SP29.

On the other hand, in a case where the amplification factor for any channel is not within the normal operating range in Step SP29, the microcomputer 84 proceeds to Step SP30, normally ends the communication, and proceeds back to Step SP22.

4. Operation and Advantage

In the above-described configuration, the antenna 40 has a two-layer structure configured by the differential linear antenna 41 that is formed by the antenna elements 51 and 52 of a predetermined length, which are separated from each other by a predetermined distance and are arranged on the same plane, and the patch antenna 42 arranged so as to be parallel to the plane on which the antenna elements 51 and 52 are arranged.

In the differential linear antenna 41 of the antenna 40 (the transmission antennas 40A to 40D) used for transmission, voltages having opposite polarities are fed to the antenna elements 51 and 52, and a magnetic field is generated by the antenna elements 51 and 52.

In the differential linear antenna 41 of the antenna 40 (the reception antennas 40E to 40H) that is arranged so as to face the transmission antennas 40A to 40D and is used for reception, the antenna elements 51 and 52 are electrically charged with opposite polarities in accordance with the magnetic field generated by the antenna elements 51 and 52 of the transmission antennas 40A to 40D.

Accordingly, signals output from the differential linear antennas 41 of the transmission antennas 40A to 40D are received by the differential linear antennas 41 of the reception antennas 40E to 40H. At this time, the differential linear antennas 41 of the transmission antennas 40A to 40D and the differential linear antennas 41 of the reception antennas 40E to 40H perform communication through a Quasi-electrostatic field in which the intensity of the electric field attenuates in inverse proportion to the cube of the distance, whereby high-speed communication at a speed of several Gbps can be performed.

On the other hand, in the patch antenna 42, a feeding point is disposed in an area interposed between virtual planes that pass through extended lines of the antenna elements 51 and 52 and are perpendicular to the patch antenna 42.

Accordingly, in the antenna 40, the antenna elements 51 and 52 of the differential linear antenna 41 are fed with voltages having opposite polarities, and accordingly, the polarities have equal influences on the patch antenna 42. Therefore, the influences are offset, whereby there is hardly interference.

In addition, in the antenna 40, the electric waves radiated from the patch antenna 42 have almost equal influences on the antenna elements 51 and 52, and accordingly, by taking a difference of voltages received by the antenna elements 51 and 52, the influences are offset.

Thus, the differential linear antenna 41 and the patch antenna 42 of the antenna 40 can independently perform communication without inferring with each other. Accordingly, the antenna 40 can be formed to have two-layer structure including the differential linear antenna 41 and the patch antenna 42 that perform wireless communication using different signals, whereby the size thereof can be reduced.

In addition, the dock 10 and the storage device 20 are configured so as to estimate the distance between the antennas 40 arranged so as to face each other based on the amplification factors calculated by the AGC circuits 103 and 113.

The reason for this is that the differential linear antenna 41 of the antenna 40 has characteristics that a received voltage uniformly attenuates in inverse proportion to the distance between the antennas 40 arranged so as to face each other, whereby the amplification factor and the distance between the antennas 40 are represented to have a proportional relationship.

Accordingly, the dock 10 and the storage device 20 can estimate the distance between the antennas 40 arranged so as to face each other without arranging an additional device or circuit for measuring the distance, and whereby the configuration can be simplified.

In addition, the dock 10 adjusts the distance between the antennas 40 to the reference distance, in which communication can be optimally performed, set in advance by moving the storage device 20 in the Z axis direction by driving the actuator mechanism 13 based on the estimated distance between the antennas 40.

Accordingly, the dock 10 and the storage device 20 can set the differential linear antennas 41 that perform communication using a Quasi-electrostatic field in which deviation of the distance has a great influence on the communication to be at an optimal distance interval. Therefore, communication between the differential linear antennas 41 can be performed in an optimal environment.

2. Other Embodiments

In the above-described embodiment, a case has been described in which the feeding point 63 is disposed on the center corner of the patch antenna 42 in the X axis direction. However, the present disclosure is not limited thereto. Thus, the feeding point may be disposed at any position within an area that is interposed between virtual planes that pass through extended lines of the antenna elements 51 and 52 and are perpendicular to the plane of the patch antenna 42. However, in consideration of the interference on the differential linear antennas 41, the position of the feeding point may be on a line that becomes a reference for which the antenna element 51 and the antenna element 52 forms line symmetry, that is, a position on a center line of the patch antenna 42 in the Y axis direction.

In addition, in the above-described embodiment, a case has been described in which the antenna elements 51 and 52 are arranged so as to be parallel to each other. However, the present disclosure is not limited thereto, and the antenna elements 51 and 52 may be arranged so to be separated from a reference line according to the direction of a current flowing through the patch antenna 42 by a predetermined distance and to form line symmetry with respect to the reference line.

In addition, in the above-described embodiment, a case has been described in which a plurality of shielding posts 45 are disposed with an equal space on the side face of the antenna 40 so as to be brought into contact with the shielding frame 44 and the patch antenna 42. This shielding post 45 is disposed for preventing an electric field generated by the antenna elements 51 and 52 from reaching other adjacent antennas 40. Thus, the present disclosure is not limited thereto, and, for example, the side face of the antenna 40 may be coated with a conductive flat plate. In such a case, the same advantage as that in a case where the shielding post 45 is disposed can be acquired.

In addition, in the above-described embodiment, a case has been described in which the shielding frame 44 is disposed on the same plane as that of the antenna elements 51 and 52. However, the present disclosure is not limited thereto, and the shielding frame 44 may be disposed at a position having a height different from that of the antenna elements 51 and 52. However, in a case where the shielding frame 44 and the antenna elements 51 and 52 are disposed on the same plane, the electric field generated by the antenna elements 51 and 52 can be the most effectively prevented from being radiated outside the antenna 40.

In addition, in the above-described embodiment, a case has been described in which the differential linear antenna 41 of the antenna 40 performs the communication between the RAID card 81 and the SSD 23 that are connected in compliance with the SATA2 specifications as non-contact communication. However, the present disclosure is not limited thereto, and the differential linear antenna 41 of the antenna 40 may perform communication between devices, for example, connected in compliance with PCI Express specifications as non-contact communication.

In addition, in the above-described embodiment, a case has been described in which the patch antenna 42 of the antenna 40 performs communication between the personal computer 3 and the display unit 25 connected in compliance with the USB specifications as non-contact communication. However, the present disclosure is not limited thereto, and, for example, the patch antenna 42 of the antenna 40 may perform communication between the devices, for example, connected in compliance with specifications such as RS232C or UART (Universal Asynchronous Receiver Transmitter) as non-contact communication. In addition, RS232C and UART are specification for a full-duplex, it is not necessary to arrange a conversion circuit that switches between a half-duplex and a full-duplex. Furthermore, in the case of the UART specifications, a specific negotiation is not necessary, and when the transmission antennas 40A to 40D and the reception antennas 40E to 40H face each other in a short distance, communication can be performed any time. Thus, for example, the specifications can be applied for checking the insertion or extraction, the presence, or the like of the SSD 23.

Figure 29:
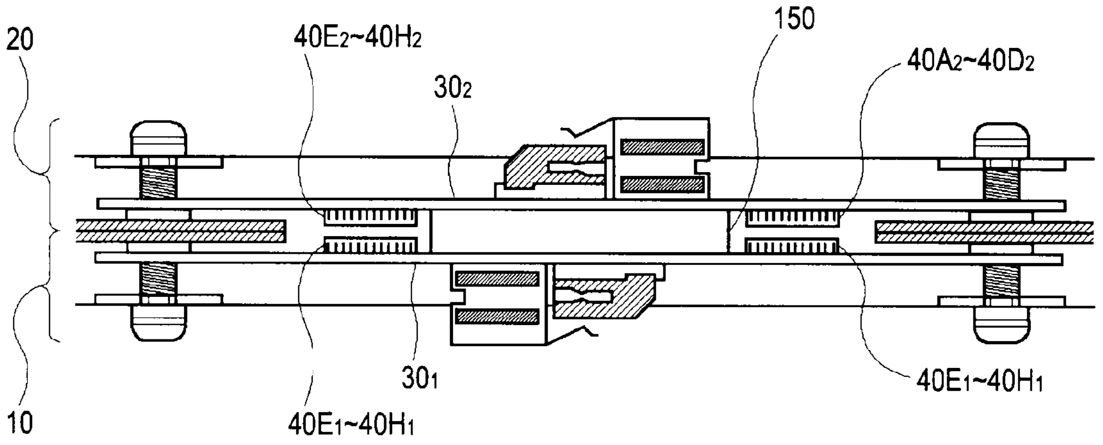
FIG. 29 is a schematic diagram illustrating a spacer disposed between communication modules according to another embodiment.

In addition, in the above-described embodiment, a case has been described in which nothing is disposed between the communication module $30_1$ of the dock 10 and the communication module $30_2$ of the storage device 20. However, the present disclosure is not limited thereto, and, as illustrated in FIG. 29, between the communication module $30_1$ of the dock 10 and the communication module $30_2$ of the storage device 20, a spacer 150 that allows a gap between the transmission antennas 40A to 40D and the reception antennas 40E to 40H facing each other to be 1 mm. In such a case, since the gap between the transmission antennas 40A to 40D and the reception antennas 40E to 40H facing each other is constantly maintained to be 1 mm as a reference distance, an optimal communication status can be constantly maintained.

Figure 30:
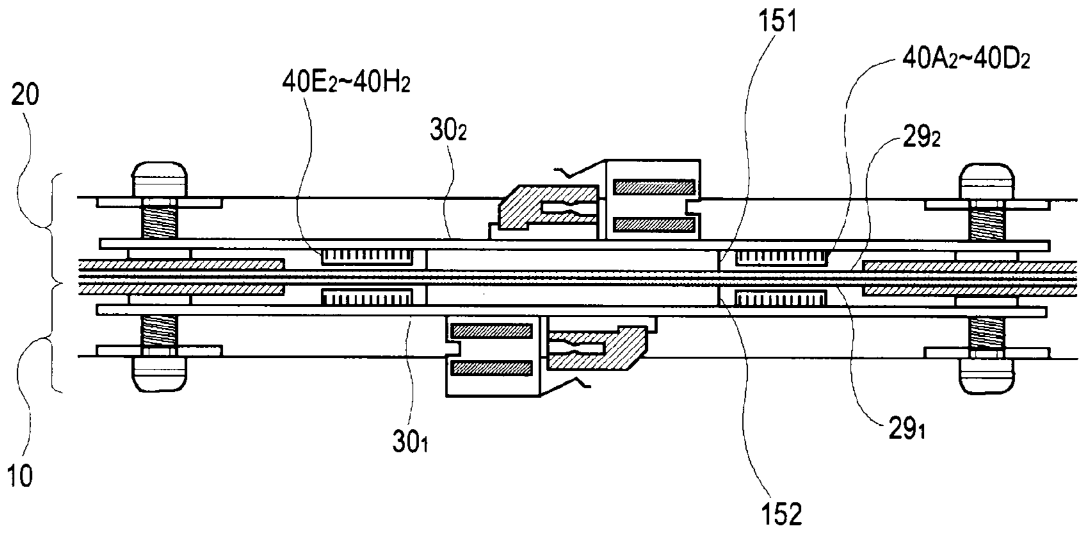
FIG. 30 is a schematic diagram illustrating a spacer disposed between communication modules according to another embodiment.

Furthermore, as another example, as illustrated in FIG. 30, spacers 151 and 152 may be disposed between the communication module $30_1$ of the dock 10 and the protection filter $29_1$ and between the communication module $30_2$ of the storage device 20 and a protection filter $29_2$. These spacers 151 and 152 is formed to have a thickness allowing the gap between the transmission antennas 40A to 40D and the reception antennas 40E to 40H facing each other to be 1 mm. Accordingly, the same advantages similar to those described above can be acquired.

In addition, in the above-described embodiment, a case has been described in which the actuator mechanism 13 as an adjustment unit is disposed in the dock 10. However, the present disclosure is not limited thereto, and an adjustment unit that adjusts the distance between antennas 40 arranged so as to face each other may be disposed in the storage device 20. Such a case may be realized, for example, by arranging an actuator mechanism that moves only the communication module $30_2$ in the Z axis direction inside the storage device 20.

In a case where the adjustment unit is disposed in the storage device 20, the adjustment unit may be controlled by either the position control unit 124 disposed in the dock 10 or the position control unit 134 disposed in the storage device 20. A case where the position control unit 124 disposed in the dock 10 is used may be realized by transmitting a control signal from the dock 10 to the storage device 20, for example, by using an unused patch antenna 42.

On the other hand, in a case where the position control unit 134 performs position control, the position control unit 134 activates the functions of the distance estimating unit 133 and the position control unit 134. Then, the position control unit 134, similarly to the position control unit 124, calculates a difference between the distance estimated by the distance estimating unit 133 and the reference distance and move the storage device 20 in the Z-axis direction by driving the actuator 13 such that the distance between the antennas 40 arranged so as to face each other becomes the reference distance.

In addition, in the above-described embodiment, a case has been described in which the actuator mechanism 13 is controlled by the position control unit 124 disposed in the dock 10. However, the present disclosure is not limited thereto, and thus the actuator mechanism 13 may be controlled by the position control unit 134 disposed in the storage device 20. Such a case can be realized by transmitting a control signal from the storage device 20 to the dock 10, for example, by using an unused patch antenna 42.

In addition, in the above-described embodiment, a case has been described in which the distance between the antennas 40 arranged so as to face each other is adjusted by controlling the actuator mechanism 13 as the adjustment unit by using the position control unit 124. However, the present disclosure is not limited thereto, and thus a user may manually adjust the distance between the antennas 40.

In addition, in the above-described embodiment, a case has been described in which the notification setting units 125 and 135 allow the indicators 14 and 26 to blink so as to notify the user that it is difficult to start communication and communication ends due to detection of abnormality. However, the present disclosure is not limited thereto, and the indicators 14 and 26 may be blinked in a different color according to the amplification factor calculated by the AGC circuit 103 of the reception LSI $37_1$ and the AGC circuit 113 of the reception LSI $37_2$.

For example, the notification setting units 125 and 135 blink the indicators in blue in a case where the amplification factor calculated by the AGC circuit 103 of the reception LSI $37_1$ and the AGC circuit 113 of the reception LSI $37_2$ is within the normal operating range. On the other hand, the notification setting units 125 and 135 blink the indicators in green in a case where the amplification factor is within the normal operating range beyond the normal operating range and blink the indicators in red in a case where the amplification factor is beyond the normal operating range. In such a case, in a case where the distance between the antennas 40 arranged so as to face each other is manually adjusted by the user, the user can easily adjust the distance because the user is allowed to adjust the distance while watching the indicators 14 and 26.

In addition, in the indicators 14 and 26, it may be configured such that LEDs corresponding to channels of the RAID are disposed, and the LEDs are independently lighted for each channel.

In addition, as another example, in a case where the amplification factor calculated by the AGC circuit 103 of the reception LSI $37_1$ and the AGC circuit 113 of the reception LSI $37_2$ is a value less than a minimum value (18) of the normal operation range, the notification setting units 125 and 135 light the indicators 14 and 26, for example, in red. In addition, in a case where the amplification factor is a value greater than a maximum value (34) of the normal operation range, the notification setting units 125 and 135 light the indicators 14 and 26, for example, in orange. In such a case, in a case where a user manually adjusts the distance between the antennas 40 arranged so as to face each other, the direction for the movement can be easily acquired.

In addition, in the above-described embodiment, a case has been described in which only the position in the Z axis direction is adjusted. However, the present disclosure is not limited thereto, and the position may be adjusted in the X axis direction and the Y axis direction.

Figure 31:
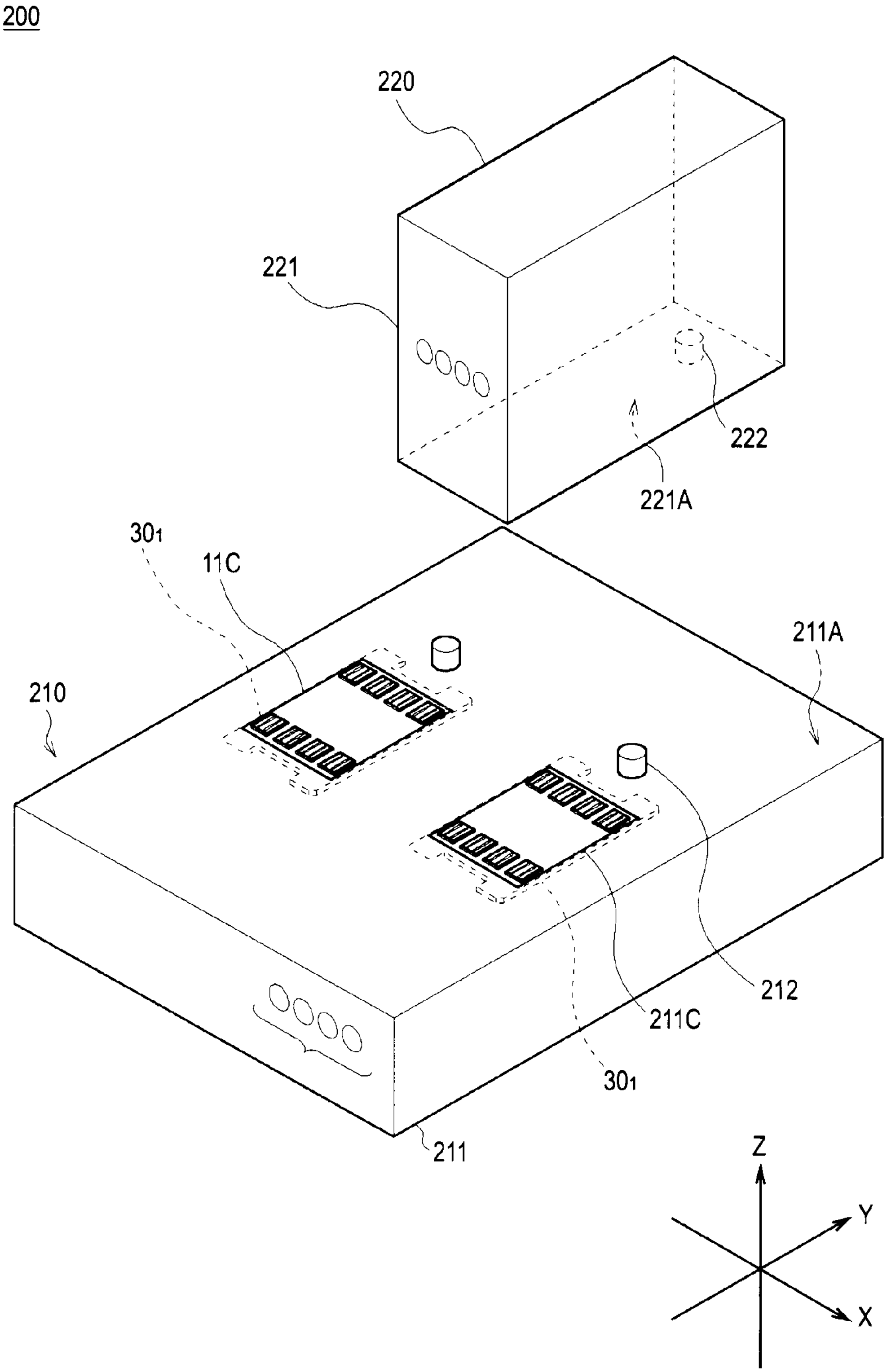
FIG. 31 is a schematic diagram illustrating the configuration of a communication unit according to another embodiment.

More specifically, as illustrated in FIG. 31, in a dock 210 of a communication unit 200, a protruded portion 212 that protrudes in the Z-axis positive direction is disposed at a predetermined position in the Y-axis direction of the communication module $30_1$ on a top face 211A of a casing portion 211.

In a storage device 220 of the communication unit 200, a fitting portion 222 into which the protruded portion 212 of the dock 210 fits is disposed on a bottom face 221B of a casing portion 221. Accordingly, when the fitting portion 222 is placed so as to be fitted with the protruded portion 212 of the dock 210, the storage device 220 can rotate around the fitting portion 222 as the rotation center on the XY plane. Accordingly, the position between the antennas 40 arranged so as to face each other in the X axis direction and the Y axis direction can be adjusted. In addition, the rotation of the storage device 220 may be performed by controlling an actuator mechanism that is additionally disposed by using the microcomputer 83 or 84 or may be manually performed. In addition, for example, in a case where an actuator mechanism that moves only the communication module 30 is additionally disposed for the movement in the Z axis direction, the distance of the antennas 40 arranged so as to face each other in all the X axis, Y axis, and Z axis directions can be adjusted.

Figure 32:
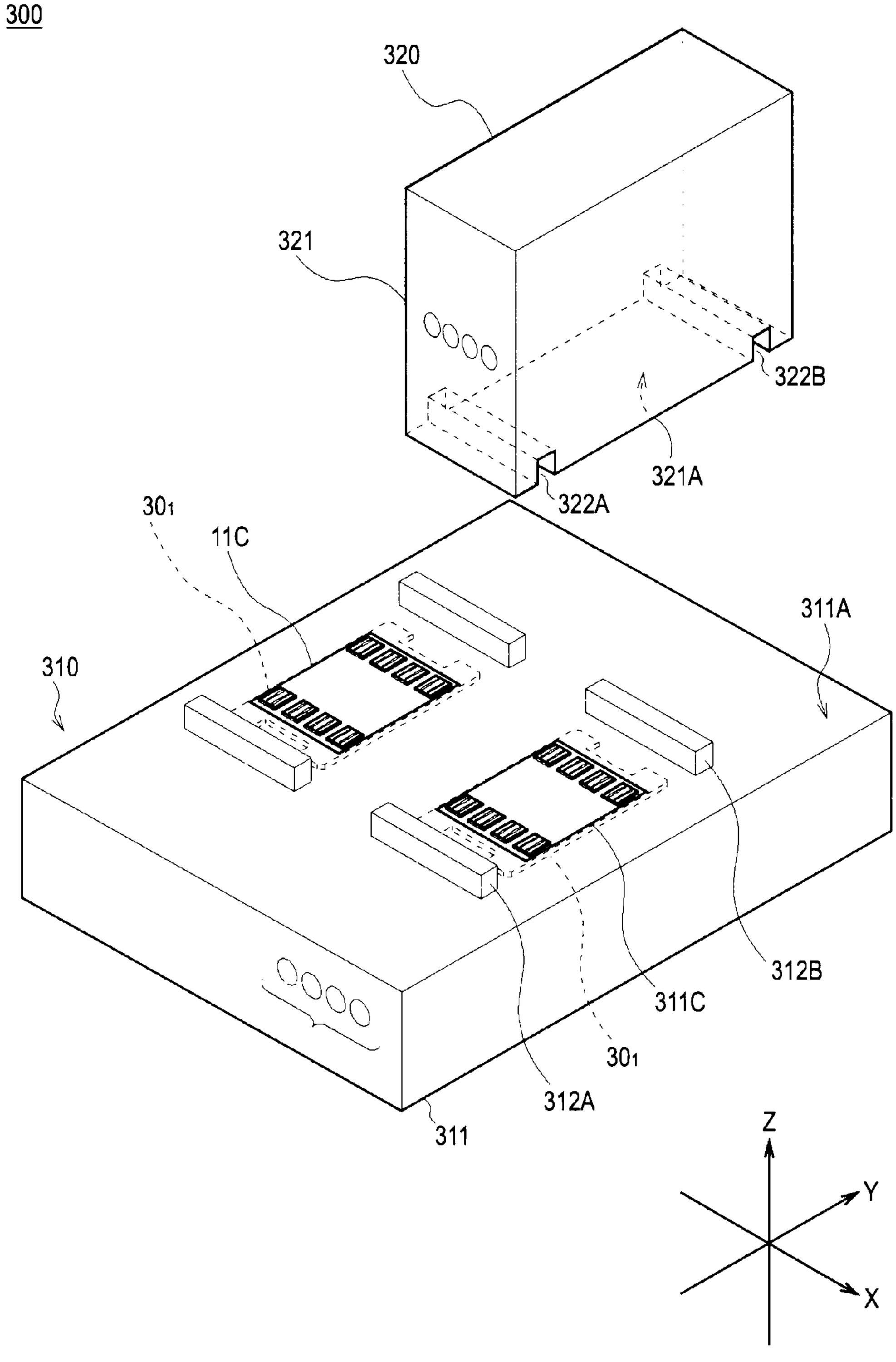
FIG. 32 is a schematic diagram illustrating the configuration of a communication unit according to another embodiment.

In addition, as another example, as illustrated in FIG. 32, in a dock 310 of a communication unit 300, on a top face 311A of a casing portion 311, rails 312A and 312B are disposed along the X axis direction at symmetrical positions with the communication module $30_1$ interposed therebetween.

In a storage device 320 of a communication unit 300, on a bottom face 321B of a casing portion 321, rail grooves 322A and 322B that are engaged with the rails 312A and 312B of the dock 310 are disposed. Accordingly, when the rail grooves 322A and 322B are placed so as to be engaged with the rails 312A and 312B of the dock 310, the storage device 320 can move along the rails 312A and 312B in the X axis direction. Therefore, the position between the antennas 40 arranged so as to face each other in the X axis direction can be adjusted. In addition, the rotation of the storage device 320 may be performed by controlling an actuator mechanism that is additionally disposed by using the microcomputer 83 or 84 or may be manually performed. Furthermore, for example, in a case where an actuator mechanism that moves only the communication module 30 is additionally disposed for the movement in the Z axis direction, the distance of the antennas 40 arranged so as to face each other in all the X axis and Z axis directions can be adjusted.

Figure 33:
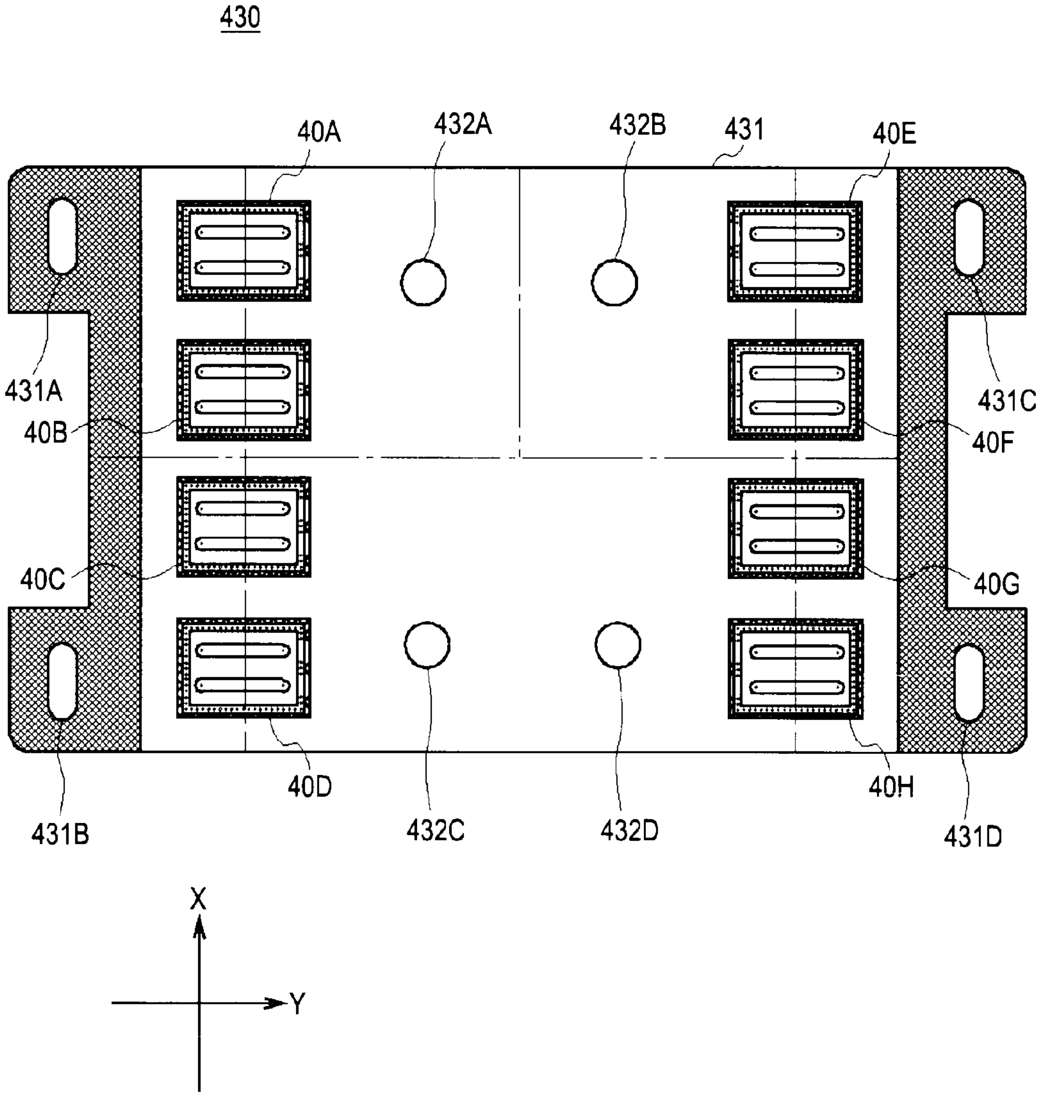
FIG. 33 is a schematic diagram illustrating the configuration of a communication module according to another embodiment.

As a further another example, as illustrated in FIG. 33, the position in the X axis direction may be adjusted by using a communication module 430. In the communication module 430, long holes 431A, 431B, 431C, and 431D along the X axis direction are arranged on four corners of a substrate 431 having an approximate "H" shape. In addition, in the communication module 430, on the side on which the antennas 40A to 40H are arranged, for example, magnets 432A to 432D such as neodymium magnets are disposed.

Then, to the dock 10 and the storage device 20, a communication module 430 is attached instead of the communication module 30. At that time, screws 27 are inserted so as to pass through the long holes 431A, 431B, 431C, and 431D of the communication module 430, and the communication module 430 is tightly pressed by a spring 27A so as to be fixed.

Accordingly, the magnets $432A_1$ to $432D_1$ of the communication module $430_1$ disposed in the dock 10 and the magnets $432A_2$ to $432D_2$ of the communication module $430_2$ disposed in the storage device 20 attract each other, and the communication module 430 can be fixed such that the positions on the XY plane almost face each other.

In addition, in the above-described embodiment, a case has been described in which only the position in the Z axis direction is adjusted. However, the present disclosure is not limited thereto, in a case where the amplification factor is not within the normal operating range even when the position of the Z axis direction is adjusted, the position in the X axis direction and the Y axis direction may be adjusted.

In addition, in the above-described embodiment, a case has been described in which the communication control unit 126 acquires the amplification factor calculated by the AGC circuit 103 of the reception LSI $37_1$, monitors whether or not the amplification factors are within the normal operating range for all the channels, and normally ends the communication in a case where the amplification factor is not within the normal operating range for any channel. However, the present disclosure is not limited thereto, and the communication control unit 126 stores the amplifications calculated by the AGC circuit 103 of the reception LSI $37_1$ that are acquired for every predetermined interval as a time series. Then, in a case where the amplification factor changes in a direction closer to the maximum value or the minimum value of the normal operating range, the communication control unit 126 may end the communication before the amplification is beyond the normal operating range.

In addition in the above-described embodiment, a case has been described in which the position control unit 124 calculates a difference between the distance estimated by the distance estimating unit 123 and the reference distance and moves the storage device 20 in the Z axis direction by driving the actuator 13 such that the distance between the antennas 40 arranged so as to face each other becomes the reference distance. However, the present disclosure is not limited thereto, and the position control unit 124 may calculate a difference between the distance estimated by the distance estimating unit 123 and the reference distance and move the storage device 20 in the Z axis direction in a case where the difference is within the driving range of the actuator 13. Furthermore, in a case where the difference is beyond the driving range of the actuator 13, the position control unit 124 may notify a user that the difference is beyond the driving range through the notification control unit 125 and the indicator 14 and not move the storage device 20.

In addition, in the above-described embodiment, a case has been described in which the microcomputer 83 and 84 perform the above-described various processes in accordance with the program stored in the ROM. However, the present disclosure is not limited thereto, and, for example, the above-described various processes may be performed in accordance with a program acquired by being installed from a storage medium or a program downloaded from the Internet. Furthermore, the above-described various processes may be performed in accordance with a program that is installed through other various routes.

In addition, in the above-described embodiment, a case has been described in which position adjustment is performed for the antenna 40 including the differential linear antenna 41 that performs communication using a Quasi-electrostatic field. However, the present disclosure is not limited thereto and may be applied to an antenna that performs communication using a Quasi-electrostatic field in which the amplification factor attenuates in accordance with the distance.

In addition, in the above-described embodiment, a case has been described in which the differential linear antenna 41 is disposed as the differential linear antenna, and the patch antenna 42 is disposed as the patch antenna. However, the present disclosure is not limited thereto, and a differential linear antenna and a patch antenna having other various configurations may be disposed.

In addition, in the above-described embodiment, a case has been described in which the antenna 40 as an antenna, the gain control unit 103 or 113 as a gain control unit, the distance estimating unit 123 or 133 as an estimation unit, the actuator mechanism 13 as an adjustment unit, and the position control unit 124 or 134 as a position control unit are disposed. However, the present disclosure is not limited thereto, and an antenna, a gain control unit, an estimation unit, an adjustment unit, and a position control unit having other various configurations may be disposed.

The present disclosure is applicable to the field of wireless communication and the like.

The present disclosure contains subject matter related to those disclosed in Japanese Priority Patent Applications JP 2010-195952, JP 2010-195953 and JP 2010-195954, all filed in the Japan Patent Office on Sep. 1, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An antenna comprising:

a differential linear antenna that comprises two antenna elements, which have a predetermined length, arranged so as to be separated from each other to be symmetrical with respect to a line that becomes a reference and provided with voltages having opposite polarities;

a patch antenna having a flat plate shape which is arranged to be parallel to a plane, on which the differential linear antenna is arranged, and in which a feeding point is disposed in an area interposed between virtual planes that are perpendicular to the plane and pass through extended lines of the antenna elements;

a conductive shielding frame that surrounds the differential linear antenna and is connected to a ground, wherein the conductive shielding frame is arranged on the plane on which the differential linear antenna is arranged; and a shielding post that is partly connected to the conductive shielding frame and the patch antenna, and is formed in a basket shape so as to surround the conductive shielding frame and the patch antenna.

2. The antenna according to claim 1, wherein, in the patch antenna, the feeding point is disposed at a position that is equally distant from the two antenna elements of the differential linear antenna.

3. The antenna according to claim 1, wherein the differential linear antenna is arranged so that the two antenna elements are parallel to each other.

4. The antenna according to claim 3, wherein a plurality of the antennas are adjacently arranged so as to be aligned in a direction perpendicular to a longitudinal direction of the antenna elements.

5. A communication module comprising:

an antenna including a differential linear antenna that comprises two antenna elements, which have a predetermined length;

a patch antenna having a flat plate shape which is arranged parallel to a plane on which the differential linear antenna is arranged, and in which a feeding point is disposed in an area interposed between virtual planes that are perpendicular to the plane and pass through extended lines of the antenna elements; and a substrate in which the antenna is arranged such that the differential linear antenna is positioned on a layer located above that of the patch antenna.

6. The communication module according to claim 5, further comprising a conductive shielding frame that surrounds the differential linear antenna and is connected to a ground.

7. The communication module according to claim 6, wherein the conductive shielding frame is arranged on the plane on which the differential linear antenna is arranged.

8. The communication module according to claim 5, further comprises a protective film disposed over, and parallel to, the plane on which the differential linear antenna is arranged, wherein the protective film is made of a material with dielectric constant equal to or less than ten.

9. The communication module according to claim 5, wherein the antenna elements are formed by flat plates.

10. The communication module according to claim 5, wherein the patch antenna is rectangular in shape.

11. The communication module according to claim 5, wherein the patch antenna has holes, formed at positions facing both ends of the antenna elements, through which the both ends of the antenna elements are extended to the opposite side of the patch antenna.

12. The communication module according to claim 5, further comprises an impedance adjusting plate arranged parallel to the plane on which the differential linear antenna is arranged.

13. The communication module according to claim 5, wherein the differential linear antenna is arranged on the center of the patch antenna.

14. The communication module according to claim 4, further comprises:

a conductive shielding frame that surrounds the differential linear antenna and is connected to a ground; and a conductive flat plate that is connected to the conductive shielding frame and the patch antenna, and is formed in a basket shape so as to surround the conductive shielding frame and the patch antenna.

15. The communication module according to claim 5, wherein the differential linear antenna performs communication at about 6 GHz to 8 GHz.

16. The communication module according to claim 5, wherein the patch antenna performs communication at about 1 GHz to 2 GHz.

17. A communication system comprising:
a storage device; and
a dock, wherein
the storage device includes
a storage medium that stores data therein, and
a first antenna including
a differential linear antenna that includes two antenna elements, which have a predetermined length, arranged so as to be separated from each other to be symmetrical with respect to a line that becomes a reference and provided with voltages having opposite polarities and
a patch antenna having a flat plate shape which is arranged to be parallel to a plane, on which the differential linear antenna is arranged, and in which a feeding point is disposed in an area interposed between virtual planes that are perpendicular to the plane and pass through extended lines of the antenna elements,
the dock includes
a second antenna having a same shape as the first antenna, and
a casing portion to which the storage medium is installed such that the first antenna and the second antenna are in a state of facing each other over an extremely short distance, and
the differential linear antennas of the first and second antennas communicate with each other in a non-contact manner, and the patch antennas of the first and second antennas communicate with each other in a non-contact manner.

18. The communication system according to claim 17, wherein the dock further comprises an indicator to notify a connection status or a communication status with the storage device.

19. The communication system according to claim 17, wherein the storage device further comprises an indicator to notify a connection status or a communication status with the dock.

* * * * *